US011473976B2

(12) United States Patent
Schwab et al.

(10) Patent No.: US 11,473,976 B2
(45) Date of Patent: Oct. 18, 2022

(54) SPECTROPHOTOMETER SYSTEM AND ENHANCED OPTICAL CHARACTERIZATION OF BIOLOGICAL SAMPLES USING SAME

(71) Applicant: Mayo Foundation for Medical Education and Research, Rochester, MN (US)

(72) Inventors: Daniel J. Schwab, Mantorville, MN (US); Gary S. Delp, Rochester, MN (US); Clifton R. Haider, Rochester, MN (US); Barry K. Gilbert, Rochester, MN (US); Nathan E. Harff, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 0 days.

(21) Appl. No.: 17/281,465

(22) PCT Filed: Oct. 8, 2019

(86) PCT No.: PCT/US2019/055219

§ 371 (c)(1),
(2) Date: Mar. 30, 2021

(87) PCT Pub. No.: WO2020/076844

PCT Pub. Date: Apr. 16, 2020

(65) Prior Publication Data

US 2021/0404875 A1 Dec. 30, 2021

Related U.S. Application Data

(60) Provisional application No. 62/742,788, filed on Oct. 8, 2018.

(51) Int. Cl.
*G01J 3/02* (2006.01)
*G01J 3/28* (2006.01)
(Continued)

(52) U.S. Cl.
CPC ............ *G01J 3/2803* (2013.01); *G01J 3/027* (2013.01); *G01J 3/0286* (2013.01); *G01J 3/108* (2013.01);
(Continued)

(58) Field of Classification Search
CPC .... G01J 3/28; G01J 3/2803; G01J 3/02; G01J 3/14; G01J 3/027; G01J 3/0286;
(Continued)

(56) References Cited

U.S. PATENT DOCUMENTS 4,566,797 A 1/1986 Kaffka
6,108,096 A 8/2000 Ushio
(Continued)

FOREIGN PATENT DOCUMENTS

JP H10-38856 A 2/1998

OTHER PUBLICATIONS

Agamennoni, G., et al. "An Outlier-Robust Kalman Filter," in 2011 IEEE International Conference on Robotics and Automation, 2011, May 9-13, 2011, pp. 1551-1558.
(Continued)

*Primary Examiner* — Abdullahi Nur
(74) *Attorney, Agent, or Firm* — Quarles & Brady LLP; Yakov Sidorin

(57) ABSTRACT

Spectrophotometer system configured to characterize and/or measure spectrally (wavelength)-dependent properties of material components (such as molecular, viral, and/or bacterial analytes) associated with or of an object prior to the time when optical fingerprints of such material components start to degrade, and associated methods. System can be
(Continued)

Fixed UV Turning Mirror 192-400 nm
Spectrometers (Wavelength Monitors)
Beam Profile/ Pump Sensor
Spectrometer Display Computer
Energy Meters
110
108
124
132
108
Control Computer Display
136
116
140
120
Input Energy Beam Splitters (1.5%/98.5%)
128
High Speed Filter Wheel (Energy Leveling)
144
Switchable Turning Mirror (Selects Desired OPO Output Port: 192-400 or 400-2750 nm)
Avalanche Photodiodes (Pulse Width Monitors)
Injection Seeder 104
Cell Rotation Control Computer
Aperture To Block Unwanted (Idler) Light enhanced by a capability of selecting specific wavelengths of operation for such system to optimize cost-efficiency of the system.

19 Claims, 25 Drawing Sheets

(51) Int. Cl.
*G01J 3/10* (2006.01)
*G01N 21/35* (2014.01)

(52) U.S. Cl.
CPC ...... *G01N 21/35* (2013.01); *G01J 2003/2866* (2013.01)

(58) Field of Classification Search
CPC ...... G01J 3/108; G01J 2003/2866; G01J 3/50; G01N 21/35; G01N 21/31
See application file for complete search history.

(56) References Cited

U.S. PATENT DOCUMENTS

| | | | | |
|---|---|---|---|---|
| 9,618,449 | B2 | 4/2017 | Chekalyuk | |
| 9,714,900 | B2 | 7/2017 | Haider | |
| 9,739,663 | B2 | 8/2017 | Haider | |
| 10,024,797 | B2 | 7/2018 | Reardon | |
| 10,072,983 | B2 | 9/2018 | Haider | |
| 10,458,900 | B2 * | 10/2019 | Marta ................ | G01N 29/4427 |

OTHER PUBLICATIONS

Bashkatov, A. N., et al. "Optical properties of human cranial bone in the spectral range from 800 to 2000 nm," in Saratov Fall Meeting 2005: Optical Technologies in Biophysics and Medicine VII, 2006, vol. 6163, p. 11: SPIE.

Bristol Instruments. Optical Wavelength Meter 228 Series Brochure. Jul. 2019. 2 pages.

Cockerill III, F. R., et al. "Optimal testing parameters for blood cultures." Clinical infectious diseases 38.12 (2004): 1724-1730.

Cox, B. T., et al. "k-space propagation models for acoustically heterogeneous media: Application to biomedical photoacoustics," The Journal of the Acoustical Society of America, vol. 121, No. 6, pp. 3453-3464, 2007.

Firbank, M., et al. "Measurement of the optical properties of the skull in the wavelength range 650-950 nm," Physics in Medicine & Biology, vol. 38, No. 4, p. 503, 1993.

Friebel, M., et al. "Determination of optical properties of human blood in the spectral range 250 to 1100 nm using Monte Carlo simulations with hematocrit-dependent effective scattering phase functions." Journal of biomedical optics 11.3 (2006).

Hu, J. et al. "Optical Biosensing of Bacteria and Bacterial Communities," Journal of analysis and testing, vol. 1, No. 1, (2017): 4.

International Searching Authority. International Search Report and Written Opinion for application PCT/US2019/055219, dated Jan. 23, 2020. 11 pages.

ITIS Foundation. "IT'IS Database for thermal and electromagnetic parameters of biological tissues," Aug. 1, 2014. Documentation Data. 5 pages.

Key, H., et al. "Monte Carlo modelling of light propagation in breast tissue," Physics in Medicine & Biology, vol. 36, No. 5, p. 591, 1991.

Myers, L. E., et al. "Quasi-phase-matched optical parametric oscillators in bulk periodically poled LiNbO 3." JOSA B 12.11 (1995): 2102-2116.

Paltauf, G., et al. "Photoacoustic waves excited in liquids by fiber-transmitted laser pulses," The Journal of the Acoustical Society of America, vol. 104, No. 2, pp. 890-897, Apr. 1998.

Treeby, B. E. et al. "k-Wave: MATLAB toolbox for the simulation and reconstruction of photoacoustic wave fields," Journal of Biomedical Optics, vol. 15, No. 2, Mar. 1, 2010.

Treeby, B. E., et al. "Time Domain Simulation of Harmonic Ultrasound Images and Beam Patterns in 3D Using the k-space Pseudospectral Method," in Medical Image Computing and Computer-Assisted Intervention (MICCAI), Part 1, Toronto, Canada, 2011, vol. 6891, pp. 363-370: Springer-Verlag Heidelberg.

Udem, T., et al. "Absolute optical frequency measurement of the cesium D 1 line with a mode-locked laser." Physical review letters 82.18 (1999): 3568.

Westerman, R. A. "Hypoxia familiarisation training by the reduced oxygen breathing method," ADF Health, vol. 5, pp. 11-15, 2004.

Wim, V., et al. "Modelling light distributions of homogeneous versus discrete absorbers in light irradiated turbid media," Physics in Medicine & Biology, vol. 42, No. 1, p. 51, 1997.

Woodrow, A. D., et al, "Recollection of Hypoxia Symptoms Between Training Events," (in English), Aviation Space and Environmental Medicine, vol. 82, No. 12, pp. 1143-1147, Dec. 2011.

* cited by examiner

FIG. 6A
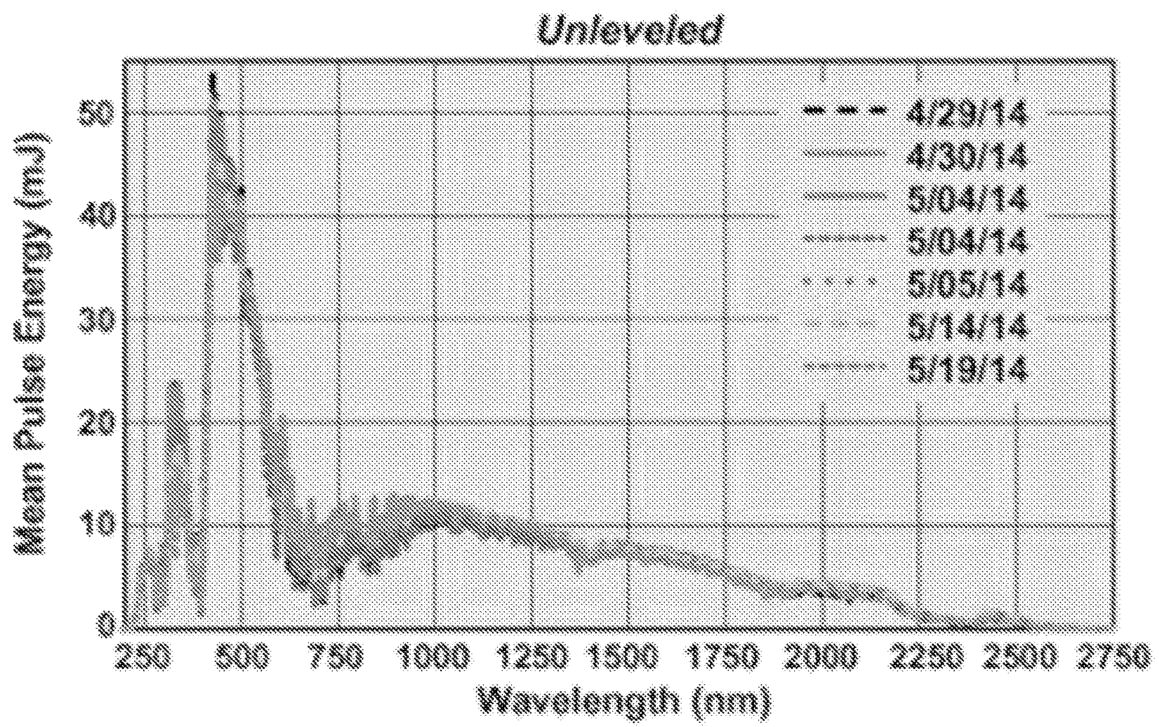
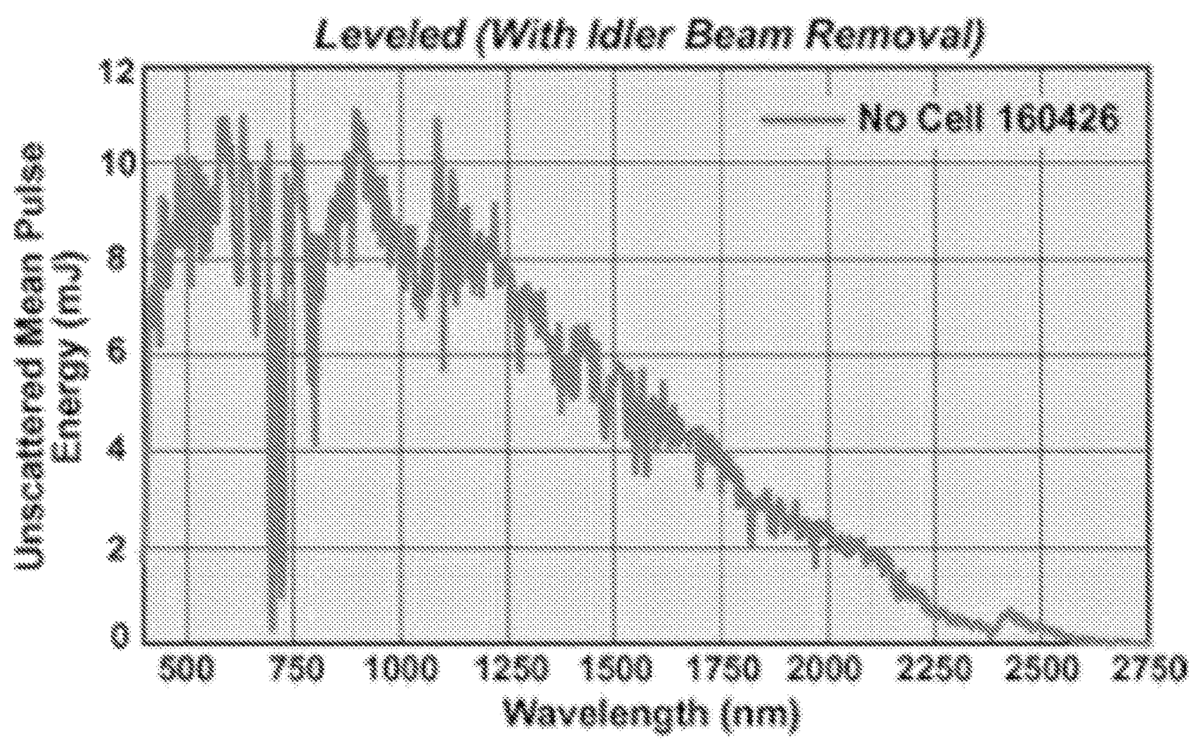
FIG. 6B

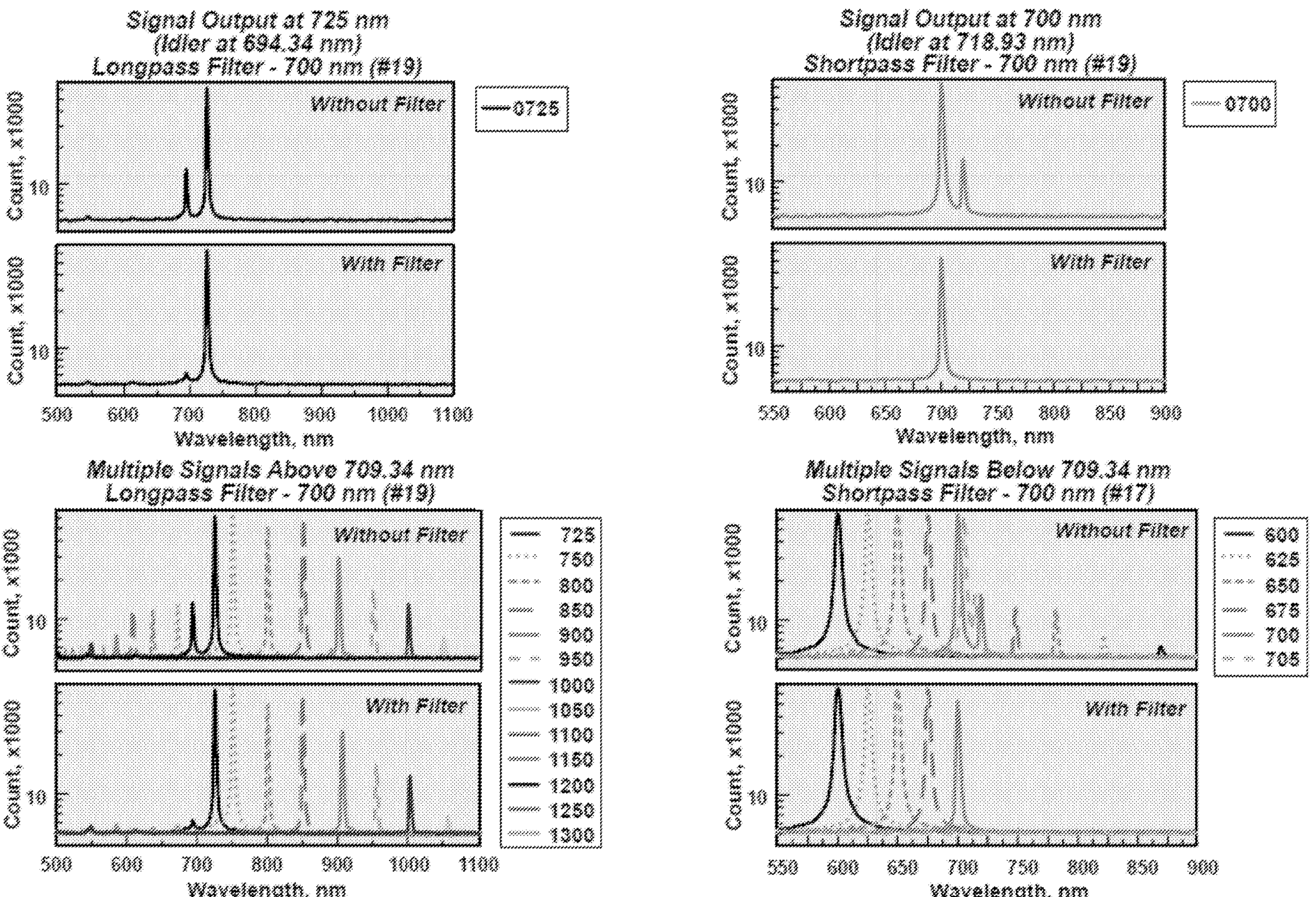
FIG. 6C
Signal Output at 725 nm
(Idler at 694.34 nm)
Longpass Filter - 700 nm (#19)
Without Filter
With Filter
0725
Count, x1000
10
Wavelength, nm
500 600 700 800 900 1000 1100
Signal Output at 700 nm
(Idler at 718.93 nm)
Shortpass Filter - 700 nm (#19)
Without Filter
With Filter
0700
Count, x1000
10
Wavelength, nm
550 600 650 700 750 800 850 900
Multiple Signals Above 709.34 nm
Longpass Filter - 700 nm (#19)
Without Filter
With Filter
725
750
800
850
900
950
1000
1050
1100
1150
1200
1250
1300
Count, x1000
10
Wavelength, nm
500 600 700 800 900 1000 1100
Multiple Signals Below 709.34 nm
Shortpass Filter - 700 nm (#17)
Without Filter
With Filter
600
625
650
675
700
705
Count, x1000
10
Wavelength, nm
550 600 650 700 750 800 850 900

1340 CENTER ALIGNED COMPONENTS
1345 OFFSET COMPONENTS
1350 INTEGRATING SPHERE
1355 CENTERED ROTATING SAMPLE HOLDER
1360 CENTER OF UNDIFFUSED LIGHT PATH
1365 OFF-CENTERED ROTATING SAMPLE HOLDER
1370 UNDIFFUSED OFF-CENTERED LIGHT TRACK
1375 CENTER OF ROTATING SAMPLE HOLDER

| DYE | $Ex_{max}$ (nm)* | $Em_{max}$ (nm)* | NHS ESTER | MALEIMIDE | CARBOXYLATE | DBCO | AZIDE | ALKYNE | PHOSPHORAMIDITE | LI-COR CHANNEL |
|---|---|---|---|---|---|---|---|---|---|---|
| IRDYE 800CW | 778 | 794 | ☑ | ☑ | ☑ | ☑ | ☑ | ☑ | — | 800 nm |
| IRDYE 800RS | 770 | 786 | ☑ | CUSTOM | CUSTOM | CUSTOM | CUSTOM | CUSTOM | — | 800 nm |
| IRDYE 800 PHOSPHORAMIDITE | 787 | 812 | — | — | — | CUSTOM | CUSTOM | CUSTOM | ☑ | 800 nm |
| IRDYE 750 | 766 | 776 | ☑ | ☑ | CUSTOM | CUSTOM | CUSTOM | CUSTOM | — | — |
| IRDYE 700DX | 680 | 687 | ☑ | CUSTOM | CUSTOM | CUSTOM | CUSTOM | CUSTOM | — | 700 nm |
| IRDYE 700 PHOSPHORAMIDITE | 680 | 697 | — | — | — | — | — | — | ☑ | 700 nm |
| IRDYE 680LT | 680 | 694 | ☑ | ☑ | CUSTOM | CUSTOM | CUSTOM | CUSTOM | — | 700 nm |
| IRDYE 680RD | 680 | 694 | ☑ | ☑ | ☑ | ☑ | ☑ | ☑ | — | 700 nm |
| IRDYE 650 | 651 | 668 | ☑ | ☑ | CUSTOM | ☑ | ☑ | ☑ | | |

FIG. 22

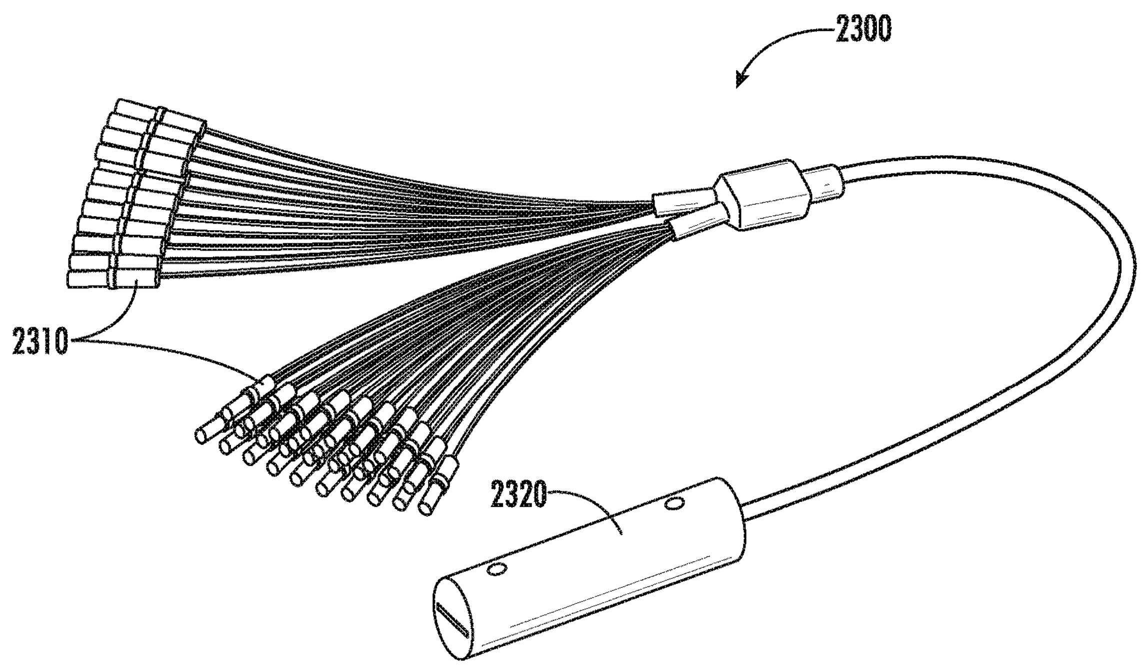

Table 4. Relationship between incubation times for blood cultures (blood culture sets) and the detection of all bloodstream pathogens and all contaminating microorganisms.

| | Incubation time, h | | | | | | | | | | | | | |
|---|---|---|---|---|---|---|---|---|---|---|---|---|---|---|
| | 24 | | 48 | | 72 | | 96 | | 120 | | 144 | | 168 | |
| Organism group | Patients without EC | Patients with EC | Patients without EC | Patients with EC | Patients without EC | Patients with EC | Patients without EC | Patients with EC | Patients without EC | Patients with EC | Patients without EC | Patients with EC | Patients without EC | Patients with EC |
| Pathogens and contaminating microorganisms | 2343 (72.9) | 144 (77.8) | 534 (89.5) | 26 (91.9) | 175 (94.9) | 8 (96.2) | 92 (97.8) | 1 (96.8) | 47 (99.3) | 2 (97.8) | 21 (99.9) | 4 (100) | 3 (100) | ... |
| Pathogens | 2052 (76.5) | 144 (77.8) | 393 (91.2) | 26 (91.9) | 123 (95.8) | 8 (96.2) | 61 (98.1) | 1 (96.8) | 35 (99.4) | 2 (97.8) | 14 (99.9) | 4 (100) | 3 (100) | ... |
| contaminating microorganisms | 291 (54.5) | ... | 141 (80.9) | ... | 52 (90.7) | ... | 31 (96.5) | ... | 12 (98.7) | ... | 7 (100) | ... | ... | ... |

NOTE. Data are absolute no. (cumulative %) of organisms isolated. EC, endocarditis.

FIG. 26

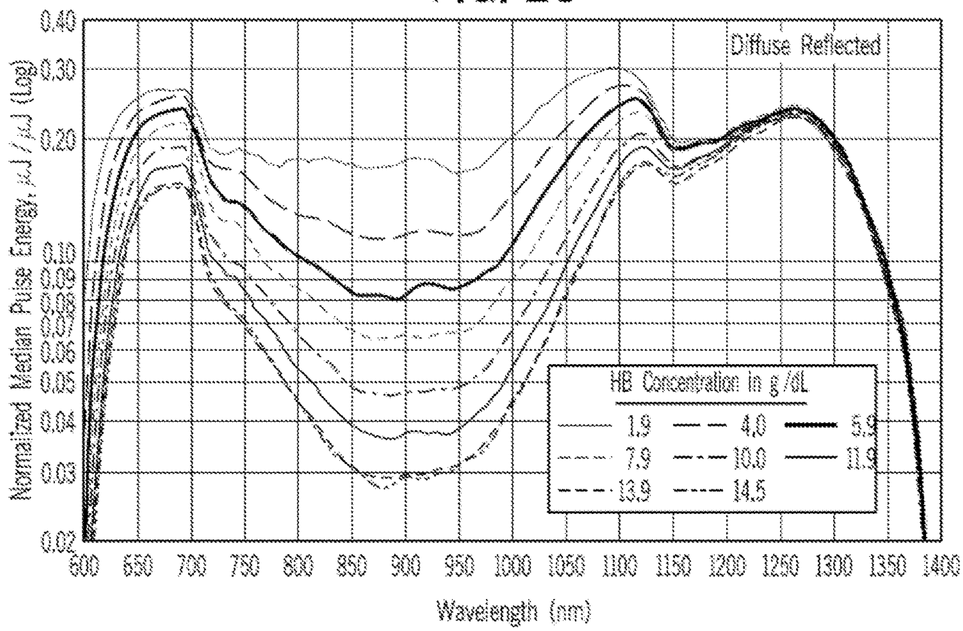

FIG. 29

The daily activities included laser warm-up (auto-timed, activated by the control software) and then each day the following system verification sequence was performed.

1. Pump laser 355 nm energy (Yag sensor and energy meter)
2. Pump laser 355 nm wavelength (Spectrometer)
3. Pump laser 355 nm pulse duration (APD and oscilloscope)
4. Pump laser 355 nm beam profile (Beam profiler)
5. OPO output 508 nm energy (Beam split energy sensor and energy meter)
6. OPO output 508 nm wavelength (Spectrometer)
7. OPO output 508 nm pulse duration (APD and oscilloscope)
8. OPO output 508 nm profile (Burn paper)
9. OPO output sweep from 300 nm to 2750 nm in 5 nm steps, energy only This last test was referred to as the no-cell run (i.e., no sample holder test runs). It provided a stored measurement sweep of the beam split energy, as well as the remaining energy which was detected by the unscattered sensor. In many cases a no-cell run was conducted in the morning before biological tests and at the end of the day when biological tests were completed.

On a less frequent basis (usually every other week), a more extensive set of tests was performed that included an OPO output sweep from 300 nm to 2750 nm in 50 nm steps, with the following specific verifications.

1. Energy: 300 nm to 2750 nm
2. Wavelength: 300 nm to 1700 nm (limited by the two spectrometer bandwidths)
3. Pulse duration: 300 nm to 1700 nm (limited by the two APD bandwidths)
4. Beam profile: 400 nm to 1100 nm (limited by the profiler bandwidth)

3000
3005
3010
3015
3020
3030
3035
3040
410
120

3045
3050
3055

3060
3065

3000
410
120
3065
3030

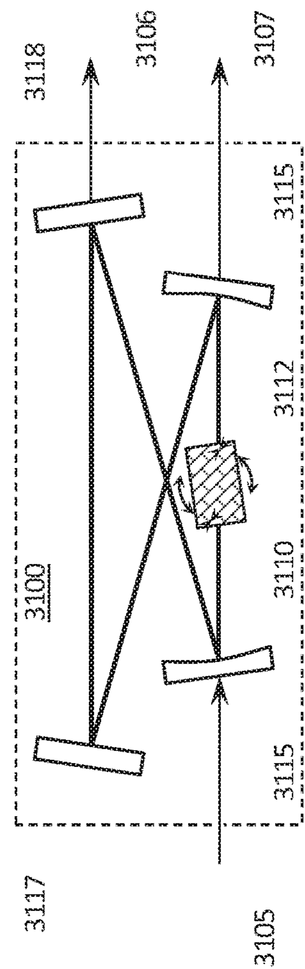
Fig. 31A
3100
3117
3118
3106
3107
3105
3115
3110
3112
3115
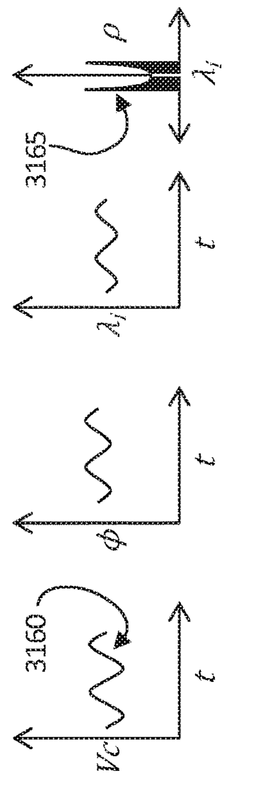
Fig. 31D
3160
3165
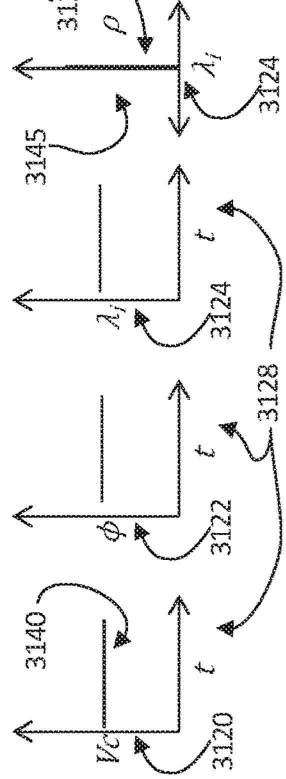
Fig. 31B
3140
3120
3122
3124
3128
3145
3124
3126
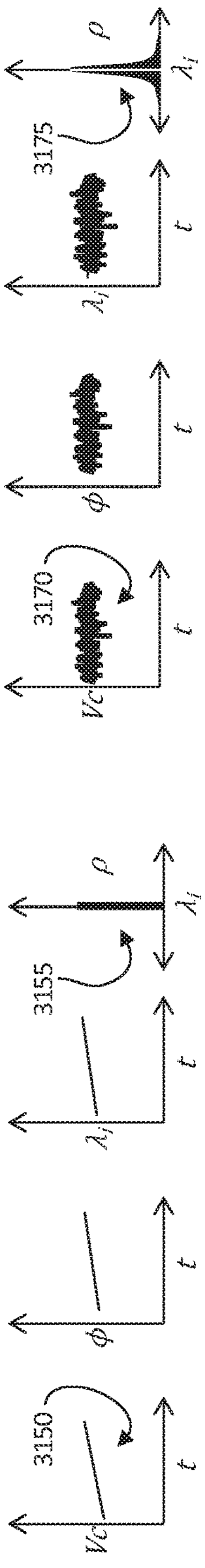
Fig. 31E
3170
3175
Fig. 31C
3150
3155

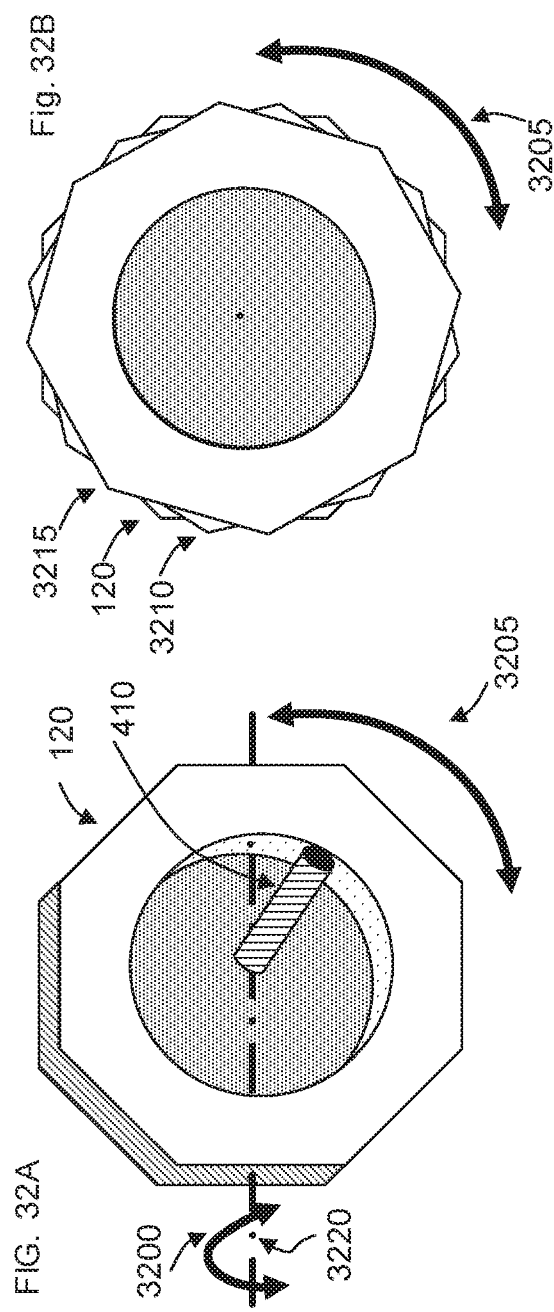
FIG. 32A
3200
3220
120
410
3205
Fig. 32B
3215
120
3210
3205
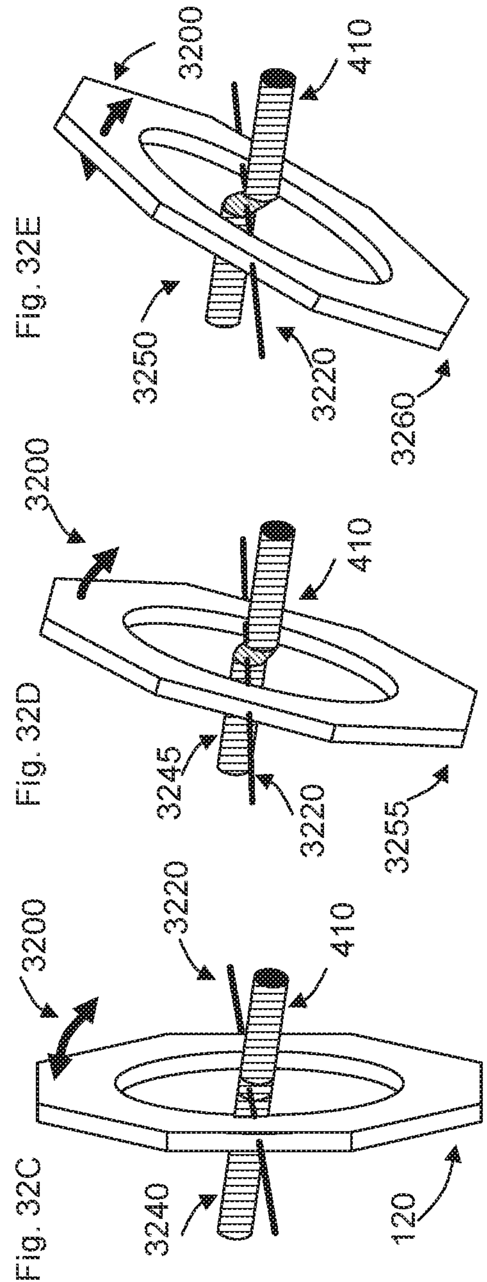
Fig. 32C
3240
120
3200
3220
410
Fig. 32D
3245
3220
3255
3200
410
Fig. 32E
3250
3220
3260
3200
410

SPECTROPHOTOMETER SYSTEM AND ENHANCED OPTICAL CHARACTERIZATION OF BIOLOGICAL SAMPLES USING SAME

CROSS-REFERENCE TO RELATED APPLICATIONS

The present application represents the national stage entry of PCT/US2019/055219 filed Oct. 8, 2019 and claims priority from and benefit of the U.S. Provisional Patent Application No. 62/742,788 filed on Oct. 8, 2018. The disclosure of each of the above-identified patent applications, is incorporated by reference herein.

STATEMENT REGARDING FEDERALLY SPONSORED RESEARCH

This invention was made with government support under N00014-14-1-0564 awarded by the Department of Defense. The government has certain rights in the invention.

TECHNICAL FIELD

The present invention relates to a spectroscopic system configured to characterize and/or measure spectrally (wavelength)-dependent properties of material components (such as molecular, viral, and/or bacterial analytes) associated with or of an object, and methods for selecting the specific wavelengths of operation for such system. In particular, the present invention relates to methods for optimal determination using a continuously-controllable, wavelength-scanning laser.

RELATED ART

The ability to monitor medically-important analytes or other material components of a chosen sample or object with the use of a chosen sensor system (including that configured as part of an unobtrusive body-worn unit) remains critical to the next generation of in-home, ambulatory, and in-clinic care for an aging population. Based on conducted research and as described in, for example, U.S. Pat. Nos. 9,714,900, 9,739,663, and 10,072,983 (referred to, aggregately, as Our Prior Publications) the disclosure of each of which is incorporated by reference herein), such monitoring (of, for example, concentration of various analytes in blood or tissue) can be accomplished quantitatively using a small number of narrowband laser radiation sources operating at very specific, pre-determined wavelengths. Those (laser-generated) wavelengths can be selected optimally using the methodology described in Our Prior Publications if and only if accurate, high-wavelength resolution, measured "fingerprints" of (that is, optical data representing) medically-important analytes over a wide range of wavelengths (e.g., 190 nm to 3000 nm) are known or available. If these continuous wavelength-dependent data (expressed as wavelength-dependent analyte curves or material component curves) are available, then an optimal selection of measurement wavelengths can, indeed, be made as taught in, for example, U.S. Pat. No. 9,714,900. To this end, the graph of FIG. 3B of U.S. Pat. No. 9,714,900 illustrated the apparently "smooth" analyte curves representing extinction coefficients for oxygenated hemoglobin, deoxygenated hemoglobin, and dyshemoglobins (i.e., MetHb and COHb). This graph showed the sub-optimal set of eight measurement wavelengths used by the commercial vendor. In contrast, the set of optimal wavelengths, algorithmically-selected for spectrophotometric measurements of the same analytes (or material components) chosen with the methodology described in Our Prior Publications was provided in FIG. 3C of U.S. Pat. No. 9,714,900.

Using the empirically-determined data, the inventors compared the noise/signal ratio achieved by the commercial vendor using the vendor's eight non-optimally selected wavelengths, versus only four wavelengths optimally selected using our algorithm and sufficient to perform the same measurements of the concentration of analytes of interest in a sample, as described in Our Prior Publications. The noise/signal ratio obtained using eight wavelengths was 31.2, whereas the noise/signal ratio in measurements performed at the only four wavelengths defined with the use of the proposed algorithm was 19.8, i.e., a 57.5% improvement of the quality of the measurement process was obtained while reducing the required hardware requirements (~ wavelengths of radiation available for operation) in half. Accordingly, it was demonstrated that the use of the number of wavelengths exceeding the minimum required causes the less-than-precise (as shown by the elevated NSR) measurements.

These early results convincingly show to skilled persons that there exists a need in very accurately-determined analyte curves (or material component curves), since inaccurate data inevitably results in suboptimal selection of the quantity and spectral values of the wavelengths for performing the photometric measurements of the optical properties of the chosen samples or objects. Suboptimal selection of wavelengths will inevitably result in errors of measurement.

Research reveals that at the moment no instrument exists that provides the wavelength (spectral) resolution required for such "optical fingerprints" (in other words, the wavelengths and wavelength-dependent characteristics that are used to distinguish between two or more different analytes/material components) for each of many known analytes or material components. For example, despite the ability of existing resonance Raman spectroscopic systems to selectively excite, various amino acids and nucleic acids in bacterial cells with the enhancement factor of up to $10^6$ as compared to the conventional Raman spectroscopy, such systems are not capable of identifying or differentiating bacterial species and strains on its own. (Typically, multivariate statistical methods have to be applied to tease out bacterial identification information.) Similarly, spectroscopic methodologies turning on the use of surface plasmon resonances (SPR) and localized surface plasmon resonances (LSRP), which are refractive-index-based sensing methodologies, have several challenges in bacterial sensing such as, for example, the fact that the similarity of refractive index among target analytes, e.g., biomolecules, bacteria, and surface recognition motifs inherently limits sensitivity, even for efficient analyte capture.

In addition—conventionally, as discussed in Our Prior Publications if a multiple number $(M>1)$ analytes are to be quantitatively detected in a chosen sample, M independent measurements at M independent wavelengths are conventionally performed. However, if the interactions of radiation with the sample at each given wavelength are recorded/measured in a multi-modality manner, an additional measure or characteristic of the sample is acquired that can be used to solve the system for equations for concentration of the material components (analytes) of interest in the sample with the use of a smaller number N of wavelengths that the number M of the material components (analytes) of interest themselves: only $N<M$ wavelengths of radiation is required and sufficient for the proper optical-measurement-based determination of the concentration of the chosen analytes in the sample. (Note that while the limited number of examples of discrete values of N, M were described in Our Prior Publications, the proposed methodology holds valid substantially without limitations. Also note as described in Our Prior Publications, the M (integer number) of analytes includes all of the significant analytes, not just the desired subset of results. One skilled in the art will recognize that these analytes, if not considered in the calibration and the system of equations, can cause errors in the desired analyte results.) For additional details, the reader is referred to Our Prior Publications. This practical determination is helpful in reducing the SWAP ("size, weight, and power"—which is a commonly-used figure of merit) of a measurement system configured as part of a body-worn unit. Here again, literature searches conducted by us revealed neither multi-modality wide-bandwidth optical fingerprint data nor instruments using this form of data.

Accordingly, related art also emphasizes the need in a spectrophotometer system that operates in a multi-modal fashion to perform the measurements of a given number of analytes (material components) of a sample while maintaining the noise-to-signal ratio below that exhibited by commercially-available systems. Such spectrophotometer system would produce the baseline data that can be later used for targeted designs of analyte-measuring body-worn unit.

SUMMARY

Embodiments of the invention provide a spectrophotometer system that has an axis. The spectrophotometer includes a first energy-collecting system (that contains first and second optical detectors disposed to accommodate, in operation, an optical cell system in a space between the first and second optical detectors) and a second energy-collecting system that contains third and fourth optical detectors. Here, the optical cell system includes an optical cell that has an inner volume dimensioned to enclose a sample inside the inner volume. The first optical detector is configured to capture a first portion of radiation delivered to the sample along the axis and diffused by the sample in reflection; the second optical detector is configured to capture a second portion of the radiation delivered to the sample along the axis and diffused by the sample in transmission; the third optical detector is disposed upstream from the first energy-collecting system (with respect to a flow of the radiation towards the space) and is configured to receive a third portion of the radiation delivered to the space along the axis, while the fourth optical detector is disposed downstream from the first energy-collecting system with respect to the flow and is configured to receive a fourth portion of the radiation (which is delivered, in operation, to the sample and transmitted through the sample without being scattered). The optical cell system includes the optical cell that contains first and second optically-transparent plates spatially-coordinated with one another to define an inner volume of the optical cell (that is substantially fluid-impenetrable and that is dimensioned to enclose a sample inside the inner volume). The optical cell system additionally includes at least one of (a) a photo-acoustic transducer in operable cooperation with the inner volume to generate a photo-acoustic signal that represents a photo-acoustic response of contents of the inner volume irradiated with radiation delivered to these contents through at least one of the first and second plates; (b) an optical port configured to establish an optical communication between the inner volume and an ambient surrounding the optical cell and in a plane substantially parallel to the plane of the first plate, while maintaining the inner volume substantially fluidly sealed; (c) an optical cell holder dimensioned to house the optical cell and structured to angularly displace the optical cell, in a controlled angular fashion, in a plane of the first plate and with respect to the axis; and (d) a set of spacer rings dimensioned to be disposed between the first and second plates along a perimeter of the inner volume. (Such spacer rings from the set have different thicknesses.) In one embodiment, the spectrophotometer system additionally includes a source of radiation that, in operation, generates the radiation at wavelength(s) within a wavelength range from about 100 nm to about 10,000 nm. The source of radiation includes (i) a pump laser source, or a continuous-wavelength (CW) laser source, and (ii) an optical parametric oscillator disposed to receive a radiative output from the pump laser source or the CW laser source. The spectrophotometer (system) further includes an optical filter disposed at the output of the optical parametric oscillator to receive radiation exiting the optical parametric oscillator. Such optical filter is structured to limit a maximum level of energy of radiation delivered to the first optical detector (from the output of the optical parametric oscillator).

A related embodiment of the spectrophotometer generally includes an auxiliary apparatus configured to determine a spectral regime of operation of the spectrophotometer. Such apparatus contains a data-processing unit of the system (such as, for example, a tangible storage medium—containing optical data received at least from some of the first, second, third, and fourth optical detectors and representing a characteristic such as, e.g., spectrally-dependent absorption distributions of M material components of the sample, M being greater than 1—and a programmable processor in operable communication with the tangible storage medium), inputs from sensors, outputs to control the various system elements so configured, and program code. The program code, when loaded onto the data-processing unit of the system, causes the processor to receive operational sequences of actions. Responsive to the stored sequence of actions, the system controls the elements and collects the sensor outputs. The sensor data, processed according to the program code, stores the measurement results taken from the sensor inputs.

Any embodiment of the spectrophotometer may additionally include electronic and/or pneumatic control for many settings (non-limiting list includes, e.g., for seed laser power, diode temperature; pump laser; OPO, including power, non-linear crystal angles, temperature, pressure, and/or positioning of mirrors, shutters, optical switches, and/or beam dumps; filter, shutter, optical switch, and/or mirror movement and acoustic transducers; cell rotation; safety interlocks).

An embodiment of the spectrophotometer may include—or, in the alternative—be supplemented by an auxiliary apparatus configured to determine a preferred spectral regime of operation (at a small number N of discrete wavelengths)of the spectrophotometer. Such apparatus contains a data-processing unit of the system (such as, for example, a tangible storage medium—containing optical data received at least from some of the first, second, third, and fourth optical detectors of the embodiment of the spectrophotometer and representing a characteristic such as, e.g., spectrally-dependent absorption distributions of M material components of the sample, M being greater than 1—and a programmable processor in operable communication with the tangible storage medium) and program code. The program code, when loaded onto the processor, causes the processor to receive the optical data from the tangible storage medium; solve a system of equations that includes a) a system of equations that expresses such optical data as functions of at least respectively-corresponding concentrations of the M material components of the sample/contents of the inner volume and spectrally-dependent paths of optical waves through the sample/contents, and b) additional equations employing at least one figure of merit, to calculate N wavelengths of operation of the device chosen such that the figure of merit is locally optimized at the N wavelengths of operation and includes propagation of variance. Here, N is required to be smaller than M, and the figure of merit includes propagation of variance. (Notably, the M material components may include two or more—three, four, five, and so on, at least up to twelve—of molecular analytes, cells, protein, hemoglobin, glucose, lipids, chromophore, hyperpolarized gas, carbon dioxide, carbon monoxide, and oxygen, and water.) In this latter case, at least one of the following conditions (a) and (b) may be satisfied: (a) the auxiliary apparatus is further configured to determine an impulse response of the sample, the impulse response being associated with emission at least one of said N wavelengths of operation; and to determine, as a function of time, at least one wavelength-dependent material parameter characterizing the sample based on the determined impulse response and said optical data received at least from some of the first, second, third, and fourth optical detectors; and (b) said N wavelengths of operation are defined by solving a system of equations that includes equations representing the spectrally dependent characteristics as a function of respectively-corresponding concentrations of the M material components of the sample, wherein said concentrations include at least one of a cell count, a protein count, a hemoglobin level, a glucose level, a lipid level, percent of a chromophore in the sample, a gas concentration; a percent water, and a pH level.

In any of the above-identified cases, the source of the radiation may be configured to generate said radiation at first and second wavelengths (within the stated wavelength range) such that a spectral separation between the first and second wavelengths of 0.1 nm or less.

Alternatively or in addition—and in any of the above cases—an embodiment of the spectrophotometer may satisfy one or more of the following conditions is satisfied: a) at least one of the third and fourth optical detectors is spatially displaced from the axis; b) at least one of the first and second optical detectors is configured to transmit the radiation therethrough to deliver radiation to at least one of the space (between the first and second energy-collecting systems) and the fourth optical detector; and c) the optical port is equipped with a fiber-optic element dimensioned to receive and transmit fluorescent radiation, generated inside the inner volume of the optical cell. Alternatively or in addition—and in substantially any of the above-identified cases—an embodiment of the spectrophotometer may include at least one of: (a) a temperature-control circuitry operably cooperated with the optical cell to change a temperature thereof to a predetermined temperature; (b) an oxygenation apparatus configured to transmit oxygen, in operation of the spectrophotometer, through contents of the inner volume to achieve a predetermined level of oxygenation of these contents; and (c) a source of pressurizing gas and a network of gas passages fluidly connecting the source of pressurizing gas with the inner volume to elevate a level of internal pressure inside the inner volume, wherein the optical cell is configured to maintain integrity of the optical cell and the inner volume substantially unchanged at a hyperbaric pressure of at least 450 psi.

Alternatively or in addition—and in any of the above-described embodiments—the spectrophotometer system may further include a programmable processor that is electrically connected to at least one of the first and second energy-collecting systems to receive an output produced by at least one of the first, second, third, and fourth optical detectors. Here, the third optical detector is disposed upstream from the space with respect to a flow of the radiation towards the space, and is configured i) to receive a fractional portion, of the radiation delivered to the space along the axis, and ii) to produce a third-detector output. Such programmable processor is configured to perform, based at least in part on the third-detector output, at least one of determining a power of the flow of radiation; determining a wavelength of radiation contained within the flow of radiation; calibrating measurement data collected by at least one of the first, second, and fourth detectors; and adjusting the flow of radiation.

Embodiments of the invention further provide a method for acquiring and/or processing optical data with a spectrophotometer system. The method includes the step of delivering excitation radiation along an axis to an optical cell system that is disposed in a space between first and second optical detectors, the optical cell system including an optical cell with a substantially fluid-impenetrable inner volume dimensioned to enclose a sample therein. The method additionally includes the step of traversing the sample with at least a fraction of used radiation while the sample is held under a predetermined level of pressure inside the inner volume. (Such operation of traversing may include traversing the sample held either at a hyperbaric pressure of at least 450 psi or at a sub-atmospheric pressure.) The method further includes simultaneously performing the identified actions: a) detecting ,with the first optical detector, a first portion of radiation that has been diffused by the sample in reflection; b) detecting, with the second optical detector, a second portion of radiation that has been diffused by the sample in transmission; c) partially reflecting a third portion of radiation outside of the first and second optical detector to detect the third portion of radiation at a third detector; and d) detecting, with a fourth optical detector, a fourth portion of radiation that has been transmitted through the sample without being scattered by the sample. In a specific case, these simultaneously-performed actions may be carried out to provide optical data representing spectral distribution of radiation from the first, second, and/or third portions of radiation to further determine $N>1$ wavelengths of preferred operation of a radiation source of the spectrophotometer system that are sufficient to quantitatively measure a characteristic of any and each of $M>N$ material components contained in the sample. (Notably, the M material components may include two or more—three, four, five, and so on at least up to twelve—of molecular analytes, cells, protein, hemoglobin, glucose, lipids, chromophore, hyperpolarized gas, carbon dioxide, carbon monoxide, and oxygen, and water.)

A specific implementation of the method includes transforming operation of the radiation source from i) spectral tuning of a radiative output of the radiation source across a pre-determined spectral range to ii) operating the radiation source at a discrete number of wavelengths, to generate radiation at the determined $N>1$ wavelengths of operation. In this latter case, the process of tuning includes transmitting the radiation output of a continuous-wavelength (CW) laser source through the OPO.

Alternatively or in addition—and in substantially any of the above-identified cases—the process of receiving includes receiving the at least a portion of fluorescent radiation that has been generated as a result of performing at least one of the following actions: (i) tuning a wavelength of said radiation as a result of transmitting a radiative output of a laser source through an optical parametric oscillator (OPO); (ii) switching laser source on and off with a frequency of at least one MHz; (iii) causing radiation from the laser source to be spectrally filtered at a pre-determined spectral range and causing the radiation at the determined N>1 wavelength to not be filtered; and (iv) using a scanning wavelength detector to measure a spectrum of the at least a portion of the fluorescent radiation. Here, the process of receiving at least the portion of fluorescent radiation may include channeling such fluorescent radiation from the inner volume through a peripheral wall of the optical cell while maintaining the inner volume substantially fluidly sealed. Alternatively or in addition—and in any of the above-identified cases—the method may include a step of pressurizing the sample inside the optical cell to a hyperbaric pressure. Alternatively or in addition—and in any of the above-identified cases—the method may include a step of performing at least one of: (i) receiving at least a portion of fluorescent radiation generated at the sample in response to interaction of excitation radiation with the sample to produce a report containing data that represent presence of anesthetic material in the sample (where the anesthetic material contains a fluorescent dye marker; (ii)acquiring, with an acoustic receiver, a sound representing a photo-acoustic response of the sample to interaction with the at least a fraction of the excitation radiation; (iii) angularly displacing the optical cell, with respect to the axis, in a plane that is substantially transverse to the axis at a controlled angular speed; (iv) changing a level of oxygenation of the sample in the optical cell; and (v) changing a temperature of the sample in the optical cell;

In a specific case, the method includes a step of determining a preferred spectral regime of operation of the spectrophotometer. This step includes the processes of: a) receiving, at a user-input device, optical data obtained from the first, second, third, and fourth optical detectors, and representing spectrally-dependent characteristics of the M material components; b) forming a first system of equations that expresses the optical data as functions of at least i) respectively corresponding concentrations of the M material components in the sample and ii) spectrally-dependent paths of optical waves through the sample, the optical waves respectively corresponding to the M material components; c) forming a second system of equations including the first system of equations and an additional equation that employs a figure of merit; d) solving such second system of equations, with a programmable processor, to calculate the N wavelengths of operation of the device chosen such that the figure of merit is locally optimized at the N wavelengths of operation. Here, N is required to be smaller than M and includes propagation of variance. In this latter specific case, the step of simultaneously performing the identified actions includes: based on the i) detecting with the first optical detector, ii) detecting with the second optical detector, iii) partially reflecting, and iv) detecting with a fourth optical detector, generating optical data that represent, for each of the M material components, two or more of an attenuation coefficient, a scattering coefficient, a coefficient of anisotropy, a fluorescence parameter, an index of refraction, and a parameter representing a quantum response of the M material components to impinging optical waves.

BRIEF DESCRIPTION OF THE DRAWINGS

The invention will be more fully understood by referring to the following Detailed Description in conjunction with the generally not-to-scale Drawings, of which:

FIGS. 6A and 6B, respectively, provide illustrations to the unleveled (original, not conditioned with an appropriate optical filter) spectral distribution of the OPO's radiative output and the one in which the idler component has been removed with the use of the optical filter system of an embodiment of the invention.

FIG. 6C includes multiple plots illustrating the effect of minimization of the idler energy contribution to the radiative output from the OPO, carried out by an embodiment of the invention, depending on chosen desired wavelength of operation of the embodiment.

FIG. 22 is a table summarizing characteristics of itemized dyes.

FIG. 23 is a depiction of an embodiment of a fiber-optic probe for use with an embodiment of the optical cell in the energy-collecting system of the spectrophotometer of the invention.

FIG. 25 presents relationship between incubation times for blood cultures and the detection of all bloodstream pathogens and all contaminating microorganisms, demonstrating that times required by currently-used detections systems are extremely long.

FIG. 26 contains plots of results of absolute measurements of various concentrations of oxygen at the diffused, reflected collection point (readings of detector 128A).

FIG. 27A. illustrates curves measured for diffuse, reflected radiation (detector 128A); FIG. 27B illustrates measured curves for the radiation that is diffused in transmission (detector 132); FIG. 27C illustrates measured curves for the radiation that is transmitted without scattering (detector 136).

FIG. 28A. illustrates the differences between the curve of FIG. 27A and those of FIG. 27C. FIG. 28B illustrates the differences between the curves of FIG. 27A and those of FIG. 27B. FIG. 28C illustrates the differences between the curves of FIG. 27B and those of FIG. 27C.

FIG. 29 is a table summarizing system performance verification protocols.

FIG. 30A shows photo arrays arraigned in two open box forms. FIG. 30B is a schematic illustration cartoon of a Fresnel-like scattering pattern of photons that can be seen on the transmission, diffuse receptor (detector 132). FIG. 30C shows an unfolded view of an open box of photo-detecting arrays receiving the Fresnel-like pattern of photons of FIG. 30B. FIG. 30D illustrates one of the photo arrays irradiated by the Fresnel-like pattern of FIG. 30B.

FIGS. 31A, 31B, 31C, 31D, and 31E provide illustrations to a notion of manipulation of the OPO controls to widen the range of the operational wavelengths of an embodiment of the spectrophotometer over a sampling period of time.

FIGS. 32A, 32B, 32C, 32D, 32E illustrate the rotation of the sample cell about an axis normal to the path of the radiation to the sample cell.

Figure 1:
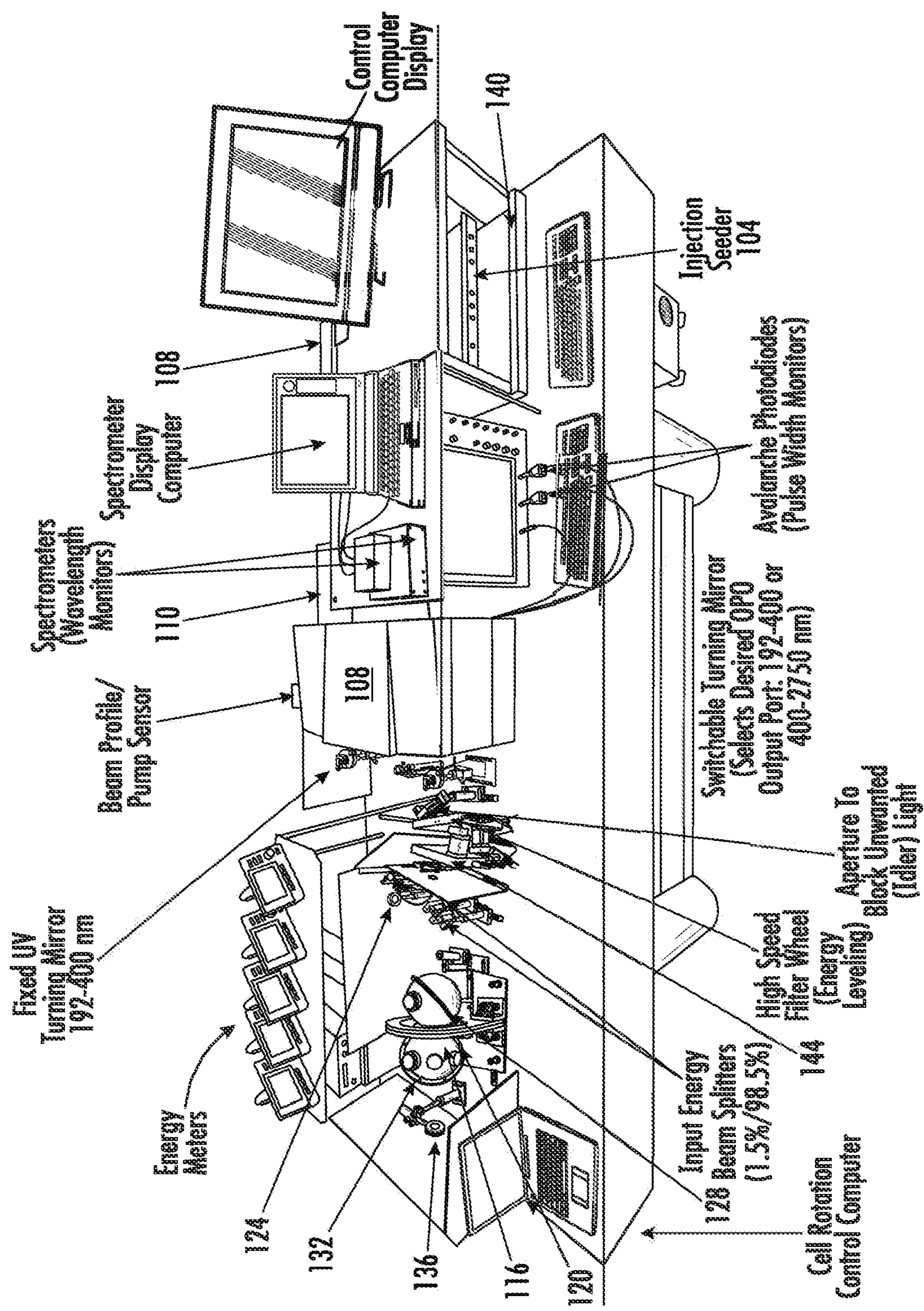
FIG. 1 illustrates an embodiment of the spectrophotometer system of the invention.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

Implementation of the idea(s) of the invention addresses multiple problems that persist in the art related to optical characterization of biological samples (and, in particular, in art of spectrophotometric characterization of such samples), including, for example, the problem of measurement of presence and concentration of a specific material component of the sample on the background of multiple other material components of the sample. In particular, the problem of determining the absence or presence and concentration of material components in vivo and in vitro presents as a time consuming effort. This time is often required when it can least be afforded. Bloodstream infection (BSI) is a major cause of death in developed countries and the detection of microorganisms is essential in managing patients. Despite the major progress that has been made to improve identification of microorganisms, blood culture (BC) remains the gold standard and the first line tool for detecting BSIs. The identification of an antagonist material component without having to culture or incubate a sample to amplify a secondary response (e.g., antibodies or siderophores (a group of small molecules released by bacteria to acquire nutrients)).

In a study presented by Cockerill et al. (Optical Testing Parameters for Blood Cultures, *Clin Infect Dis,* vol. 38, no. 12, (15 Jul. 2004): 1724-30; available at academic.oup.com/cid/article/38/12/1724/304691, for example, out of 37,568 blood cultures, 373 blood cultures were from 36 patients who had infective endocarditis. The specific organisms and a plural number of isolates of the same organism may be recovered from the same patient. As discussed, infective endocarditis included viridans group *Streptococcus* species (n=50), *Enterococcus faecalis* (n=35), *Staphylococcus aureus* (n=29), coagulase-negative *Staphylococcus* species (n=52), *Cardiobacterium hominus* (n=7), group B *Streptococcus* species (n=7), *Enterococcus gallinarum* (n=4), *Enterococcus* species (n=3), *Peptostreptococcus micros* (n=3), *Streptococcus mitis* species/group (n=2), *Candida albicans* (n=1), *Klebsiella pneumoniae* (n=1), and *Pseudomonas aeruginosa* (n=1). From FIG. 25 (containing Table 4 of Cockerill et al.), a person of skill can deduce that longer incubation times provide clearer pathogen identification: with the sample size of 37,568 with ~1% infected, 144 to 166 hours are required to gain a dependable result. A reduction in incubation times can substantively improve patient care and patient outcomes. The use of disclosed embodiments provide the required information in much less time, thereby allowing the diagnostician with better information sooner than in the case of using existing methodologies.

To accelerate the analysis of samples, reference optical fingerprints of the various material components are necessary. Embodiments of the present invention are configured to characterize optical properties of the relevant material components by performing narrow-wavelength measurements over a wide energy spectrum. There are cases where very specific transitions between wavelengths, e.g., where a vibrational mode of a material component causes a sharp transition in absorption or reflection as the wavelength of the illuminating laser shifts from one wavelength to the next. In these cases, using a very narrow wavelength range is critical. In other cases, when the same vibrational modes of the various material components can be activated by a wider range of wavelengths, then a wide range should be recorded in the fingerprint. The disclosed embodiments measure and control this narrow or wide fingerprint range of wavelengths and enables the identification of markers in the spectrum that characterize the analyte. (FIGS. 31A through 31E). As will become apparent to a skilled person, included in these analytes characterization capability of embodiments are the ability to detect changes in index of refraction: by rotating the sample, e.g., with the top moving toward the source and the "bottom" moving away from the source. (FIGS. 32A through 32E).

As will be appreciated by a skilled artisan, various optical analytes of the sample under test react/interact with radiation energy at various wavelengths. Many of these interactions for complex bio-analytes and/or molecules are simply not known or not well understood, especially as far as radiation at which wavelengths interacts with the analytes the most. Because the best, optimal interaction wavelengths are unknown, a broad-wavelength-span spectrophotometer 100 is configured to determine or calculate, with the use of a programmable processor, if and where these radiation-analyte interactions occur. The spectrophotometer system configured to the idea of the invention covers and enables precise optical characterization of biological analytes over a wavelength span from about 192 nm to about 2750 nm in one embodiment (and, in a related embodiment—from about 100 nm to about 10,000 nm).

Figure 2:
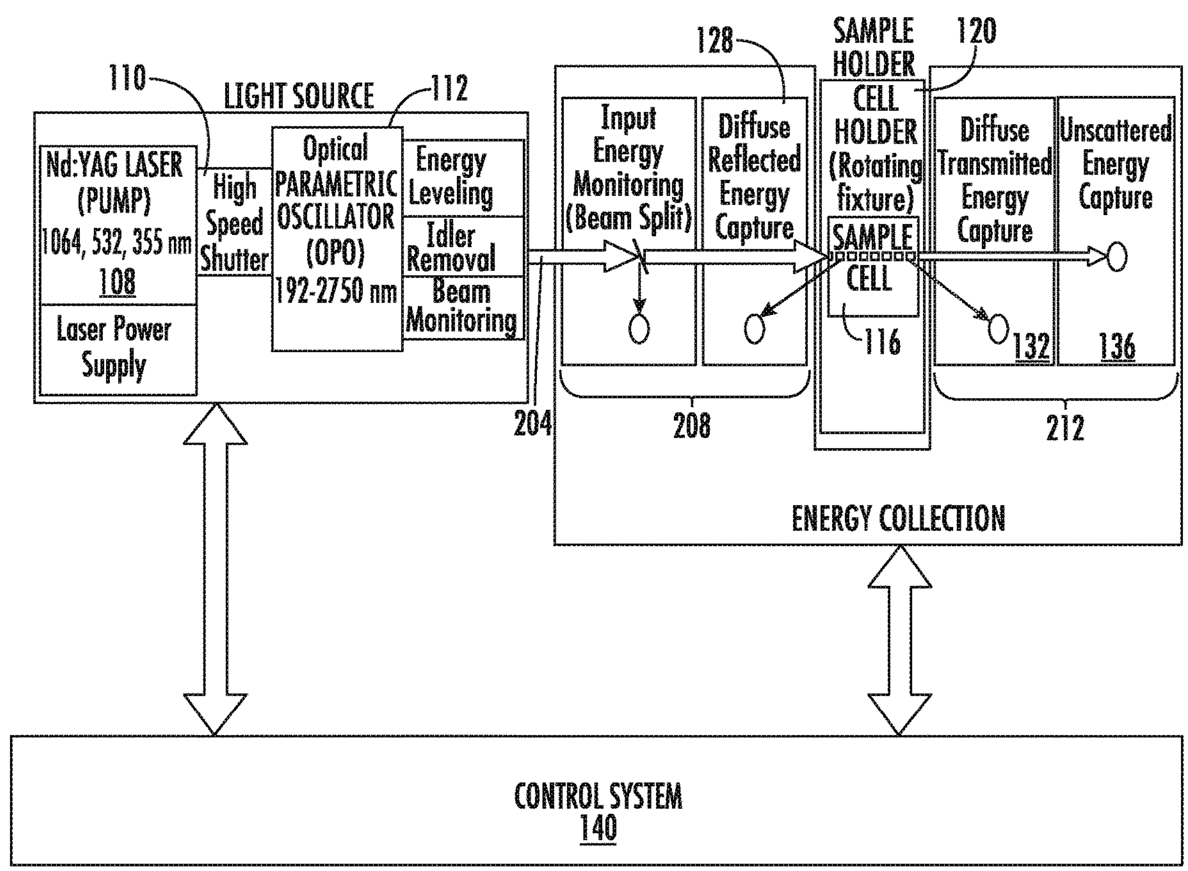
FIG. 2 provides a high-level diagram showing the embodiment of FIG. 1.

An embodiment 100 of the spectrophotometer system (and interchangeably referred to as the MDISS system) is schematically shown in FIG. 1, while a high-level block diagram 200 of it is shown in FIG. 2. The useful radiation with the spectrum covering a broad span of wavelengths is generated in the MDISS system 100 in two primary sections: the narrow-spectral-band pump laser and the optical parametric oscillator (OPO), to which the pump laser is coupled.

In particular, the embodiment 100 of the MDISS employs a source of laser radiation (laser source). Such source can be configured as, for example, a combination of a pump source or injection seeder 104 with a continuous-wave (CW) laser 108. In one non-limiting implementation, the laser source may include as shown Nd-YAG laser equipped with a multiplicity of non-linear harmonic generating sub-systems to generate a laser output at, for example, 1064 nm, 532 nm, and 355 nm in a pulsed regime (for example, 250 mJ 4 ns pulses, with a 0.1 second rate and 62.5 MW peak power and 2.5 W average power).

The generated laser output is passed through the high-speed shiner 110 (for example, an electro-optical shutter) to gate the output pulses prior to delivering them to the OPO 112. For example, radiation from the pump laser 108 at the (tripled fundamental frequency of) at 355 nm is provided as an input to the OPO 112 (along with some energy at 1064 nm energy to aid ultraviolet energy generation). (In one case, the OPO possesses internal wavelength automation features to produce the useful radiation output at about 1 mJ to 70 mJ of energy with 0.25 MW to 17.5 MW peak power and 10 mW to 700 mW of average power and about 9.5 mm diameter spot size). The useful radiation output from the OPO is additionally conditioned (as discussed below, with the use of the energy-leveling and idler removal features of the embodiment) prior to delivering the so-conditioned radiation (shown as 204 in FIG. 2) to the energy-collecting sub-system that, in operation, hosts the sample cell (the test cell, optical cell) 116 appropriately equipped with the cell-repositioning holder 120.

The radiation 204 is delivered through the spatially-separated from one another first energy-collecting system 208 (containing the detectors 124, 128) that precedes the optical cell and the second energy-collecting system 212 (containing the detectors 132, 136) that is disposed downstream with respect to the optical cell 116. The operation of each of the optical cell holder 120, optical cell 116, and the first and second energy-collecting systems 208, 212 is governed by a control electronic circuitry (control system) 140 that employs a programmable processor and tangible, non-transitory storage medium with appropriate program codes loaded thereon.

In one non-limiting case, when the sample of interest is disposed in the inner volume of the optical cell 116, the detector 128 is configured to capture a first portion of radiation delivered to the sample along the axis 216 of the embodiment and diffused at the inner volume (for example, by the sample) in reflection of radiation 204, while the detector 132 detector is configured to capture a second portion of radiation 204 delivered to the space between the first and second energy-collecting systems 208, 212 along the axis and diffused at the inner volume in transmission of radiation. At the same time, the optical detector 124, which is disposed upstream from the system 212, is configured to receive a third portion of radiation 204 delivered to the space between the first and second energy-collecting systems 208, 212 along the axis, and the optical detector 136 is configured to receive a fourth portion of radiation 204 that has been transmitted through the sample or inner volume of the cell 116 without being scattered.

The need for a broad wavelength span testing capability and the fact that many biological samples (including material components/analytes of interest) have limited lifetimes in a test tube or test cell 116 environment, beg a solution to the question of carrying out all the measurements over the entire wavelength range of interest very rapidly. The rapid measurement capability in turn mandates a very high level of automation throughout all elements of the overall MDISS system. As known in related art, in present commercially-available OPO systems the production of the broad wavelength energy span is conducted in segments or bands of wavelength that require the physical movement of specific optical elements inside the OPO through manual intervention, which in turn slows the test process significantly. The present MDISS system has implemented five of these optical wavelength bands, but the movements of the optical components are physically repositioned by an electronic/pneumatic controller that in turn is integrated with the overall OPO control software. The programmable processor of the control system 140 is additionally configured to change the positions of the additional optical components that sweep through individual wavelengths within a given waveband. In one implementation, the overall operational spectral span of wavelengths of the system 100 was uninterruptingly formed by five spectral sub-bands: from 192 nm to 208 nm, from 208 nm to 400 nm, from 400 nm to 500 nm, from 500 nm to 709.4 nm, and from 709.4 nm to 2,750 nm. Thus, the change from one optical sub-band to the next adjacent sub-band, and to individual wavelengths within each sub-band, occurs rapidly, without user interaction, providing significantly shorter test durations. The automation also allows instrument calibration enabling repeatable measurements.

When characterizing concentrations of samples containing oxygenated blood, for example, with the use of a circulating system sample cell, the blood cell integrity begins to degrade—and hence the "fingerprint" properties of blood begin to degrade after about 20 minutes.

Using the pulse laser system, with the control signal calibrated to the wavelength of the emitted radiation, the transitions between each wavelength measured can be accomplished in less than 2 seconds. The automated movement of filters and the handoff between the signal and idler outputs of the OPO add 50-100 seconds for the move and subsequent settling. Without the recalibration and automatized synchronized movements each of these "second" operations become 1-2 "minute operations (60-120× the time between measurements). (The above description does not even take into account the limited human attention span, which in practice lengthens the procedure). According, with the use of existing spectrophotometric system and having an about-20-minute time limit, only 15-20 or so measurements can be taken during the viable lifetime of the oxygenated blood samples.

The pulse laser emits 10 pulses per second. We routinely operate for 2-3 seconds at each λ, collecting 20-30 sample values. For a narrow range of λ, 20 minutes provides time for more than 240 λ settings.

Using the CW laser with the optical switch/shutter, and modified wavemeters in the feedback loop for seed laser bias, pump laser temperature, and OPO angles, within each configuration (λ range) well over 100 successive single-λ or ramped(swept) measurements can be taken per second—this with less damage to the sample due to the average/continuous laser power rather than the pulsed peak power. Allowing for about 1 minute for the automated range changeovers, this tuned system can perform the measurement at over 100,000 wavelengths in a 20 minute period.

In all cases, the strategy of using an embodiment of the invention is to take broad-spectrum measurements, and then spectrally-refine the areas of interest in subsequent runs.

Using the CW system as part of the spectrophotometer embodiment, test samples can be characterized using the optoacoustic, photo array scattering, and tipping angle variations while the sample remains viable.

Figure 3:
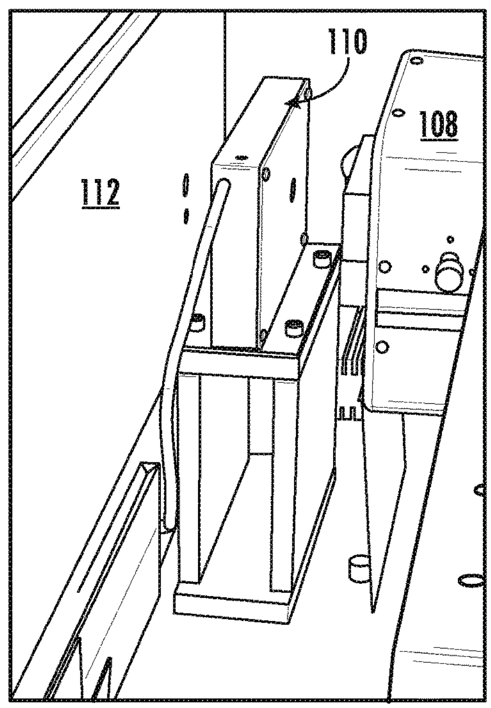
FIG. 3 shows a portion of the embodiment containing the shutter interposed between the source laser and the optical parametric oscillator (OPO).

A well-recognized in related art problem of parasitic irradiation of the OPO (and, therefore, producing parasitic signals at the systems 208, 212 that require compensation and/or cancellation) during the period of time when the OPO is being reset to operate in a different wavelength band is solved by equipping the embodiment of the invention with an automated optical shutter 110 between the output of the pump laser 108 and the input of the OPO 112. The shutter is configured and operable to block energy from entering the OPO while the positions of the optical components are being reset inside the OPO, which is done in advantageous contradistinction with operation of the pump laser—OPO combinations of related art. Blocking the radiation during these structural changes of the system 100 is intended to minimize damage to the optical components inside the OPO 112, while at the same time allowing the pump laser 108 to run continuously (that is, without being switched off) to maintain wavelength stability. Turning off the pump laser 108 (during these OPO internal optical component position changes) and then waiting for the pump laser 108 to stabilize after a restart substantially slows the process of photometric testing of the contents of the optical cell 116. Thus, the automated shutter is a key throughput and damage reduction feature. In FIG. 3, the shutter 110 is shown with its control connection interposed between the source laser 108 and the housing/enclosure of the OPO 112 enclosure. The timing of operation and placement requirements for the shutter 110 are non-intuitive. An OPO 112 is a delicate optical sub-system in the optical path: the crystal lattices of the constituent non-linear crystals are the most fragile parts; when such crystal is damaged, the line width and repeatability of generation of radiation at the same wavelength are compromised. In one embodiment of the invention, where the radiation output from the source 108 is provide to the OPO 112 in a pulsed mode, the embodiment 100 operates the shutter 100 only in between the pulses of the laser 108. If the shutter 110 is opened or closed during an energy/laser pulse, then several undesired results may occur, including extreme variations in power, variations in wavelength, and diffraction of lights towards radiation-sensitive optical elements. (The shutter triggers on a pulse and closes or opens right after a pulse. The operation of the shutter is faster than the period of time in-between pulses. For the CW laser system, a polarizing optical switch is used; available optical switches have a 70 dB discrimination ratio between closed and open modes of operation).

Figure 4:
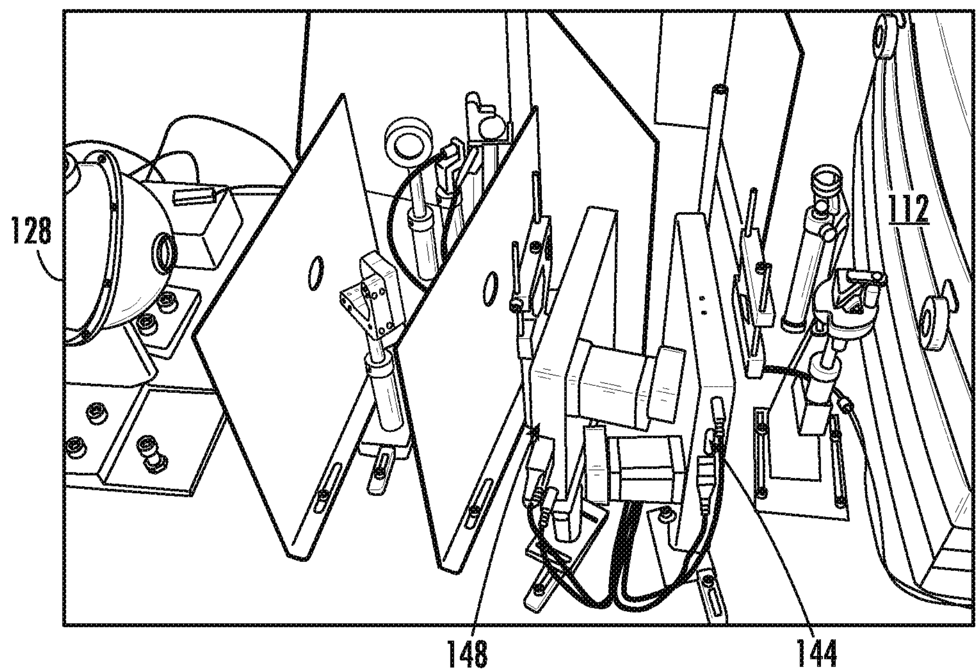
FIG. 4 shows another portion of the embodiment employing two optical filter wheels at the output of the OPO.
Figure 5:
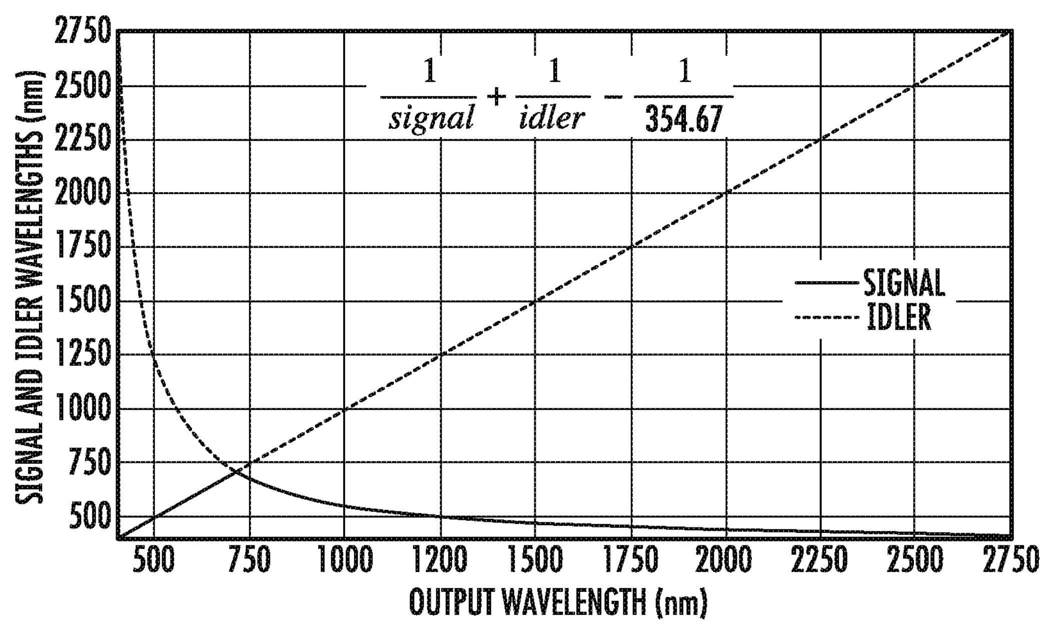
FIG. 5 contains plots illustrating the relationship between the signal and the idler in the radiative output produced by the OPO.

FIG. 4 shows in greater detail a portion of the system 100 of FIG. 1 at the output from the OPO 112. As shown, the radiation source portion of the system 100 further employs, two optical filter wheels 144, 148 that are located at the output of the OPO. The OPO 112 in the wavelength conversion process actually produces two simultaneous radiation outputs: the sought-after/desired portion referred to as the signal, and the additional undesired radiation referred to as the idler. In the embodiment in which the wavelength of the radiation at the input of the OPO 112 is about 355 nm (and more precisely, 1064 nm/3=354.67 nm), the signal and the idler have a wavelength (spectral) relationship as shown in FIG. 5.

The problem of removing the undesired idler energy from the radiation output produced by the OPO 112 is solved with the use of the idler-removing filter 144 (configured, for example, as an automated optical filter wheel).

At the same time, a person of skill in the art will readily appreciate that the useful radiation (the signal) at the output of the OPO 112 (measured, for example, as mean energy of a pulse of radiation) is extremely uneven across the spectrum of the generated radiation. (The example of the empirically-measured spectral distribution of the OPO output is shown in FIG. 5A) To reduce the difference between the maximum and minimum values of the spectral distribution of the signal (which, otherwise, would detrimentally complicate the calibration of the results of the measurements), the embodiment of the system employs the filter 144: the substantially levelled to no more than 11 mJ difference—as compared with the distribution of FIG. 6A—distribution of the OPO's output filtered with the filter 144 is shown in FIG. 6B. FIG. 6C provides several plots that illustrate the pre- and post-filtering characteristics results of implementing filters 144, 148 to eliminate/reduce the idler energy in an embodiment of the invention. Here, depending on the desired wavelength of the output from the OPO 112, at least one of the optical filter wheels 144, 148 were appropriately rotated while a 700-nm longpass portion of the filter 144 was used when desired wavelengths are about 709.34 nm and a 700 nm shortpass filter is used when the desired wavelengths in the output are below this value.

It is appreciated, therefore, that an embodiment of the spectrophotometer system includes an optical filter that is operably cooperated with the optical parametric oscillator and positioned such as to receive radiation exiting the optical parametric oscillator and to limit a maximum level of energy of said radiation delivered to an optical detector through such optical filter.

Figure 7:
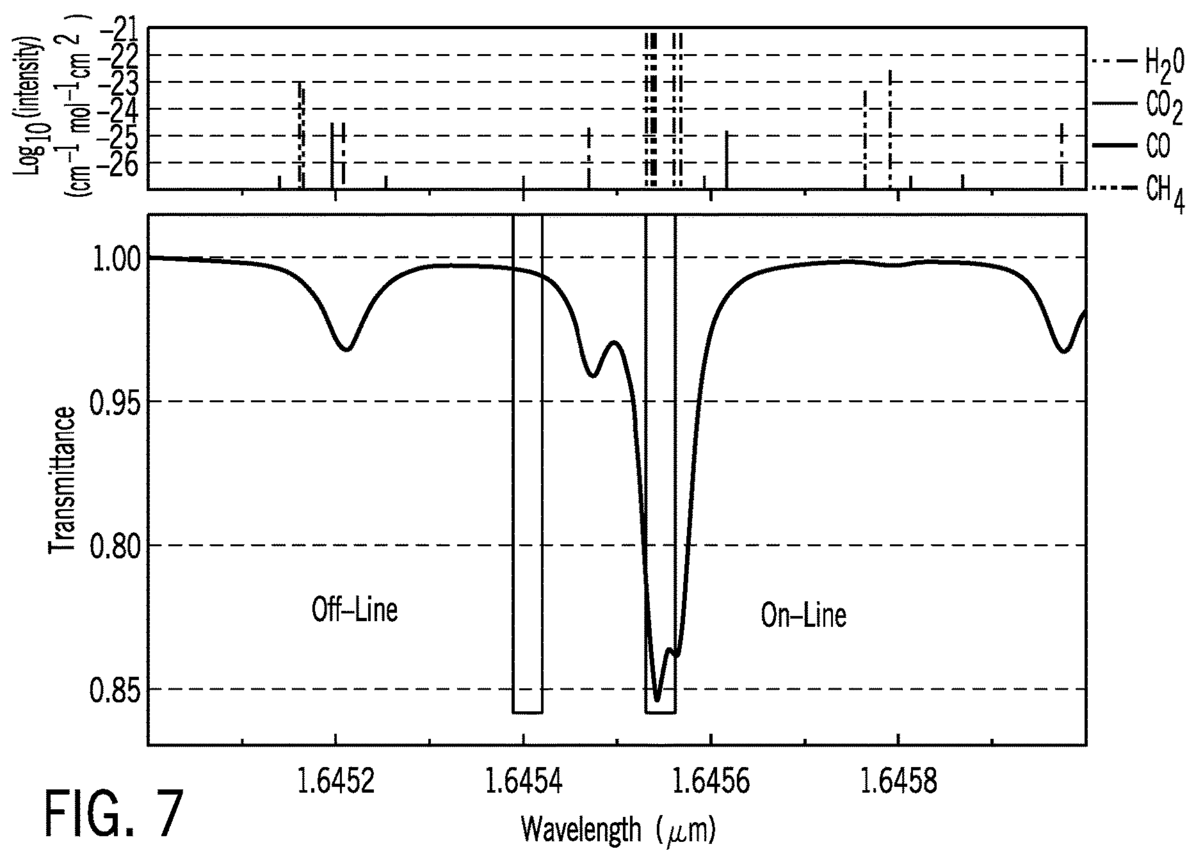
FIG. 7 includes a double-plot representing a portion of the methane's spectral curve and used as an illustration for need in fine wavelength-step resolution capability of an embodiment of the invention. (The upper plot depicts spectral features of the most common atmospheric gases, while the bottom plot addresses methane, specifically.)

Example: A Radiation Source with High Precision of Control of Spectral Linewidth In the discussed configuration, OPO 122 is configured to provide extremely-high wavelength precision over the 192 nm to 2750 nm wavelength span. Typical fine wavelength step resolution is 1 nm, preferably 0.1 nm, but the system has wavelength-step capabilities as fine as 0.01 nm. This precision is required because some optical interactions with certain material components of the sample occur over a very limited wavelength span. One example is provided by methane as illustrated in FIG. 7. Here, the upper panel of FIG. 7 illustrates spectral features of the most common atmospheric gases, while the lower panel illustrates the spectral features of methane on a larger scale. A person of skill in the art will readily appreciate that radiation-methane interactions will not occur if the wavelength of radiation is at 1645.5 nm or at 1645.6 nm, but that the interaction is substantially guaranteed when at the wavelength is 1645.55 nm. Thus, the MDISS system with the fine 0.01 nm step resolution could detect this fine-grained interaction and produce the report representing the concentration of methane in the sample contained in the optical cell 116.

Advantages of the Seeded Laser Source and Advantages of a Comb-Based CW Source.

It was empirically determined that he MDISS system 100 with the broad operational wavelength span and fine spectral step resolution during reversible change of the wavelength of operation across such wavelength span requires one additional feature: the fine control of the optical linewidth (or bandwidth) at the specific wavelengths. Indeed, as a person of skill will readily appreciate, a laser source with a "broad" optical linewidth may "mask" or "hide" a wavelength-sensitive interaction between the probing beam of radiation and the material component or analyte at hand if and when the spectral linewidth of the optical beam is significantly greater than the narrow spectral region of interaction (such as, for example, in the case of methane discussed above). To ensure the spectrally-narrow linewidths of the signal portion of the sample probing radiation 204, the MDISS pump laser 108 is caused to operate in the so-called "seeded" mode. (The seeded mode uses a comb laser which provides a very tight range of wavelengths, <1-KHz. This seed is fed into the pump laser, generating in turn the powered for the measurements, to wavelengths-stabilize the pump laser output received by the OPO. With tight control on the seed laser, the spectral output of the OPO is also tightly controlled.)

Figure 8:
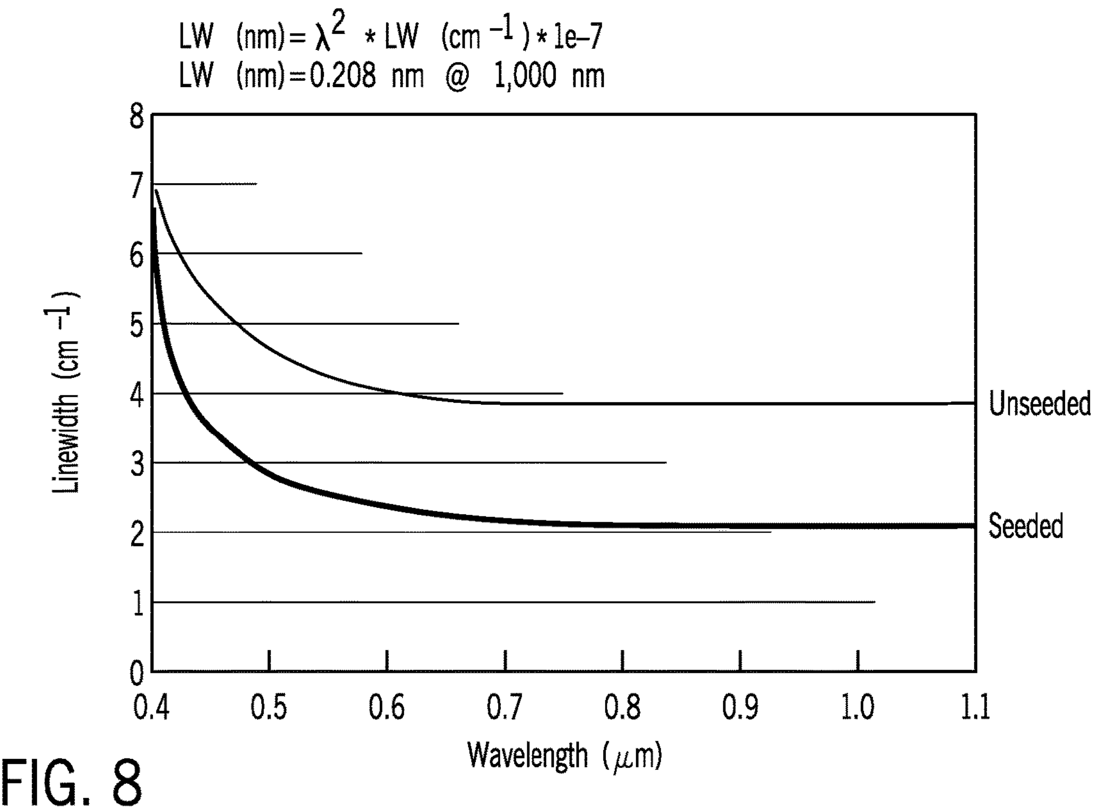
FIG. 8 shows two plots representing, respectively, the spectral linewidth of the radiation output produced by the laser source, of the embodiment, that operates in a "seeded" fashion and that which operates without the injection seeder.

FIG. 8 shows two plots representing, respectively, the spectral linewidth of the radiation output produced by the laser source 108 that operates in a "seeded" fashion and that which operates without the injection seeder 108. It can be observed that the FWHM linewidth of the laser source 108 configured according to the embodiment of the invention is about half of the same source operating in a conventional, unseeded fashion as is typical for related art.

Alternative Configuration(s) of the Laser Source for Use with an Embodiment of the Invention.

The overall energy source discussed above and configured to produce the sample-probing measurement beam 204 utilizes the combination of the a pulsed pump laser with the OPO (preferably with a "seed" mechanism in the pump to narrow the FWHM of each pulse of output radiation), with the peak pump laser power of 62.5 MW over a pulse with duration of 3-5 ns (2.5 W average power) in one implementation. The pulse width at the output from the OPO remains substantially the same. Under some circumstances, however, the pulsed source may not be the optimal choice for performing the measurements, as the following operational problems arise from the use of the pulsed laser source for desired spectrophotometric measurements:

A) Many biological samples(or material components of the samples) have limited lifetimes in a test tube or test cell (optical cell) environment; the pulses with high peak power tend to detrimentally affect—and possibly damage—the samples, which may reduce the accuracy and repeatability of the measurements.

B) The pulses with high peak power may detrimentally affect (for example, physically damage) optical components disposed downstream from the laser source by, for example, thermally generating fractures in the OPO crystals and thermally inducing spalling of material from the front and rear surfaces of other optical components. This damage reduces the accuracy of their optical performance, requiring often replacement.

C) The instantaneous energy in the laser beam may vary from pulse to pulse, which variation necessitates the incorporation into the system of a pulse-by-pulse energy monitoring system, to allow the embodiment of the invention to "level" the pulse-to-pulse variation, and to improve the reliability and repeatability of the downstream measurements. (In absence of the "pulse energy leveling capability" of the present embodiment, the pulse-to-pulse variations in laser energy, and hence in the measured results can be conceptualized as noise. The noise of pulse variation can be partially mitigated by "averaging" multiple measurements. Combining measurements over, for example, 5, 10, 50, or even 100 consecutive and repetitive pulses at the same wavelength, made in rapid succession without excessive impact on measurement time; however, the averaging process still does not mitigate all of the variations and instabilities. Each pulse is understood in the art to be a stochastic event. If an attempt is made to incorporate feedback from the measured output back into the pulse driving mechanism, this will just serve to amplify the noise. If however, the feedback is filtered through an outlier-robust Kalman filter, the pulse generation can be bounded within a normal operating range, and selected outlier energy events can be excluded from the characterization data).

C) As a person of skill will readily understand, each pulse of radiation is typically accompanied by "sidebands" (containing undesirable optical wavelengths; when observed in Fourier space) that effectively add their own contributions to the variability of the downstream measurements, and that must be corrected for.

D) The high power of the source lasers makes the entire system somewhat hazardous for technicians working around the system, which has necessitated the installation of a variety of safeguard mechanisms to shut the system down immediately if the physical and optical boundaries of the system are inadvertently crossed.

While the embodiment of the spectrophotometric system of the invention addresses and at least mitigates most of these problems through mechanical, optical, and software solutions discussed in this disclosure, an alternative to the use of a pulsed pump laser source 108 is to use a continuous-wave (CW) laser source. In this alternative configuration, because the source is CW, i.e., the laser beam delivered to the OPO 112 does not turn on and off, its wavelength stability at any given wavelength is very high, resulting in a beam that does not drift over time. Furthermore, for the same reason, set of optical pulse-dependent sidebands, making the downstream measurements more stable and "pure." In addition, the instantaneous beam power is much lower than that from the pulsed source, rendering the system much safer for the user. The lower instantaneous energy in the CW beam is likely to create much less damage to downstream optical components (in advantageous contradistinction to the use of a pulsed source), thus reducing system down time and repair costs.

Finally, because many of the biological samples are fragile and unstable, using the lower peak power levels will extend the useful measurement lifetime of these analytes. Accordingly, in a related embodiment of the invention a CW laser source is utilized as a source 108. Overall, an embodiment of the spectrophotometer system of the invention includes a source of radiation configured to generate said radiation, at a wavelength within a wavelength range defined from about 100 nm to about 10,000 nm (and, in a specific case from 192 nm to 2,750 nm) that includes (i) a pump laser source or a continuous-wavelength (CW) laser source, and (ii) an optical parametric oscillator disposed to receive an radiative output from the pump laser source or the CW laser source.

Example: Energy Collection System.

Because of the broad wavelength span of the optical source, utilized in the embodiment of the invention, and the desire to perform spectrophotometric tests of a sample in question quickly, manual manipulation and switching among different photodetectors covering different wavebands (that is, spectral sub-bands) would not support the high measurement throughput required for these applications. Accordingly, broadband pyroelectric sensors are used, in one case, to accommodate the MDISS span of 192 nm to 2750 nm. For operation across the broader spectral region (up to 10,000 nm), the related embodiment employed Coherent MaxBlack wideband sensors as detectors 124, 136 that operate over a span from 190 to 12,000 nm. In yet another related implementation, more sensitive sensors or narrowband sensors are introduced to the measurement path using automated turning mirrors. In measurement applications that can benefit from higher sensitivity or specificity, the MDISS embodiment may utilize either or both.

Figure 9:
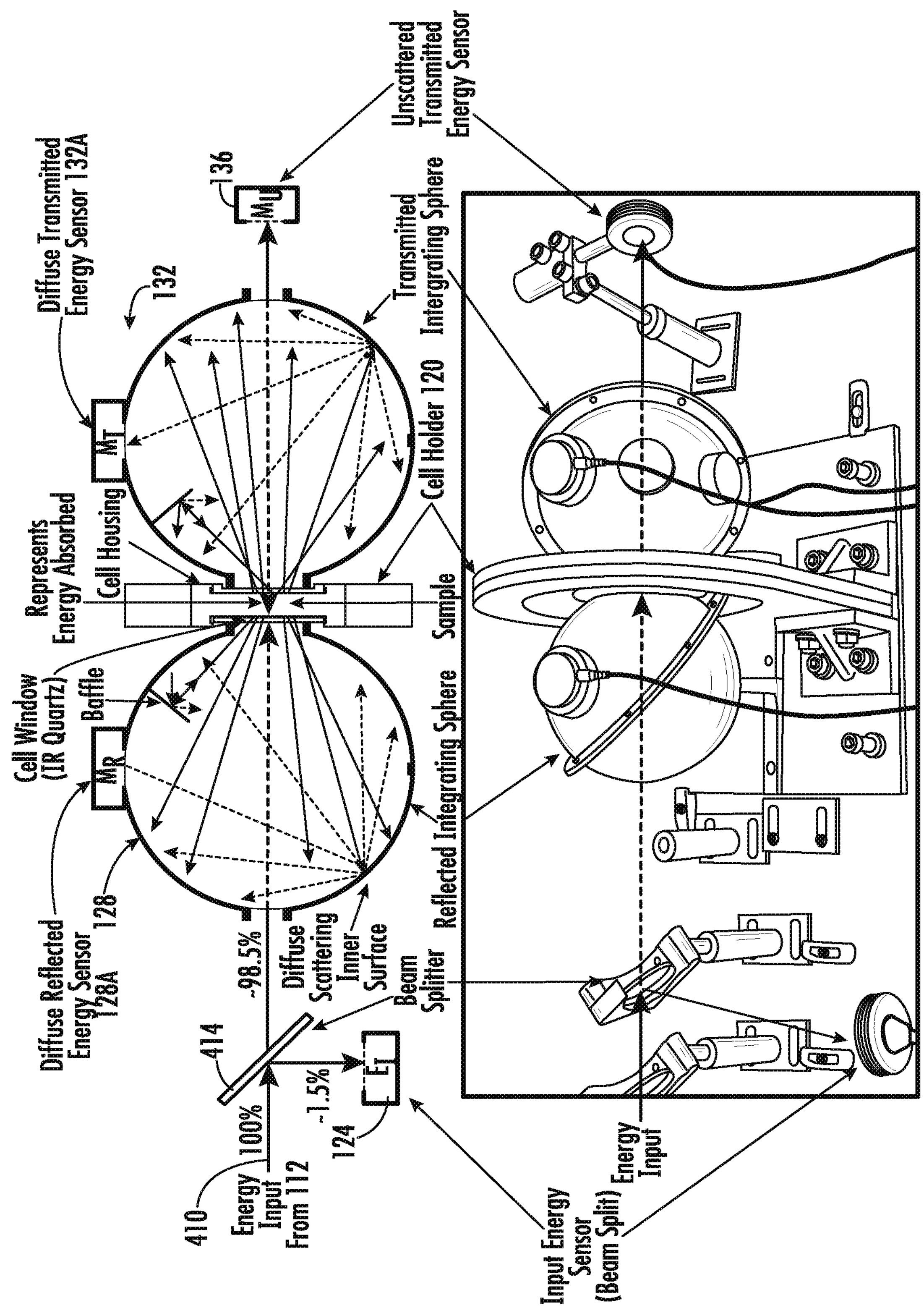
FIG. 9 is a representation of a portion of the embodiment of FIG. 1 shown schematically (in the upper portion of the Figure) and in 3D (at the bottom portion of the Figure) and detailing the use of individual radiation detectors (sensors) with which the energy collection portion of the embodiment is equipped.

In reference to FIG. 9, and in further reference to FIGS. 1 and 2, the overall energy collection system includes a group of several photodetectors operating in tandem. This group of photodetectors is configured to register the optical energy representing the following optical interactions with the contents of the space between the subsystems 208, 212 (for example, with the sample contained in the optical cell 116):

1) Optical energy that travels directly through the sample, essentially on a straight path, before impinging on the photodetector 136;
2) Optical energy that is "scattered forward", i.e., diverges from the straight-line path through the optical system at an acute angle from the straight-line path. The optical detector system 132 (shown in FIG. 9 as a combination of an integrating sphere with the corresponding energy sensor 132A) is configured to perform this operation;
3) Optical energy that is scattered "backwards" from the contents of the inner volume of the optical cell 116, i.e., back in the direction of the optical source itself: . The optical detector system 128 (shown in FIG. 9 as a combination of another integrating sphere with the respectively-corresponding energy sensor 128A) is configured to perform this operation;

Here, the energy of the beam 410 of the output energy from the OPO 112 (which is the beam delivered to the biological sample of interest) is monitored by using a beam-splitting mirror 414, and associated beam split photodetector 124. The beam-splitter 414 is configured to divert nominally about 1.5% of the input energy to the sensor 124; the remaining 98.5% or so is passed forward along the axis of the system. This beam split provision allows the input energy to be monitored on a pulse-by-pulse basis, since the OPO's pulse-to-pulse output energy variation can be on the order of ±10%. (The actual OPO output specification is ±10% for about 99% of the pulses generated at the output of the OPO 112, with even greater excursions for the remaining 1%. This is why the outlier-robust filter is used to eliminate pulses from the data collection stream. There are many non-linear effects at play throughout the optical system, using only the data associated with energy levels within a reduced range improves the reliability of the measurement data.)

The remainder of the energy collection system f two radiation-collecting integrating spheres with respectively-corresponding integral energy sensors, and a sensor configured to collect the unscattered energy in transmission of the beam 410 through both the systems 128, 132 and the cell 116. As has been already alluded to above, the combination of the detector systems 124, 128 defines the first energy-collecting system 208, while the combination of the detector systems 132, 136 defines the second energy-collecting system 212. Notably, the optical detectors 128A, 132A are spatially displaced from the axis of the system, while the first energy-collecting system 208 is configured to transmit the radiation therethrough to deliver radiation to the space between the first and second energy-collecting systems and the detector 136.

The biological sample of interest is preferably disposed in the inner volume of the optical cell 116 that is "sandwiched" between the systems 208, 214. The integrating spheres may be equipped with baffles preventing the sensors 128A, 132A from being directly irradiated with radiation scattered by the contents of the inner volume of the optical cell. The sensors 124, 128A, 132A, 136 are all connected to individual respectively-corresponding energy meters, these, in turn, are connected to the remainder of the MDISS control system 140; this configuration allows the automated data acquisition to take place. (A skilled artisan will appreciate that another, auxiliary, energy meter can be used for pump laser output tests; not shown here.)

Accordingly, an embodiment of the spectrophotometric system of the invention has an axis and includes a first energy-collecting system (that contains first and second optical detectors or sensors disposed to accommodate, in operation, an optical cell system in a space between the first and second optical detectors or sensors, where the optical cell system includes an optical cell having an inner volume dimensioned to enclose a sample of interest) and a second energy-collecting system (that contains third and fourth optical detectors or sensors, the third optical detector or sensor being disposed upstream from the first energy-collecting system with respect to a flow of the radiation towards the space, while the fourth optical detector or sensor is disposed downstream from the first energy-collecting system with respect to the flow). Here, the first optical detector is configured to capture a first portion of radiation delivered to the inner volume along the axis and diffused by the contents of the inner volume in reflection, while the second optical detector is configured to capture a second portion of the radiation delivered to the inner volume along the axis and diffused by the inner volume in transmission. In addition, the third optical detector or sensor is configured to receive a third portion of the radiation delivered to the space between the systems 208, 214 along the axis, and the fourth optical detector is configured to receive a fourth portion of the radiation delivered, in operation, to the inner volume and transmitted through the contents of the inner volume without being scattered.

Figures 30A, 30B, 30C, 30D:
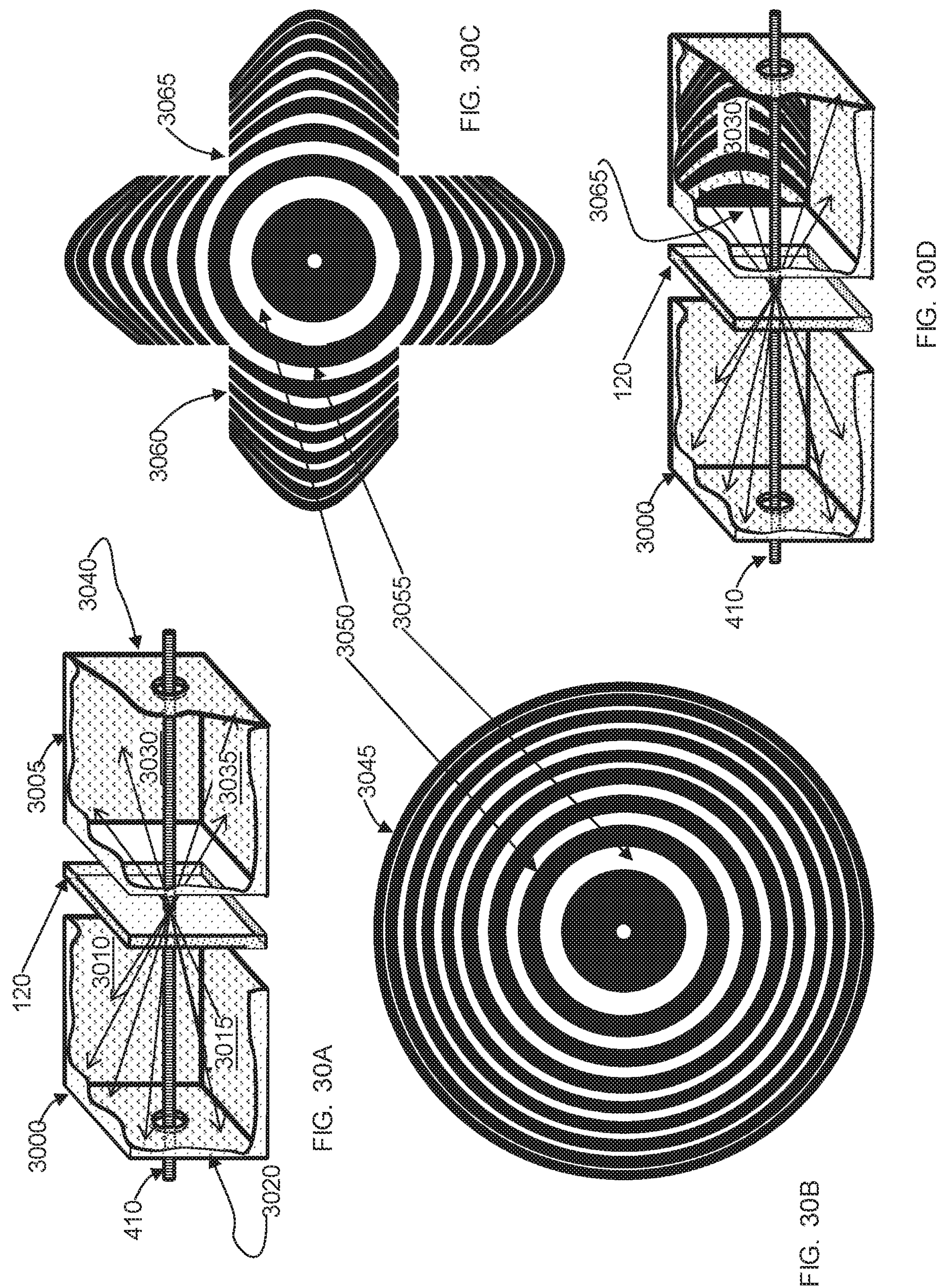
FIGS. 30A, 30B, 30C, 30D are a depiction of a set of photo arrays used as an alternative to the use of integrating spheres in the energy collections sub-systems 208, 212 of the embodiment of FIG. 9. Specifically.

It will be understood by one skilled in the art that particular material components of the sample under test scatter radiation at particular ranges of angles from the illuminating source. For this and other reasons, alternate or alternative forward and backward diffusion energy collectors may be advantageously used. FIG. 30A shows a set of photo-detector arrays. One or both of the integrating spheres can be replaced in the system with, for example the open box construction to collected the diffused radiation that is reflected back from the sample, a reflected photo array 3000, or to capture the transmitted, diffused radiation, a transmitted photo array 3005. These photo arrays are, as were the integrating spheres, juxtaposed with the cell holder 120. The beam 410 enters the back of the reflected photo array 3000, continues to the cell holder 210 where some of the beam 410 will be diffusely reflected back to impinge upon the reflected photo array side wall 3010, (both sides, one shown in cutaway), reflected photo array bottom wall 3015, (and the top), and the reflected photo array back wall 3020. In reference to FIG. 30A, the notations are used as follows: cell holder 120; beam 410; photo array configured to acquire radiation in reflection 3000; photo array configured to acquire radiation in transmission 3005; side wall/bottom wall/back wall of the photo array 3000: 3010/3015/3020; side wall/bottom wall/back wall of the photo array 3005: 3030/3035/3040; Fresnel-like pattern 3045; Fresnel-like dark band 3050; Fresnel-like radiation band 3055; foreshortened Fresnel-like pattern 3060; example panel foreshortened Fresnel-like pattern 3065.

Further the beam 410 passes through the sample in the cell holder, where some of the beam is diffused and subsequently impinges upon the transmitted photo array 3005. The diffused potion of the beam 410 impinge upon the transmitted photo array side wall 3030, (both sides, one shown in cutaway), transmitted photo array bottom wall 3035, (and the top), and the transmitted photo array back wall 3040.

FIG. 30B illustrates in much more contrast than would be usually evident a structured pattern that would be characteristic of a particular class of material components. The fresnel-like pattern 3045 is a sharp-focus example of a pattern that may be caused by the passage through, or the reflection back from the measured sample. This illustrated pattern consists of concentric alternating tori of fresnel-like dark band 3050 and fresnel-like radiation band 3055.

FIG. 30C is an illustration of the distortion a Fresnel-like pattern 3045 would cast upon an open box of photodetectors, i.e., the foreshortened Fresnel-like pattern 3060, with an example panel foreshortened Fresnel-like pattern 3065. FIG. 30D is the same as FIG. 30A, with the addition of the example panel foreshortened Fresnel-like pattern 3065 as it would appear on the transmitted photo array side wall 3030.

It will be appreciated that other geometries of photo arrays can be used, and that transforms that take into account the distortion and sin angle lighting effect can readily be performed. When a photo array is operated in a unit such as the spectrophotometer, an increased dynamic range may be achieved by using multiple periods between reading the photo array. As an example, charge-coupled diodes (CCDs) integrate the radiation that impinges on its receptor. When the radiation is bright, the CCD will saturate quickly, providing no additional detail after the saturated level. If the CCD is scanned/read more frequently, then it will resolve brighter levels. With dim illumination, the period can be extended, providing a longer integration time.

Regarding the very precise linewidth of the laser/OPO/filter system, as has been described above, there are many times where the precision of the fine linewidth is useful. When a sharp distinction in measurement is detected, it may be in one of many categories. Two of those categories of interest here are: a) when the sharp step holds over many samples and orientations, and b) when the sharp step is at different wavelengths over many samples and orientations. In case a, the precision of the wavelength and narrowness of the linewidth is a great advantage to developing robust "fingerprints." In case b, if a range can be found which captures the transition over many samples and orientations, then the spectrophotometer system can operate over that range while taking a single measurement.

Examples of Embodiments of Sample-Holding Systems Incorporating Optical Cells (Test Cells, Sample Cells).

Variability of Clear Aperture and/or Thickness of an Optical Cell.

In practice of required spectrophotometric measurements, a wide variety of biological samples need to be tested. These samples have widely varying optical characteristics, in turn requiring different optical path lengths. For example, a very turbid biological sample would likely have high scattering effects and very high attenuation for the unscattered energy. This turbid sample would thus be best evaluated using a test cell with a short path length. At the other extreme, a virtually transparent sample would be likely to produce minimal scattering and minimal attenuation for the unscattered energy, and thus would be best evaluated using a long optical path length test (or optical) cell The longer path length provides more interaction distance to allow scattering and other types of optical interactions to take place.

Figure 10:
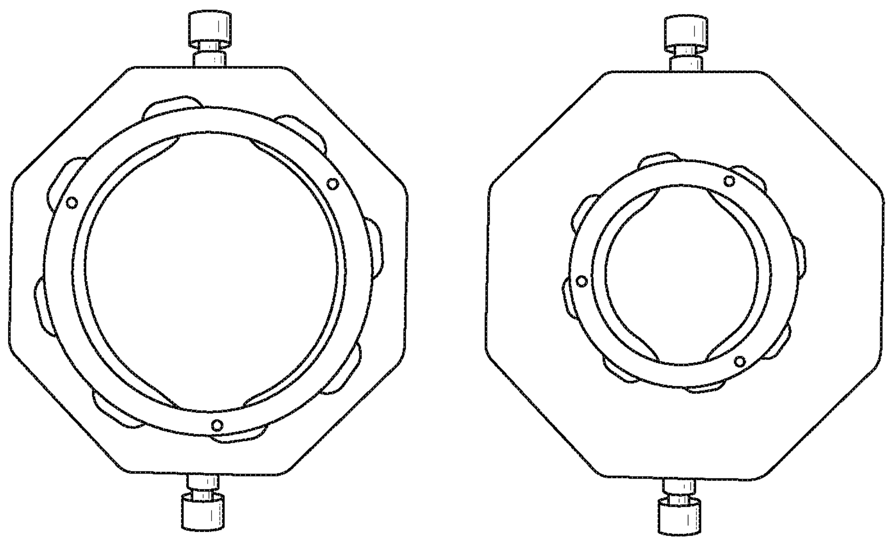
FIG. 10 presents examples of identified components of optical cells (test cells, sample cells) used in operation with an embodiment of the invention.
Figure 11A:
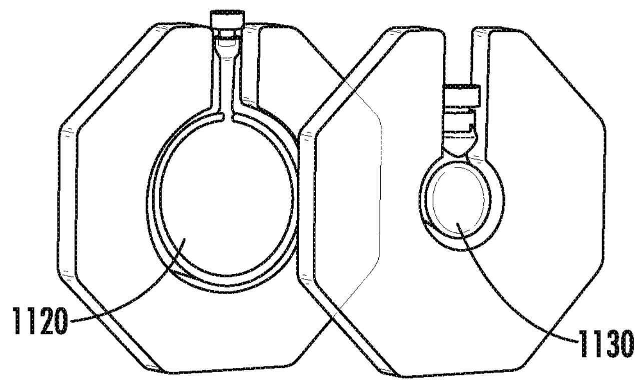
FIG. 11A, 11B illustrate the set of adapter spacers and sealing O-rings and cuvettes for use with optical cells in one embodiment of the invention.
Figure 11B:
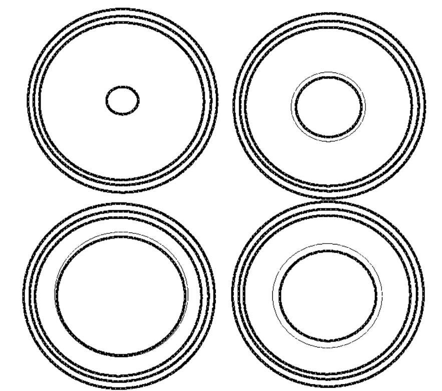

The MDISS system 100 utilizes multiple types of custom sample cells with various optical path lengths, various sizes, and various cell body types. FIG. 10, for example, depicts non-limiting implementations of two different test cells that have a Polyether Ether Ketone (PEEK) body and two different clear diameters of 63.5 mm and 40 mm. Both cells as shown have the same 1 mm path length, but different cells with a range of path lengths (defined by a set of spacer rings of different thicknesses) are generally used. Additional technical details for a typical optical cell of an embodiment of the invention include two optical windows, two O-rings (spacer rings), two locking rings and two Luer lock fitting assemblies. In reference to FIGS. 11A, 11B, the set of adapter spacers 1110 appropriately equipped with sealing O-rings, in one non-limiting case includes polycarbonate spacers accommodate standardized commercially-available 50 mm and 22 mm diameter cuvettes 1120, 1130, which are available with path lengths spanning from 0.1 mm through 100 mm. These adapters allow the use of the different sizes and path lengths of commercially available cuvettes. Even longer path length cells of 10, 20, 50, and 100 mm provide alternative embodiments of the optical cells (the bodies of the cells may be made of steel).

Optical Cell Housing and Accommodation of Optical and Electrical Ports.

Figure 12:
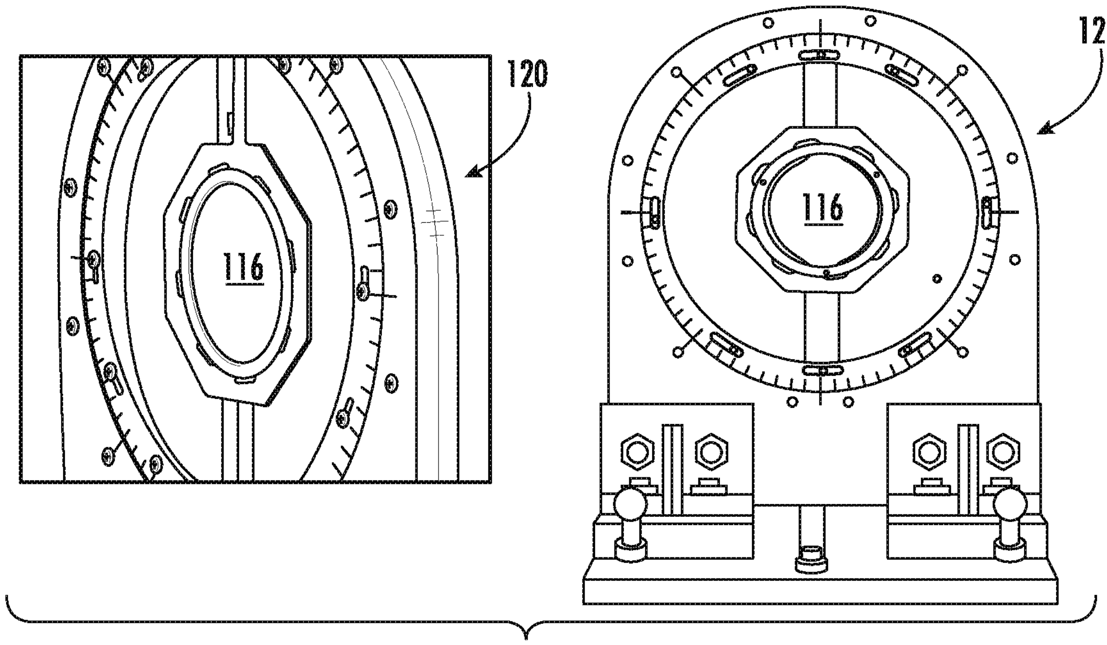
FIG. 12 contains two views of an embodiment of an optical cell affixed to the rotatable sample holder.

In addition to the test cell themselves, a cell holder 120 that provides for cell rotation while test are being performed, is part of the MDISS system 100. Continual rotation of the sample cell is required to assure that—when the liquid biological sample is used—the sample remains dispersed to prevent settling of suspended components (as a non-limiting example: in the case of blood, the red blood cells and platelets must remain suspended and dispersed during the spectrophotometric measurement). The cell holder is shown in two different views in FIG. 12: cell 116 can be rotated at user-controlled speeds and/or the cell 116 can be rotated at the user-selected angles of rotation, with optionally pre-defined dwell times—whether manually or automatically, with control of the system 140.

Figure 13:
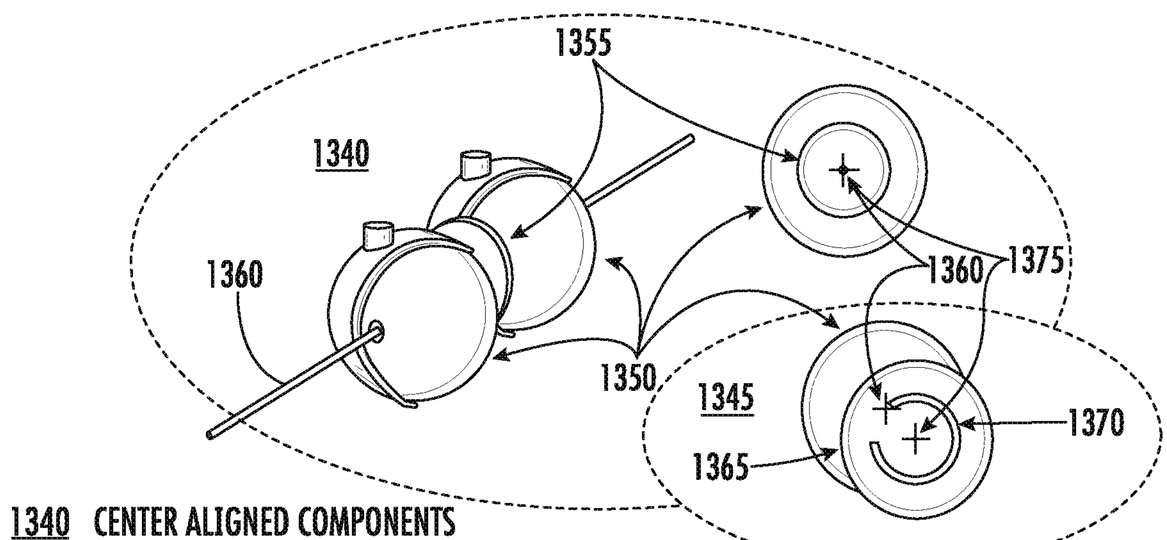
FIG. 13 illustrates two versions of alignment of an optical cell (affixed in a rotatable cell holder, not shown) with respect to the optical path of sample-exciting radiation beam that passes through the energy collection portion of an embodiment without being diffused (that is, substantially along the axis of the embodiment). Portion 1340 of the illustration shows the centers of the optical cell and the axis aligned. Portion 1345 shows the rotational center offset from the undiffused optical path (axis). The spatial offset, when present, leads to the higher degree of spatial distribution of energy used for measurement over a given sample, as compared with the axially-aligned situation.

The schematic diagram of FIG. 13 illustrates a centered, potentially rotating, test cell and an off-centered rotating test cell. As can be seen, the undiffused and intentionally made off-centered radiation track, 1370, uses a larger area of the surface of the sample within the test cell, minimizing the effect of the measuring beam on the sample.

Figure 14A:
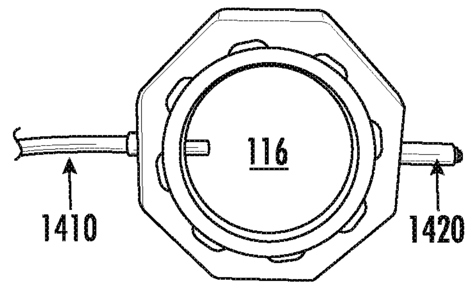
FIGS. 14A, 14B provide complementary views of an optical cell with a fiber probe and/or photo-acoustic transducer cooperated with the housing of the cell.
Figure 14B:
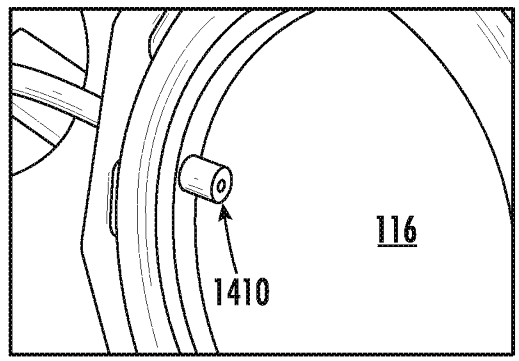

Other specialized related embodiments cells and cell holders have been engineered to allow for biological sample fluorescence measurements as well as photo-acoustic (sound generation when energy is absorbed by the sample) measurements. In one non-limiting example, capability to acquire and/or transmit the fluorescent signal to and from the inner volume of the cell 116 is illustrated in FIGS. 14A, 14B, showing a fiber optic probe or fiber cable 1410 is inserted through a specially incorporated port on the side of the wall of the cell 116, and an acoustic transducer 1420 disposed through the sidewall of the cell in a similar fashion.

Figure 15:
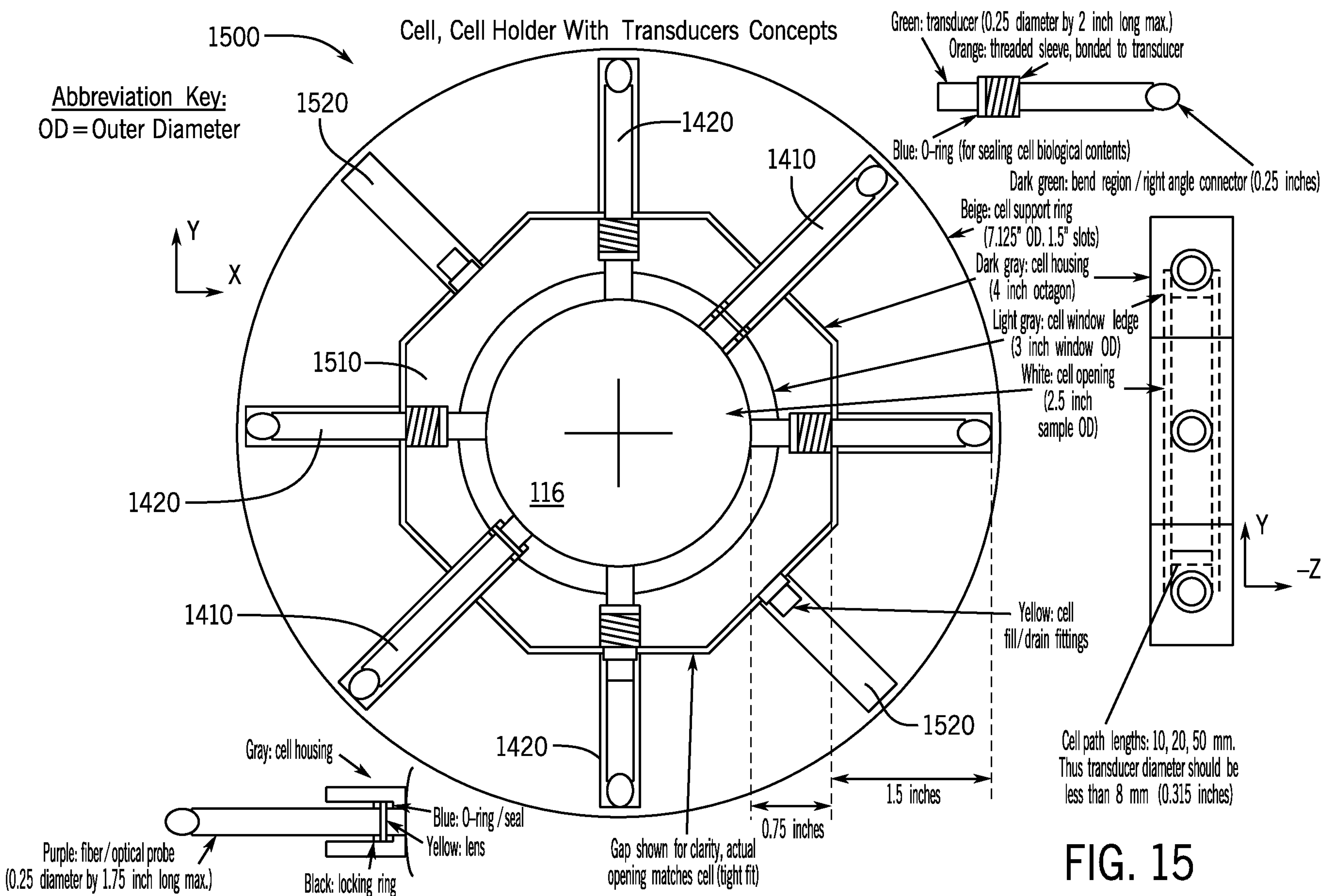
FIG. 15 is a schematic diagram representing an embodiment of an optical cell employing multiple integrated fiber-optic channels and/or transducers for optical and/or photo-acoustic acquisition and detection of response of contents of the inner volume of the optical cell to irradiation with the excitation energy delivered to the inner volume with the use of an embodiment of the invention.

A schematic depiction of an embodiment of the test cell system 1500 equipped with multiple sidewall transducers and fiber-optic ports is presented in FIG. 15. The left-hand side of FIG. 15 illustrates the front view of the embodiment, while the right-hand side of FIG. 15 illustrates a side view of the housing of the optical cell only. In this non-limiting example, the cell housing 1510 of the embodiment 1500 (characterized by the octagonal outer edge and enclosing the cell 116) also encloses, at least in part, two fiber-optic cables or elements 1410 (each supplemented with an appropriate seal configured to contain the biological contents of the cell 116 in the inner volume of the cell 116 and to fluidly seal the respectively-corresponding port or opening in the peripheral surface of the cell that is dimensions to accommodate such cable or element 1410). The housing 1510 (nominally including a housing base 1510A and a housing cover 1510B, addressed later in FIG. 17) is shown to further accommodate four opti-acoustic (photo-acoustic) transducers 1420 (also equipped with appropriate fluid seals). These four transducers are disposed in pairs in two mutually-perpendicular planes both of which are transverse to the face of the embodiment 1500 (that is, transverse to the plane of FIG. 15) and are at an angle with respect to each of the fiber-optic elements 1410. Additional inserts to FIG. 15 illustrate schematically the mounting of the fiber-optic elements 1410 and the mounting element (a threaded sleeve, in this example) of the transducer 1420. Two auxiliary ports labeled as 1520 and disposed in a diametrically-opposed fashion with respect to one another, in a plane substantially parallel to the plane of a window-plate of the optical cell 116 (as shown in the left-hand side of FIG. 15—in an xy-plane) provide place holders for additional communication with the inner volume of the cell 116.

It is appreciated, therefore, that an optical cell system that, in operation of the embodiment of the spectrophotometer of the invention is disposed between the first and second energy-collecting systems 208, 214, may include the optical cell containing first and second optically-transparent plates spatially-coordinated with one another to define the inner volume that is substantially fluid-impenetrable. Such optical cell system may additionally a photo-acoustic transducer positioned in operable cooperation with the inner volume of the optical cell to generate a photo-acoustic signal (where the photo-acoustic signal represents a photo-acoustic response of contents of the inner volume irradiated with the radiation delivered to the content in transmission through the first energy-collecting system and through at least one of the first and second plates, Alternatively or in additional to that, the optical cell system may contain an optical port configured to establish an optical communication, between the inner volume of the optical cell and an ambient surrounding the optical cell in a plane (or along an auxiliary axis that is) substantially parallel to the plane of the first plate, while at the same time maintaining the inner volume substantially fluidly sealed. (In a specific case, such optical port is equipped with a fiber-optic element dimensioned to receive and transmit fluorescent radiation, generated inside the inner volume.) Alternatively or in addition to that, the optical cell system may include an optical cell holder dimensioned to house the optical cell to provide for a controlled angular displacement of the optical cell in a plane of the first plate and with respect to the axis of the spectrophotometric system. Furthermore, the optical cell system may additionally or in the alternative include a set of spacer rings dimensioned to be disposed between the first and second plates along a perimeter of the inner volume. (Here, the spacer rings from the set having different thicknesses to vary the optical path of the inner volume along in a direction perpendicular to the first and second plates of the optical cell.

It is appreciated, therefore, that embodiments of the invention provide an optical cell system. Such optical cell system has an associated axis and includes a first optical cell (formed at least in part by first and second optically-transparent plates spatially-coordinated with one another to define a substantially fluid-impenetrable first inner volume of the first optical cell) and at least one of (a) a photo-acoustic transducer in operable cooperation with the inner volume to generate a photo-acoustic signal that represents a photo-acoustic response of contents of the inner volume that have been irradiated with excitation radiation delivered through at least one of the first and second plates, (b) an optical port configured to establish an optical communication (transfer of an optical signal) between the inner volume and an ambient surrounding the optical cell in a plane substantially parallel to the plane of the first plate, while at the same time maintaining the inner volume substantially fluidly sealed, (c) an optical cell holder dimensioned to house the optical cell to provide for a controlled angular displacement of the optical cell in a plane of the first plate and with respect to the axis; and (d) a set of spacer rings dimensioned to be disposed between the first and second plates along a perimeter of the inner volume, said spacer rings from the set having different thicknesses. The first inner volume typically has a first dimension along the axis and is defined by the first and second optically-transparent plates and a first ring spacer disposed between the first and second plates along a perimeter of the first inner volume, each of the first and second plates being subjected to a corresponding force directed along the axis. Substantially in any implementation, the first cell may be configured as a hyperbaric cell to maintain an integrity of the first cell and the first inner volume substantially unchanged at a hyperbaric pressure of at least 450 psi. Substantially in any implementation, the first cell may be configured as a hypobaric cell to maintain an integrity of the first cell and the first inner volume substantially unchanged at a second pressure applied towards a center of the first inner volume, the second pressure being a sub-atmospheric pressure. The first optical port may contain a first fiber-optic element dimensioned to capture fluorescent radiation generated inside the first inner volume. Alternatively or in addition, an optical length of the optical cell may be adjustable.

In any of the above cases, the optical cell system may further include a second optical cell including third and fourth optically-transparent plates spatially-coordinated with one another to define a substantially fluid-impenetrable second inner volume. Here, at least one of the following conditions is satisfied: the optical cell system comprises a second photoacoustic transducer, configured to establish acoustic communication between the second inner volume and an ambient medium surrounding the second optical cell; the optical system comprises a second optical port configured to provide an optical communication between the second inner volume and the ambient surrounding the second optical cell while maintaining the second inner volume fluidly sealed; and the second optical cell is configured as a hyperbaric cell to maintain an integrity of the first cell and the first inner volume substantially unchanged at a hyperbaric pressure of at least 450 psi. When the second optical cell is present in the optical cell system, the first and second optical cells generally differ from one another Alternatively or in addition—an in any of the above-identified cases—the optical cell system may additionally include a heating-and/or-cooling element in thermal contact with an optical cell of the optical cell system (such element configured to change a temperature of an inner volume of the optical cell at hand). Alternatively or in addition, an optical cell of the optical cell system may be configured to define a corresponding inner volume a surface of which is substantially biocompatible.

Example: Adaptation of the Embodiment to Measurements of a Pressurized Sample

As an example of adaptation of the embodiment of the invention to specific conditions of the measurements of the analytes, as dictates by the needs of industry. In one example, related industry has used mixtures of breathing gasses for deep "free dives" (carried out not in a hard-suit). In such cases, the breathing units can be either so-called "open-circuit" self-contained underwater breathing apparatus (SCUBA) in which exhaled gas is expelled into the water; or, for example, "rebreathing units", in which the exhaled breath is circulated through a "scrubber" to remove carbon dioxide.

The known status of deep "free-dives" activities is as follows. Because of well-recognized physiological constraints that have been known in industry for many decades, the maximum safe partial pressure of oxygen is approximately 1 atmosphere (1 bar). Unmixed air contains 21% $O_2$ and 79% other gasses (mostly nitrogen). As the depth of the dive increases, with the attendant addition of water pressure, this 21% or 0.21 bar of oxygen content/pressure in the gas mixture increases to 1 bar when the total pressure is ~4-¾ bar at an approximate depth of 125 ft. The remainder of the gas, to equal the outside water pressure, must be another "inert" gas such as nitrogen or helium. At depths greater than roughly 100-150 feet, nitrogen cannot be used because its presence creates neurological problems commonly referred to as nitrogen narcosis, and/or "the bends" (these are two different phenomena). To address this problem, helium is conventionally used as the mixture gas for all deep dives, in both open-circuit and rebreather systems, for several reasons. Helium does not create the narcotic effects that nitrogen does, and because of its volatility (i.e., its high "vapor pressure"), is "washed out" of tissue faster than nitrogen during decompression.

Finally, it has always been assumed—not known—in related industries that helium, as a recognized "inert" gas, even under high partial pressures, has no effect on the oxygen-carrying and oxygen-loading behavior of hemoglobin. However, this last assumption has never been proven or disproven, because no system and/or methodology existed in related art to practically measure the oxygen interaction properties of hemoglobin at hyperbaric pressures under controlled, in vitro laboratory conditions. This information is practically needed, because if it were confirmed that helium does not affect the oxygen-binding properties of hemoglobin at hyperbaric pressures, then the so-called "dive tables" currently used for mixed-gas diving at great depths would not require any modification. Conversely, if it were shown that helium does affect oxygen-loading onto hemoglobin at high partial pressures of helium, then it might be advantageous to modify the existing standard dive tables to account for these hyperbaric effects on the diver's blood. In addition, this information could lead to shorter decompression times, possibly yielding significant cost and time savings. Several specialized industries maintain "divers under pressure" for weeks at a time. They do this to avoid the time-cost of decompression/recompression and its attendant risks, especially in proceeding to quickly. The return on investment of improving the understanding of the properties can be in the millions of dollars per day per team.

An embodiment of the invention addresses this problem by providing a measurement system adapted for carrying out the hyperbaric measurements for better, more precise prediction of the effects of human hyperbaric-pressure operations. A hyperbaric embodiment of the invention allows for accurate characterization of characteristics (for example, concentrations) of various hemoglobin species (such as $O_2$Hb, Hb, COHb, MetHb, and rHb) in human blood across a wide optical spectral range at hyperbaric pressures, to answer the above questions and, in particular, where there exists an unknown interaction between hyperbaric helium and hemoglobin when blood is exposed to elevated pressured under deep-sea diving conditions. Specific embodiments of hyperbaric optical cell systems were designed and tested with respect to mechanical stresses that would be caused under "deep free diving" conditions, to ensure safe functionality of the hyperbaric optical cells up to the 450-psi target pressure (thereby representing a pressure at the sea-depth of about 1,000 feet). Post-fabrication, the hyperbaric cells were tested under controlled conditions, again up to 450-psi.

Hyberbaric Optical Cell System.

Figure 17:
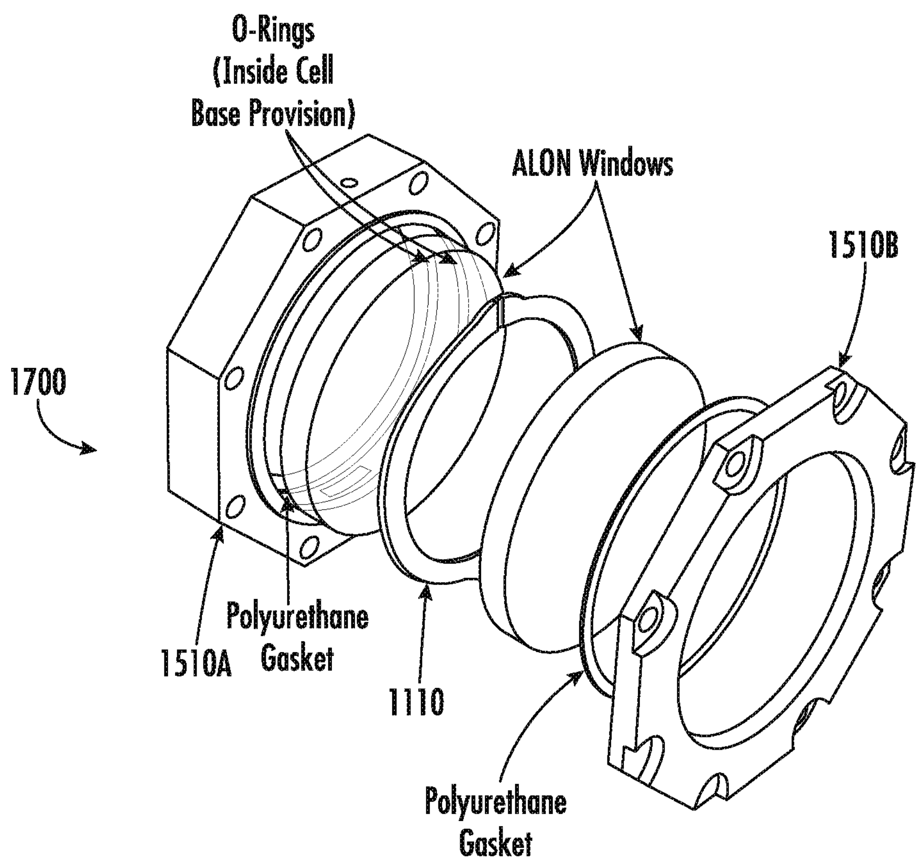
FIG. 17 offers an exploded view of an embodiment of a hyperbaric optical cell for use with an embodiment of the invention.

FIG. 17 presents an exploded view of the embodiment 1700 high-pressure optical cell. A typical embodiment of the optical cell of the invention includes a 76.2 diameter by 7.67 mm thickness transparent ALON ceramic window plates, an appropriately dimensioned Teflon spacer 1410, and supporting gasket /covers housed on the micropolished, biocompatible stainless steel body (1510A, 1510B). A person of skill will readily recognize that the optical path (defined by the thickness of the inner volume) of a given cell may be judiciously adapted to provide for high-precision measurements of a given sample. For example—in comparison of two assembled high—pressure cell systems, one having a 1.1 mm optical-path-length cell system (~3.48 mL inner volume) and another 50 mm path length (~158.26 mL inner volume), the shorter path length cell is configured to be suitable for high-dispersion measurement of fluid samples such as blood. The cell with increased path length is required for measurements of low-dispersion fluid materials such as pure gases, for example, as, understandably, the longer path length provides more interaction distance, which in turn provides higher measurement sensitivity. The optical cell systems are additionally equipped with heating/cooling elements and temperature control provisions (not shown) to allow high pressure tests to take place at body temperature (37° C.) or at other pre-determined temperatures. The ability to control the temperature of contents of the inner volume of the test cell is considered to be important in order to perform accurate tests and characterizations that match the in vivo environment.

Embodiments of the invention also solve additional problems that persist in spectrophotometric measurements performed with systems of related art by providing multiple infrastructure capabilities to support the high-pressure characterization of blood, other body fluids, and various gases. In particular, one embodiment of the invention is complemented with an apparatus configured to vary a degree of oxygenation of a fluid sample such as blood. In practice, before or during the measurements of the fluid sample, the oxygen gas is first passed through a chamber/bubbler to convert the "dry" gas to a "wet" gas before it is caused to pass through the fluid sample (in one non-limiting example—blood). The wet oxygen gas bubbles through the fluid sample reservoir, which in turn is heated to 37° C. and agitated to enhance gas exchange in the blood. The now-oxygenated fluid sample is then loaded into the high-pressure test cell (such as cell of the system 1700) in a controlled manner to ensure the desired oxygenation value. The oxygenation value is verified with a peripheral calibrated commercial blood gas analyzer system. The infrastructure required to support pressurization of a fluid sample in the test cell (while characterization tests are being performed) includes at least an appropriately operationally-cooperated gas tank (with the gas of interest, such as N2, He, CO, CO2, or other gases) connected to the appropriate pressure regulator(s) and gauges and then to the inner volume of the high-pressure test cell loaded with the fluid sample of interest, through a network of flow rate valves; bleeder/safety valves; and a precision pressure gauge. Accordingly, substantially any embodiment of the spectrophotometer system of the invention includes one or more of (a) a temperature-control circuitry operably cooperated with the optical cell to change a temperature of the inner volume of the cell to a predetermined temperature; (b) an oxygenation apparatus configured to transmit oxygen, in operation of the spectrophotometer, through an inner volume of the optical cell (which may contain a pre-loaded sample of interest) to achieve a predetermined level of oxygenation of contents of the inner volume; and (c) a source of pressurizing gas and a network of gas passages fluidly connecting the source of pressurizing gas with the inner volume to elevate a level of internal pressure inside the inner volume (here, the optical cell is structured to maintain its mechanical integrity substantially unchanged at a hyperbaric pressure of at least 450 psi).

Hypobaric Optical Cell System.

A person of skill will appreciate that, in a related embodiment, the spectrophotometric system can be adopted to perform a hypobaric measurements, where the inner volume of the optical (test) cell is maintained at sub-1-atmosphere pressure. The results of such measurements provide characteristics of analytes in a fluid sample of interest at lower pressures, mimicking, e.g., high altitude environments, typically experienced by aircraft crews at high altitudes. As temperature, G-forces, and pressure vary for a high performance person at high altitude, the ability of the blood to deliver oxygen is often compromised. The embodiment of the spectrophotometer utilizing with hypobaric optical cell system can be configured as a portable instrument (a body-worn unit) to perform the measurements with more than one sensor located at different location on the body (ear lobe, extremities, e.g., foot/toes, and core, breastbone).

Example: Rapid Quantitative Measurement of Bacteria, Viruses, and Non-Prescribed Drugs in as-Drawn Blood Samples.

The ability to rapidly detect and specifically identify blood-borne pathogens in patients with life-threatening septicemia can mean the difference between life and death for these patients. Examples are provided by known in related art massive blood-borne septicemic shocks caused by *Streptococcus pyogenes*, and inability of existing methodologies to identify the bacterium by means of a blood draw and culturing (which takes multiple hours) prior to expiration of the patients. The earlier that the specific pathogen is identified, the sooner the correct, targeted antibiotics can be delivered to the patient to suppress the bacterium. If the concentration ("titer") of bacteria in the patient's blood is sufficiently high to detect immediately, antibiotic treatment can begin immediately. However, if the bacterial titer cannot be detected on the initial blood draw, the patient may be too compromised to recover, or will be hospitalized for a considerable duration. Conversely, if the bacterial titer is too low a level at initial blood draw to measure using present laboratory methods, the bacteria will be "cultured" (grown) in the clinical laboratory for many hours, in some cases up to 72 hours. This "culturing" increases the bacterial count significantly, because for many blood-borne pathogens the bacterial doubling time is roughly 20 minutes. For example, 10 hours of culturing is roughly equivalent to 30 doubling times, or an increase in bacterial titer of roughly 1 billion times. If, however, titers of, e.g., 250 bacteria/ml could be detected, the doubling time to reach that concentration, beginning with only two bacteria per ml, would only be eight doubling times, or 160 minutes, or 2.6 hours. A detectability capability at this level, if made feasible and "industrialized" into a medical laboratory-grade high-throughput instrument, could save many lives. Related art does not provide such capability, while the embodiments of the invention successfully address these critical questions. The described embodiment of the photometric system can be successfully used in rapid detection of bacteria, as described above. Three areas of emphasis are relevant to the bacteria testing: 1) the development and usages of small-volume test cells; 2) the broad wavelength measurement span; and 3) the high amount of flexibility and test configurability in the MDISS test system. These are each described in more detail below.

Development and Usage of Small Volume Test Cells.

The small volume test cells have been discussed above in detail, and have various small volumes, spanning a few ml to 360 ml. Even shorter path lengths of the optical cells may be implemented, including path lengths of 0.1-1 mm in 0.1 mm increments. The small volumes are critical since blood/fluid volumes drawn from a patient must be minimized, and even with shorter-term cultured growths, the smaller volumes are necessary to keep the bacteria dense enough to allow detection with the MDISS system. The MDISS system is capable of accommodating this wide range of test cell types.

Figure 18A:
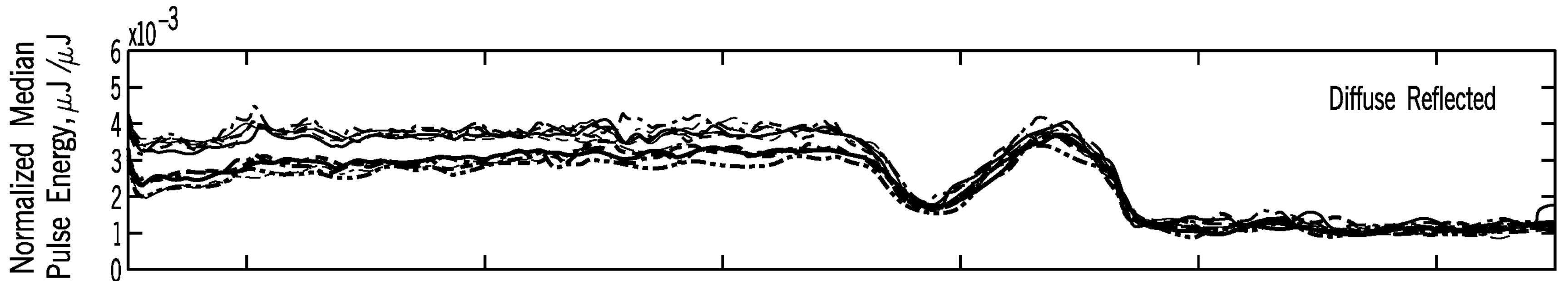
FIGS. 18A, 18B, 18C present plots showing comparison of normalized results of the measurements of energy for three different defined concentrations of *E. coli* bacteria (gram negative).
Figure 18B:
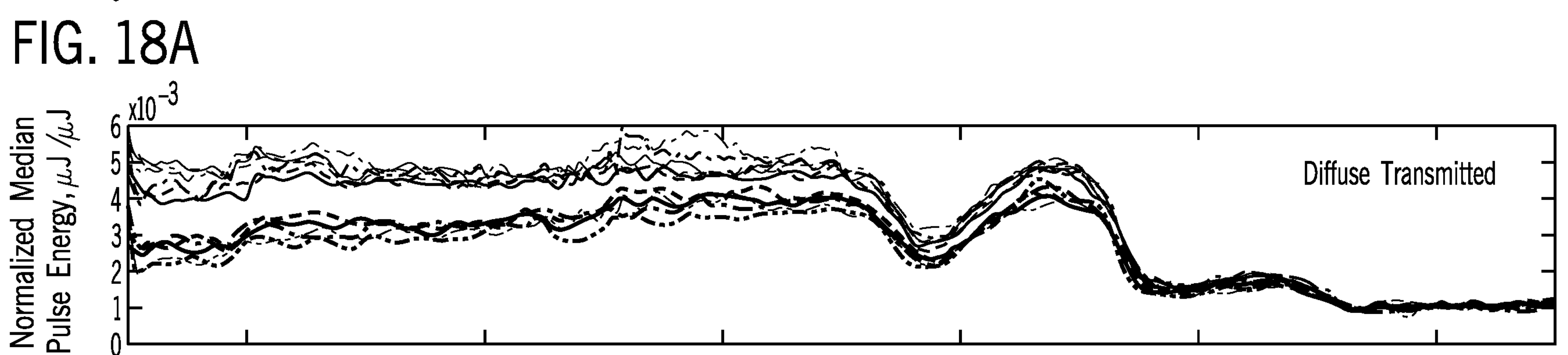
Figure 18C:
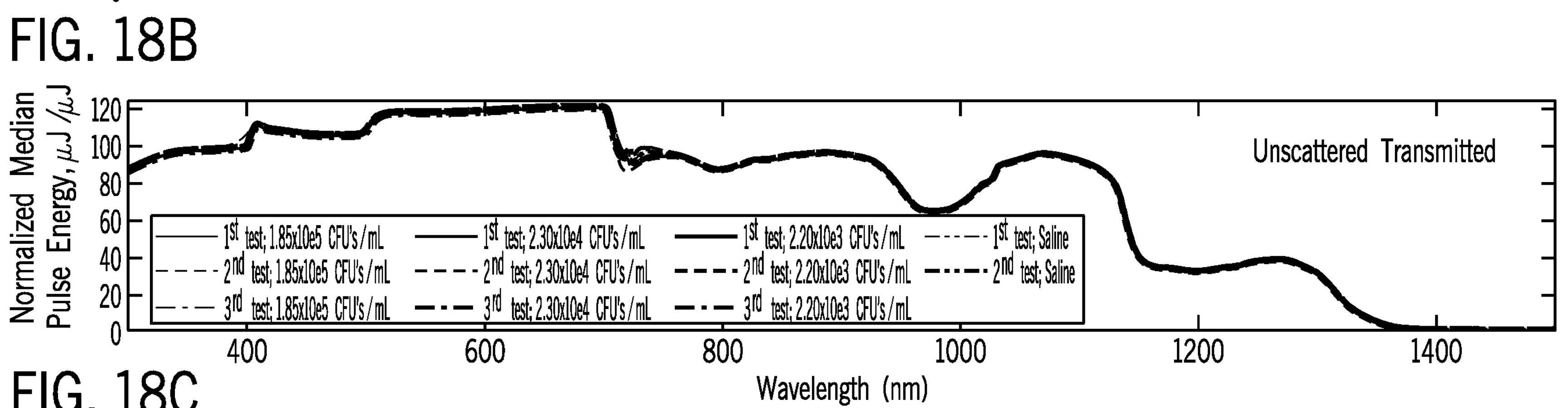
Figure 19A:
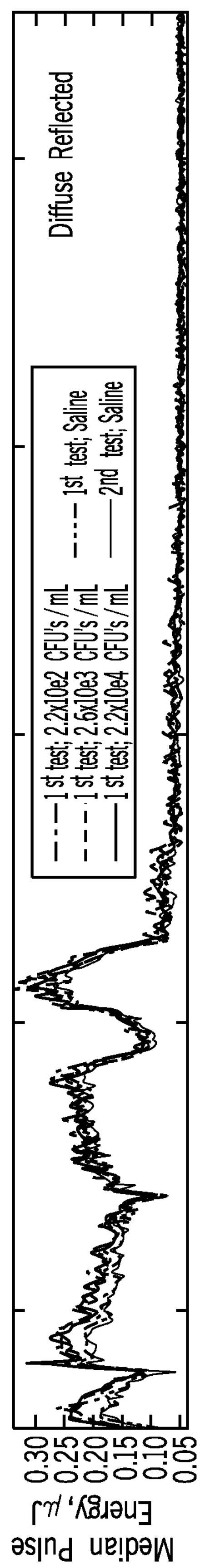
FIGS. 19A, 19B, 19C, 19D illustrate comparison of raw energy of three different pre-defined concentration of *E. coli* bacteria (gram-negative) measured in another experiment.
Figure 19B:
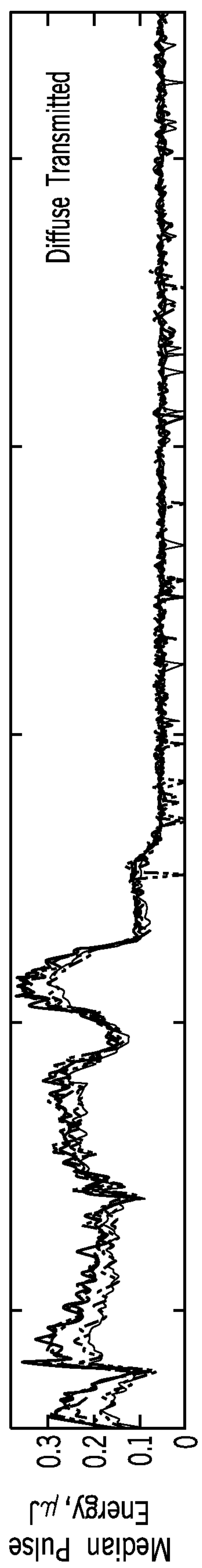
Figure 19C:
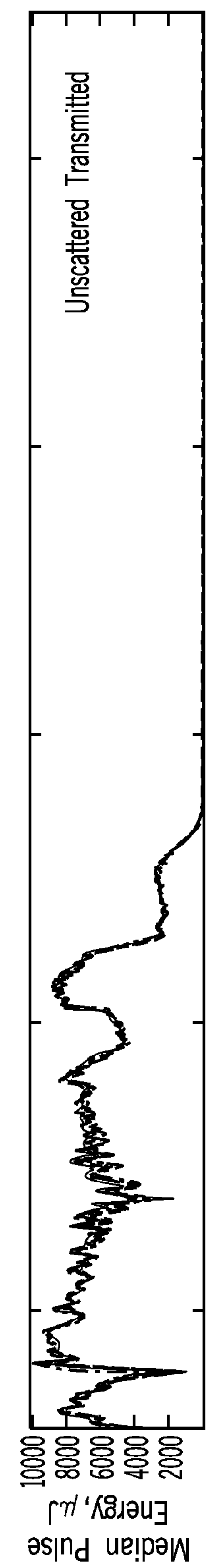
Figure 19D:
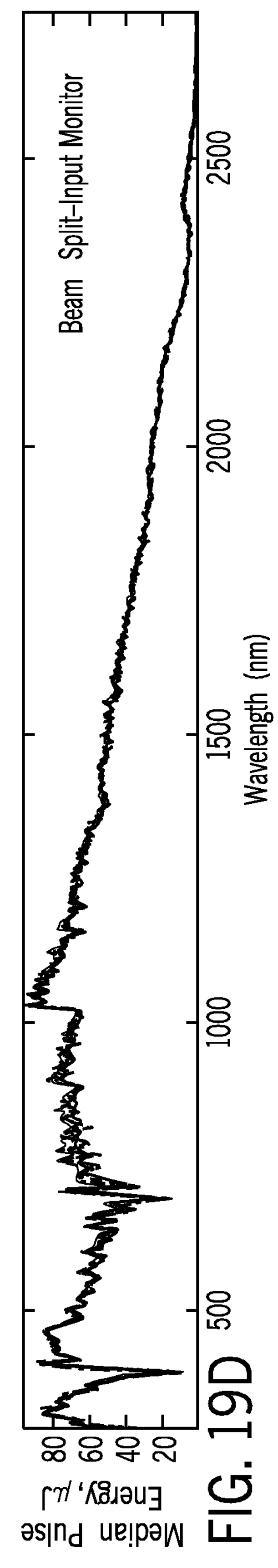

The Broad Wavelength Measurement Capability:

As previously described, the broad wavelength span of at least 192-2750 nm (and, in a related embodiment, from about 100 n to about 10,000 nm) is required to detect various types of bacteria. The MDISS system can provide the baseline tests using known bacteria types to determine the optimal wavelength span to detect a particular bacterial type. For example some bacteria types may be best detected at 400-500 nm, others at 1200-1300 nm, and yet other at 2300-2400 nm. Tests have been performed for over ten different bacteria types, with independently identifiable, uncompromising optical fingerprints of all, including:

*Escherichia coli* (*E. coli*), gram negative
*Staphylococcus epidermidis* (*S. epidermidis*), gram positive
*Staphylococcus aureus* (*S. aureus*), gram positive
*Pseudomonas aeruginosa* (*P. aeruginosa*), gram negative
*Streptococcus pneumonia* (*S. pneumonia*), gram positive
*Enterococcus faecalis* (*E. faecalis*), gram positive
*Corynebacterium glutamicum* (*C. glutamicum*), gram positive
*Bacillus subtilus* (*B. subtilus*), gram positive
*Streptococcus pyogenes* (*S. pyogenes*) [Group A strep], gram positive
*Propionibacterium acnes* (*P. acnes*), gram positive An example for the *E. coli* tests performed with the embodiment of the invention is depicted in FIGS. 18A, 18B, 18C, 19A, 19B, 19C, 19D, 20A, 20B, 20C, 21A, 21B, and 21C. These figures illustrate the results of direct measurements of the optical signal obtained in diffused reflection from the sample, the one obtained in diffused transmission from the sample, and that representing unscattered energy transmitted through the sample, each carried over the identified range of wavelengths In particular, FIGS. 18A through 18C are plots presenting the results of identifying three different "high" concentrations of *E. coli* samples (1.8E5, 2.3E4, and 2.2E3 colony forming units/mL [CFU/mL] suspended in normal 0.9% saline), along with two reference measurement sets employing physiological saline. Here, the test conditions included ten laser pulses at each of measurement wavelengths, 5 nm step size across the working range from 301 nm to 1500 nm, the samples were housed in optical cells with 10 mm path length at 25 degrees Centigrade; energy media was normalized with respect to beam-split input monitor (detector/sensor 124).

FIGS. 19A through 19D shows empirical results of identification of three different "low" concentrations of *E. coli* samples (2.2E4, 2.6E3, and 2.2E2 CFU/mL suspended in normal 0.9% saline), along with two reference physiological saline measurements. Here, the test conditions included twenty laser pulses at each of measurement wavelengths, 5 nm step size across the working range from 300 nm to 2750 nm, with the overall duration of the measurement of 8.75 hours. The samples were housed in optical cells with 10 mm path length at 25 degrees Centigrade; energy media was normalized with respect to beam-split input monitor (detector/sensor 124).

Figure 20A:
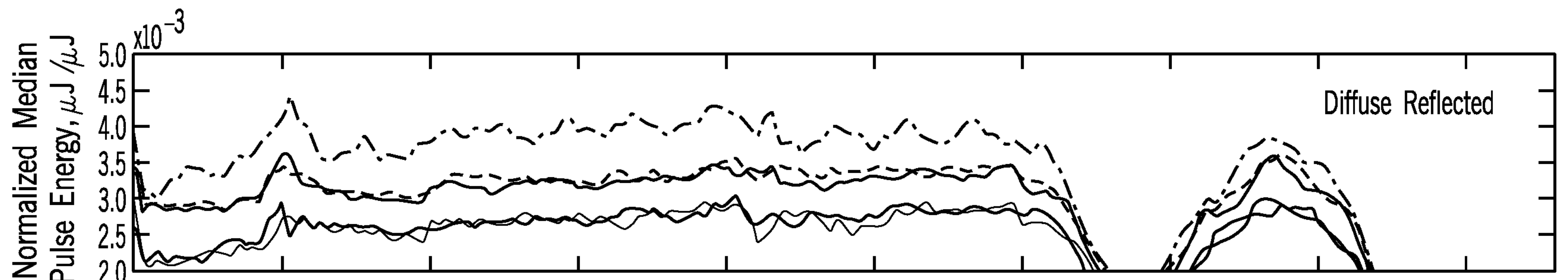
FIGS. 20A, 20B, 20C are plots representing comparison of normalized energy of pre-defined concentrations of *E. coli* bacteria measured in yet another experiment. p
Figure 20B:
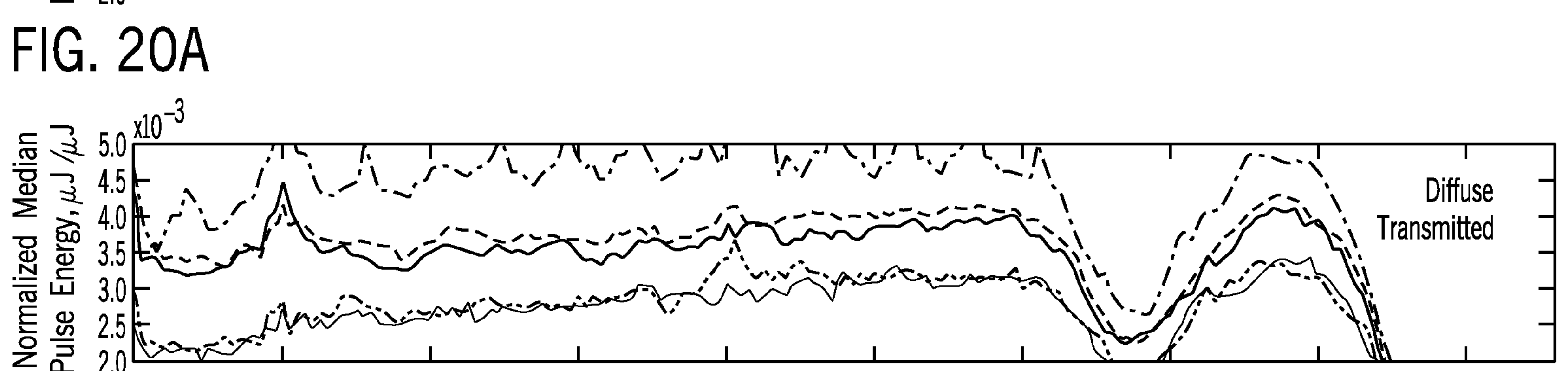
Figure 20C:
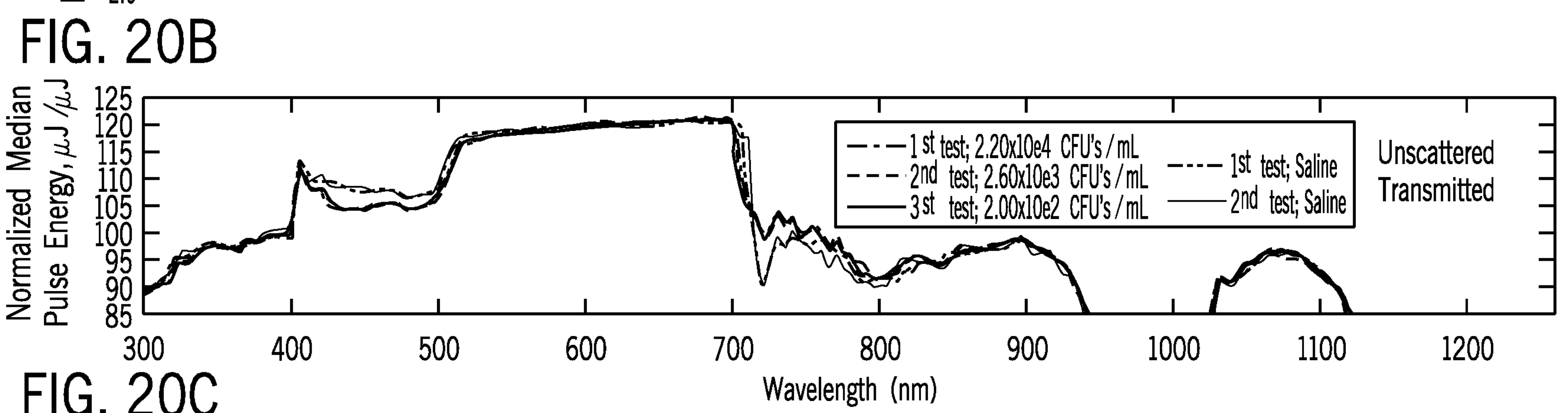

FIGS. 20A through 20C illustrate the results of determination of three different "low" concentrations of *E. coli* (2.2E4, 2.6E3, and 2.0E2 CFU/mL suspended in normal 0.9% saline), along with two reference physiological saline measurements. In this test case, the number of MDISS pulses per wavelength was increased to 50 (over the overall time-duration of the experiment of about 1 hour across the spectral range from 300 nm to 1400 nm), which resulted in an improved the signal-to-noise ratio, thus providing a better experimental separation of different concentrations as well as greater separation from the physiological saline, as compared with the results shown in FIGS. 19A-19D and 20A-20C. The samples were housed in optical cells with 10 mm path length at 25 degrees Centigrade; energy media was normalized with respect to beam-split input monitor (detector/sensor 124).

Figure 21A:
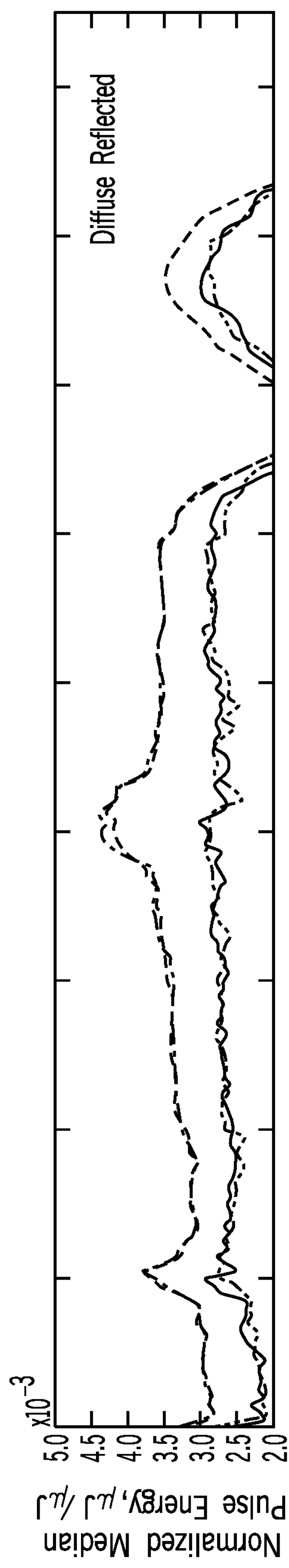
FIGS. 21A, 21B, 21C represent yet another set of results of the measurement of the *E. coli*-containing sample.
Figure 21B:
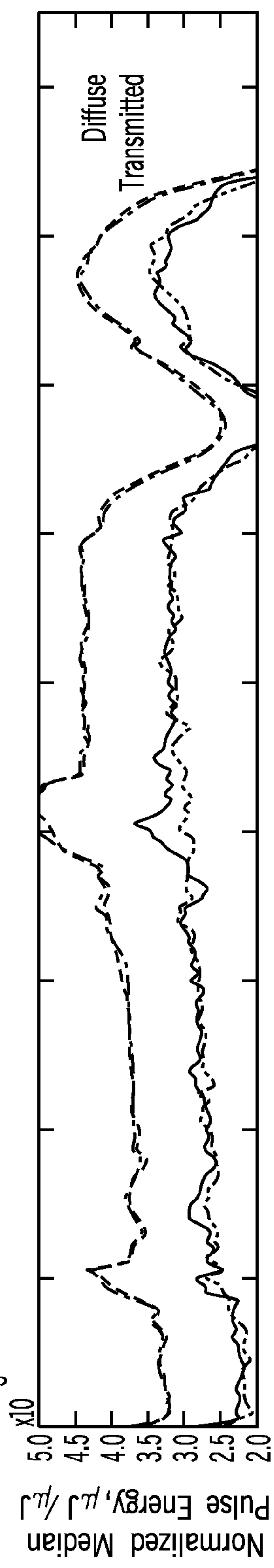
Figure 21C:
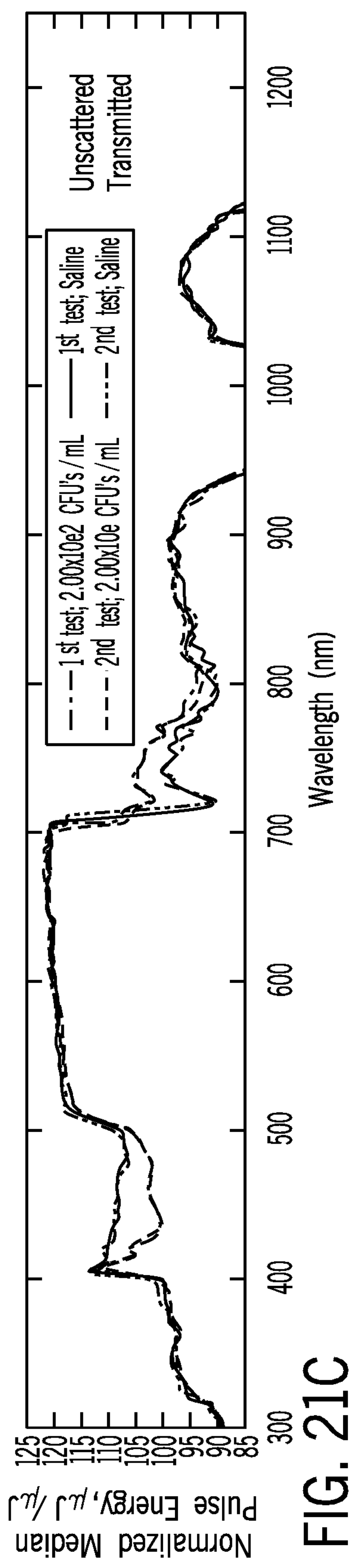

FIGS. 21A through 21C provide the results of a single different "very low" concentration of *E. coli* measured twice (2E2 CFU/mL, suspended in normal 0.9% saline), along with reference physiological saline measurement. The samples were housed in optical cells with 10 mm path length at 25 degrees Centigrade; energy media was normalized with respect to beam-split input monitor (detector/sensor 124). In this test case, the number of MDISS pulses per wavelength was increased even further to 500, with 5 nm step size across the working range from 300 nm to 1400 nm over the overall time span of less than 3 hours. The empirically collected data evidences the distinction between the two samples with low concentrations and the physiological saline, proving that the increased pulse count with appropriate signal averaging did have a significant impact on elucidating the differences.

The demonstrated flexibility and adaptability of the MDISS test system validates the value of the ability to execute rapid bacterial concentration measurements. (Indeed, as was already alluded to, measurements must be performed rapidly if accurate quantitative measurements are to be obtained: the currently available spectrophotometric systems do not prove the ability of determining such low concentrations of *E. coli* bacteria at above-mentioned spectral resolutions across the identified spectral ranges and speeds of under 400 nm per hour (and in one example—of about 367 nm per hour). As previously described in the MDISS system section, the significant levels of automation incorporated into the MDISS system allow rapid measurements, aided by its high level of configurability and adaptability allow selection of the wavelength measurement span to minimize test time.

In practice, with the above-described small volume test cells and known wavelengths for certain bacteria tests, the embodiment of the MDISS system of the invention can be configured for optimized patient sample testing. For example, if there is a suspected *E. coli* infection, a specific quick test can be arranged with the MDISS system to specifically test for *E. coli* based on the known baseline tests for *E. coli*. The ability to adapt and configure for specific tests is critical for the rapid turnaround results to support rapid diagnosis of bacterial contaminants in a patient's bloodstream.

Example: Rapid Quantitative Measurement of the Fluorescence Characteristics of Specific Organic Dyes (e.g., Aniline Dyes), both the Undiluted Dyes Themselves, and Mixed in Samples of Blood.

In the medical field, local anesthesia is, in many cases, a superior means of pain control in avoiding the side effects of narcotic pain medication. Nerve blocks are commonly used for postoperative pain control as well as the primary anesthetic when the avoidance of general anesthesia is desired. The use of local anesthesia in this application renders an area insensitive to pain without affecting consciousness, speeding the detection of complications and patient recovery. However, when performing a nerve block, relatively large drug doses can be required to inhibit the nerve conduction to the surgical site. Unfortunately, as little as 1 cc of local anesthesia injected accidentally into an artery can cause seizure, and large intravascular local anesthesia injection will block the conduction system of the heart, possibly leading to cardiac arrest and death. Symptoms evidencing the onset of toxic anesthesia contamination include numbness of the tongue, lightheadedness and visual and auditory disturbances, and can occur at concentrations below 7.5 mcg/ml. Approximately 5 in 10,000 surgeries report severe complications caused by intravascular local anesthesia, but thousands of regional blocks are done every day. Very few tools—if any—are available to anesthesiologists to protect patients from this problem.

In practice, the use of the embodiment for the determination of the sought-after fluorescent characteristics involves two separate stages. First, biocompatible dyes that fluoresce must be identified and characterized. For reasons discussed below, the exact behavioral characteristics of candidate dyes must be known with considerable precision, including:

The excitation wavelength(s) of each dye, that is, what wavelengths will drive the dye molecules to fluoresce The emission wavelength(s) of the dye after excitation The duration over which the dye must be exposed to the excitation wavelength, and the time constant, if any of the onset and decay of the exciting radiation.

The time constant of the decay of the fluorescence after the exciting radiation is turned off.

The practical problem is that the above information must be known with great accuracy if a handheld clinical-grade spectrophotometer is to be developed and fielded. Early studies conducted in this laboratory revealed that:

1) The excitation and emission wavelengths of most biocompatible dyes have not been well characterized, in that the wavelengths themselves are not well understood
2) The difference between the excitation and emission wavelengths may be very narrow in a spectral sense
3) The onset and decay time constants of the fluorescing molecules are in the range of a few milliseconds to less than a nanosecond.

In order to collect the required data as input to the clinical instrument's design, we need a benchtop "super spectrophotometer" that can make the needed measurements. There is a need for a new type of spectrophotometer that has:

1) a radiation source which can be swept over a wide bandwidth
2) very narrow instantaneous wavelength capability (i.e., 1 nm FWHM)
3) the ability to "turn on" and "turn off" this radiation source at nanosecond speeds
4) Photodetectors with sufficient optical sensitivity and nanosecond or sub-nanosecond response times.

Embodiments of the spectrophotometer of the invention are well-suited to the task at hand and address a method for operating a (e.g., handheld) spectrophotometer to monitor a patient receiving local anesthetic, thereby providing a solution to the above-identified problem. In general, the local anesthetic in such a case is marked with dye that is configured to absorb infrared radiation at a known wavelength and then to fluoresce at a different, also known, wavelength. An embodiment of the method includes the use of any of the above-discussed embodiments of the spectrophotometer in a process that contains the steps of: (1) applying radiation pulses at a predetermined wavelength to a tissue (sample) caused to receive anesthetic marked with fluorescing dye; (2) detecting radiation emitted from the sample with an optical detector system of the embodiment and generating a signal representative of the radiation detected; (3) processing the signal to derive information representative of the presence of dye-marked anesthetic; and (4) displaying such information (for example, on a monitor) or otherwise generating a report (whether printed or stored on a tangible, non-transitory storage medium) that describes such information in a user-perceivable form as a function of a characteristic of fluorescence.

As described above the MDISS system incorporates multiple features (including a precisely tunable narrow-linewidth optical source) to implement measurements associated with specialized fluorescing dye, including the broad wavelength span, the precise and narrow input energy line width, and the overall energy collection subsystem.

The discussed embodiments of the MDISS system has an energy pulse width of 3-5 ns, with pulse edge rates shorter than 1 ns. These relatively short pulse durations and very fast edge rates will allow rapid excitation events to be measured. The pulse duration and edge rates will likely be improved with the use of the extended range CW laser source that we are developing will use of fast switching (non-mechanical) polarization based shutters.

Example: The Use of an Embodiment for Measurement and Determination of the Exact Emission Wavelength(s) of the Optically-Excited Sample The primary challenges associated with the detection of energy emitted by a given body as fluorescence are well recognized. They include 1) the fact that the individual emission wavelengths may often be (and, generally, are) very closely spaced from the wavelength of the energy used for excitation of such fluorescence; and 2) the fact that the energy of the fluorescent emission is typically very low. Embodiments of the invention solve the problem of successful and precise measurement and determination based on approach employing judicious spatial orientation of detector(s) and wavelength filtering.

Consider, for example, sample(s) that include(s) a dye: see FIG. 22, summarizing LI-COR Biosciences Infrared Dye Product Table (obtained from LI-COR website). Here, the 700 and 700DX dyes are characterized by a difference between excitation and emission wavelengths of only 7 nm (680 nm excitation wavelength; and 687 nm emission wavelength). Other dyes display the excitation/emission wavelength differences spanning 10 nm to 25 nm. Additional information (available, for example, at the website of Enzo Life Sciences) illustrates that the majority of dyes have such difference in the 15 nm to 30 nm range. An embodiment of the spectrophotometer of the invention addresses the spectral resolution of the so-closely spaced excitation/emission wavelengths combinations based on optical angular separation and filtering (to isolate the emission from the excitation) and/or based on time-resolved measurements (i.e., by measuring the emission energy slightly later in time after the pulse of excitation energy delivered to the sample has already decayed). The first approach is now addressed below.

To address the separation and filtering approach, reference to FIGS. 14A, 14B is made. Here, as shown, the fiber-optic probes 1410, whether inserted into the test cell 116 as shown (or, alternatively, placed and appropriately spatially-oriented instead of at least one of detectors 128A, 132A) are oriented 90 degrees (i.e., at a right angle) to the path of the input excitation beam 204. To the degree that the energy from the beam 204 is absorbed by a fluorescing material in the cell 116, the emitted fluorescent energy is generally radiated in all directions; thus, the probe 1410 positioned at a right angle to the incident beam 204 captures and acquires only the fluorescence emission energy and not the energy of the input excitation beam 204. Thus, the spatial separation and empirical discrimination of the excitation radiation with respect to the sought-after fluorescence is obtained through simple geometric placement of hardware components in an embodiment of the spectrophotometer system. This approach works well for non-scattering samples. In the case of fluorescing scattering samples, some of the excitation energy may also impinge upon the right-angle-positioned optical probes, depending on the anisotropy of the sample, which in turn affects how much energy is either forward-scattered or reverse-scattered. The MDISS system, however, is designed to address this fluorescing scattering challenge employing two different approaches.

First, the placement and use of fiber probes 1410 in both the reverse scattered energy collection sphere and the forward scattered energy collection sphere of the units 128, 132, along with one or more fibers 1410 in the sample cell sidewall (as shown in FIG. 14A) improves the acquisition of the fluorescing energy at least dye to redundancy of the use of the multiple optical probe ports simultaneously. If the sample in the cell 116 generates exhibits a significant amount of reversely (backwards) scattered energy, it is the optical probe placed and used instead of the detector 132A of the unit 132 that is used to detect the fluorescence emission, since there will be observed minimal forward-scattered excitation energy in this case. The reverse is also true: a highly forward-scattering sample suggest that fluorescence emission is to be detected by the optical probe placed instead of the detector 128A of the unit 128. Finally, the additional optical probes 1410 disposed in the side walls of the cell 116 may be employed to acquire and detect various amount of energy depending on the scattering parameters of the sample. Notably, in all cases a highly sensitive spectrometer with several optical probes will be used as one of the sensor types (three spectrometers minimum: one for the reverse-scattered sphere probe, one for the forward-scattered sphere probe, and one for the sample cell side wall probe). The programmable processor(s) of the spectrometer system can then display, on an appropriate monitor, the relative amplitudes of all received energies at corresponding wavelengths (both for the input excitation and the fluorescence emission).

Additionally or in the alternative, the fiber probes 1410 utilized in all three locations (both in place of the detectors 128A, 132A and in the wall of the cell 116) could be made of multiple optical fibers (i.e., form a fiber bundle), with each individual optical fiber having as large a numerical aperture as possible to maximize the radiation gathering ability and sensitivity. The extreme outer (distal from the acquired radiation) end of the fiber bundle in this case may be separated into its individual optical fiber constituents, each provided with its own fiber optic connector. An example 2300 of this configuration is shown in FIG. 23, representing an embodiment of the fiber-optic probe 1410. This specific case illustrates 61 individual connectorized fibers 2310 at the distal to the unit 128 or 132 end, with a linear array 2320 at the near end (the end of the fiber associated with each sphere). Note: the linear array 2320 would also be appropriate for use in the sample cell side wall, especially for such cells 116 that have shorter (e.g., 1-2 mm) path lengths. The individual connectors 2310 at the "far ends" of the embodiment 2300 of the probe could be connected to multiple energy detectors of various types, including spectrometers, avalanche photodiodes (APDs), pin diodes, photomultiplier tubes, etc. More importantly, various individual optical fiber outputs may be operably cooperated with (connected to) to optical filters, e.g., narrow band-pass or high-pass, each optimized for desired emission wavelengths, As an example, 20 fibers at the 2310 end of the embodiment 2300 each having a nominal filtered 20 nm passband would cover a 400 nm emission span (e.g., from 300 nm to 700 nm, which is an optical waveband at which many dyes fluoresce). Each of these filtered outputs could be utilized in this case with an avalanche photodiode (APD) to achieve high sensitivity. Note that all such optical "channels" may be used operate simultaneously to allow for fluorescence emission detection of unknown samples with the use of a single, only input pulse of radiation 204. A high-frequency-pass filtering (which is easier to implement than the band-pass filtering) could also be alternatively utilized. Again, the filtering is critical for many of the closely spaced wavelength excitation/emission dyes.

If and when the longer path cells are used, an approach would include the use of an integral lens and/or reflector in or at the cell side wall. Such intracell optical system are preferably configured to maximize the gathering of radiation inside the cell, and focus the collected radiation on a circular fiber bundle. The intracell optical system would be appropriately gasketed to provide a hermetic seal, and also would be useable for the hyperbaric and hypobaric cell applications.

Example: Measurement of the Fluorescence Decay Time Constant with Sub-Nanosecond Accuracy After the Excitation Source is Turned Off.

This example addresses the solution (to the problem of precise measurements of parameters of fluorescent radiation) with the use of time-resolved measurements (i.e., by measuring the emission energy slightly later in time after the pulse of excitation energy delivered to the sample has already decayed) performed with an embodiment of the spectrophotometer of the invention.

If the fluorescence event occurs and/or continues after the activation energy pulse (applied to the sample in the cell 116) is over, the embodiment of the invention makes it possible to detect the fluorescence energy without the influence of input activation energy (that is, without worrying that the collected fluorescent signal will be contaminated with the excitation energy from the beam 204). This time-based implementation of the fluorescence detection may employ any of high-speed detectors such as APDs, single photon avalanche detectors, and photomultiplier tubes. The multiple probe (two integrating spheres and cell sidewalls, schematically illustrated in FIG. 9, for example) and multiple fiber approach previously described would still be utilized for this implementation.

Figure 24:
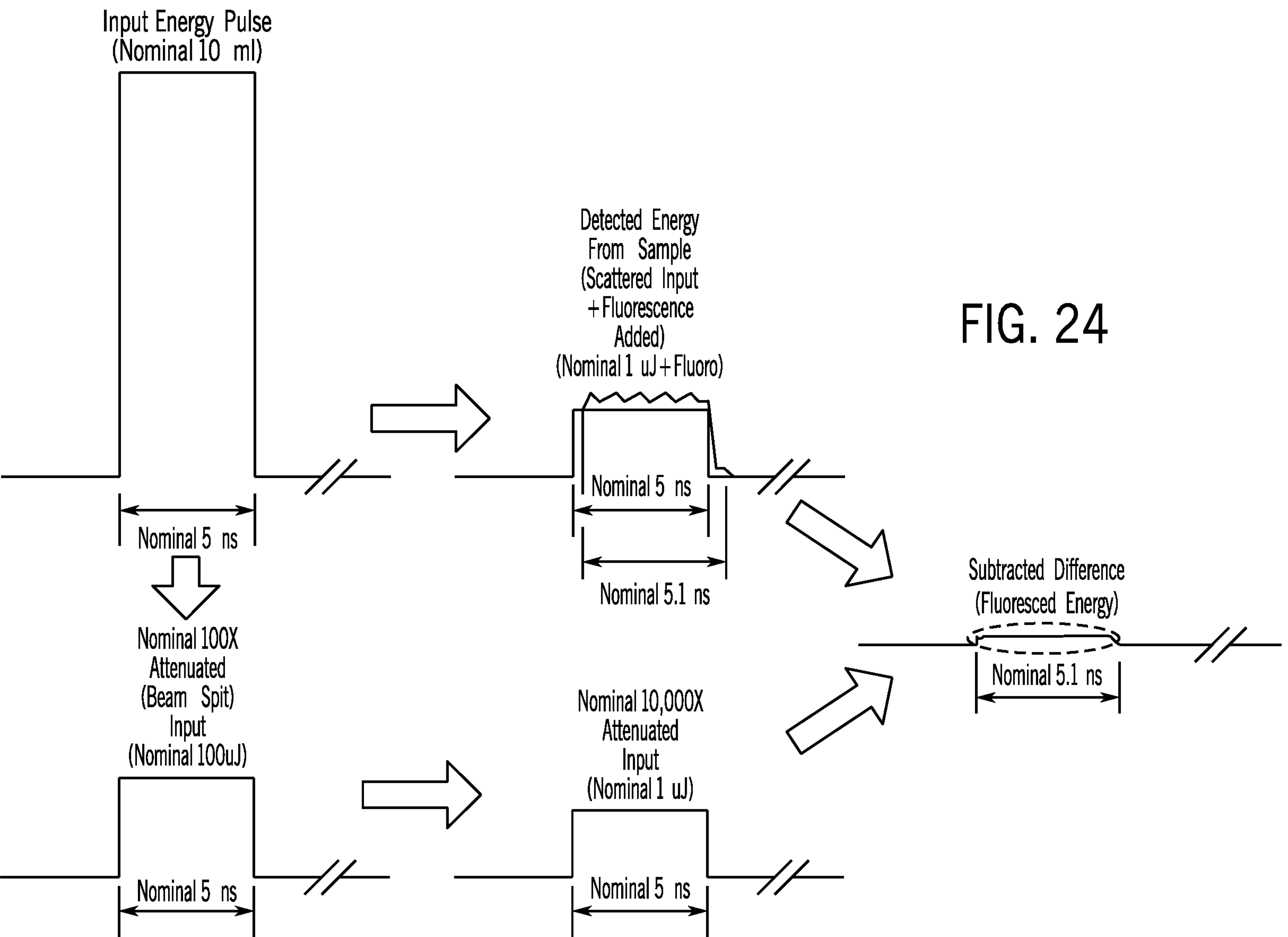
FIG. 24 is a schematic diagram depicting a principle of detection of fluorescence emitted by the irradiated sample with the use of a time-aligned excitation energy subtraction approach. According to this principle, the amount of fluorescent energy emitted by the sample can be assessed based on subtraction of energy detected from the sample from the energy used to irradiate the sample.)

In one case, the time-based methodology of separating the fluorescence from the excitation radiation could be implemented or enhanced as follows. As was discussed in reference to FIGS. 2 and 9, there are four energy detectors (sensors) in the MDISS system 100. The input energy sensor 124 is used primarily to monitor the input energy to account for the natural pulse-to-pulse energy variations of the pump-laser-and-OPO source of radiation, by means of a pair of APDs. This input energy sensor (pyroelectric-based and/or APD-based) could also be used as a "differencing reference" to detect any energy that occurs after the input energy pulse ends, as is schematically depicted in FIG. 24. In effect, by using a differencing approach, the input energy is subtracted from the downstream fluorescence detection probes; this subtraction takes place only during the input activation pulse duration. Any energy detected after the input activation pulse ends would have to be attributed to the remaining fluorescing energy. This approach would likely be best implemented using the APDs, which have very fast response times, as compared to the pyroelectric-based energy sensors.

Example: Measurements of Oxygenated HB in Blood Sample

FIG. 26 illustrates the uninterrupted, smooth nature of spectroscopic data recorded with the embodiment 100 in the spectral range from 600 nm to slightly below 1400 nm. The spectroscopic data represents an optical signal acquired by the sensor 128 and produced by the blood samples maintained at 25 C in a 63-mm diameter cell with 1 mm path length that has been irradiated with 10 pulses of radiation 204 at each wavelength within the spectral range. Samples have different—as indicated—100% oxyHB concentrations. The spectral range was scanned with 5 nm spectral steps, and averaged at each successive wavelength (to drive the measurement noise floor down), depicting only the "diffuse reflected" data.

Figure 27A:
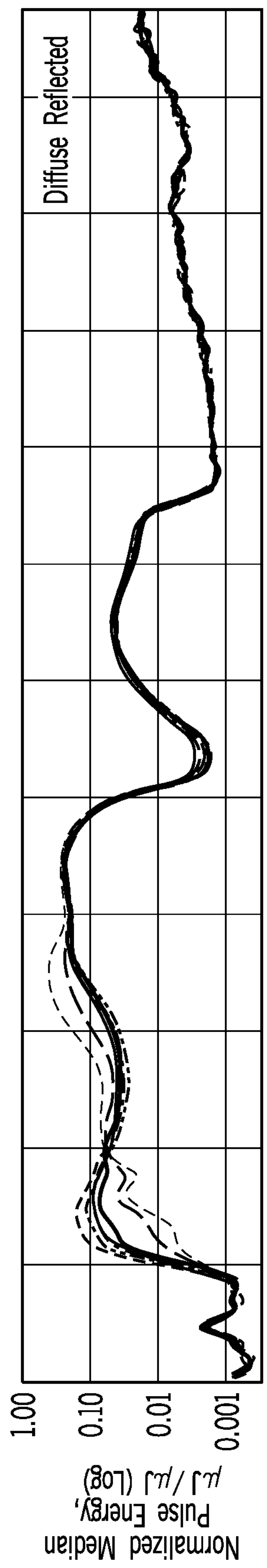
FIGS. 27A, 27B, 27C are plots representing results of normalized measurements of various concentrations of oxygen in the sample at hand.
Figure 27B:
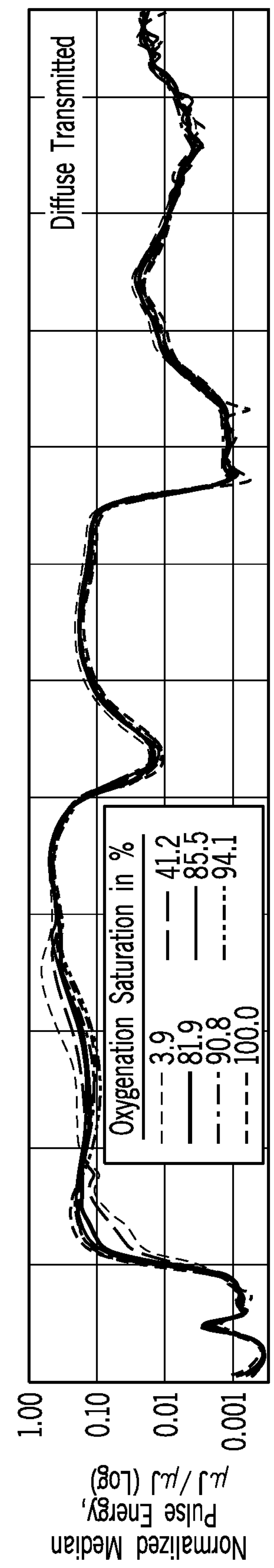
Figure 27C:
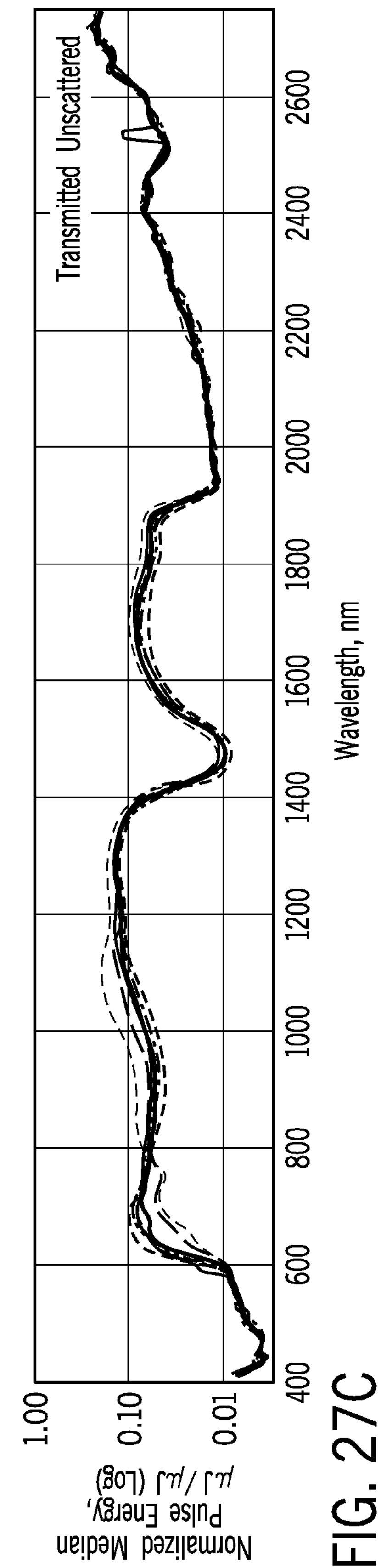

FIGS. 27A, 27B, 27C presents data recorded across the spectral range from 400 nm to 2750 nm, taken with 5 nm wavelength increment. The data illustrate the results of the measurements of $CO_2$-mediated desaturation of OxyHB in whole blood maintained at 25 C, performed with the embodiment 100 at HB concentration of 14.4 g/gL. Gas exchange was performed at 37 C. In this set of data, three parameters, i.e., the diffuse reflected, the diffuse transmitted, and the transmitted unscattered optical signals are presented, illustrating the fine-grained wavelength resolution capabilities of the embodiment of spectrophotometer.

Figure 28A:
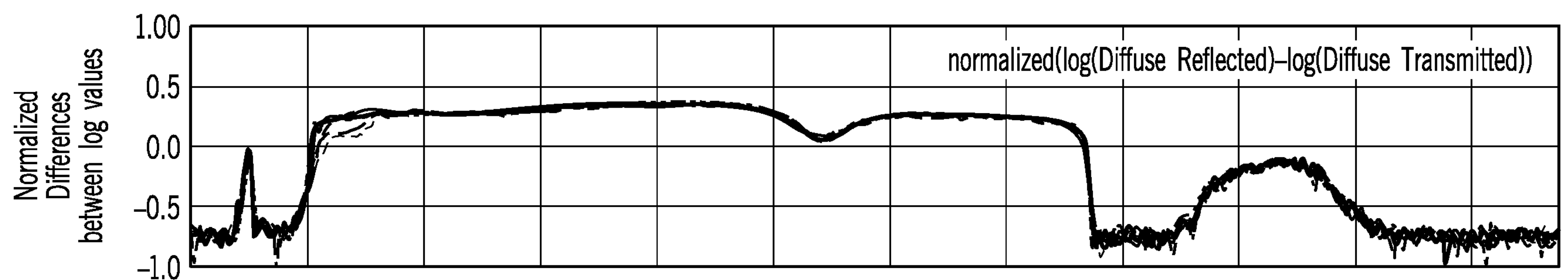
FIGS. 28A, 28B, 28C contain plots representing normalized differences between the results of the measurements of various concentrations of oxygen in FIGS. 27A through 27C.
Figure 28B:
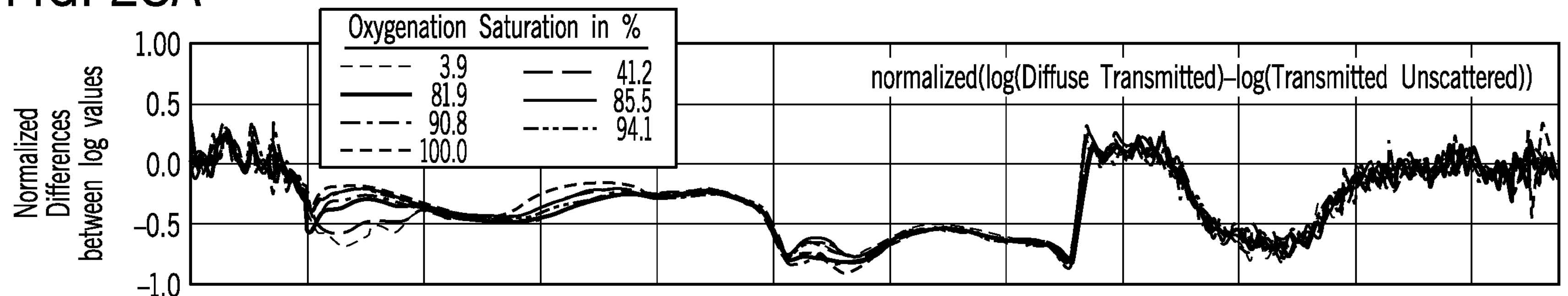
Figure 28C:
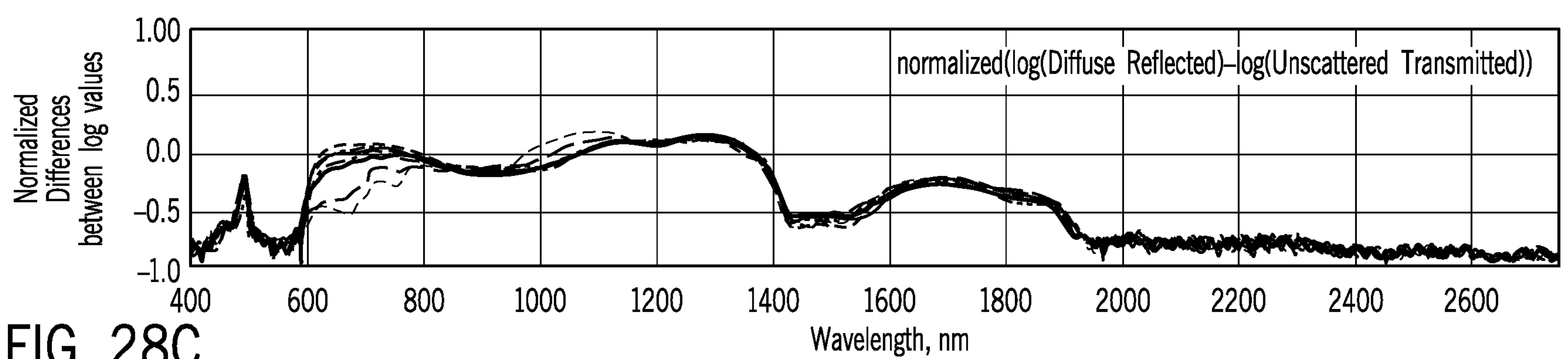

FIGS. 28A, 28B, 28C are plots representing spectral (wavelength)-dependent differences between energies of the signals described in reference to FIGS. 27A-27C. A person of skill in the art will readily appreciate that optical energy that is diffused reflectively by the sample, diffused in transmission through the sample, and transmitted through the sample without being diffused provide independent and complementary ways of characterizing a chosen analyte. The Figures show computed values, normalized(log(Diffuse Reflected)−log(Diffuse Transmitted)), normalized(log(Diffuse Transmitted)−log(Transmitted Unscattered)), and normalized(log(Diffuse Reflected)−log(Unscattered Transmitted)). The utility of these "differences" can be seen well in the range around 900 nm, around 1400 nm, and around 1900 nm.

Figure 16:
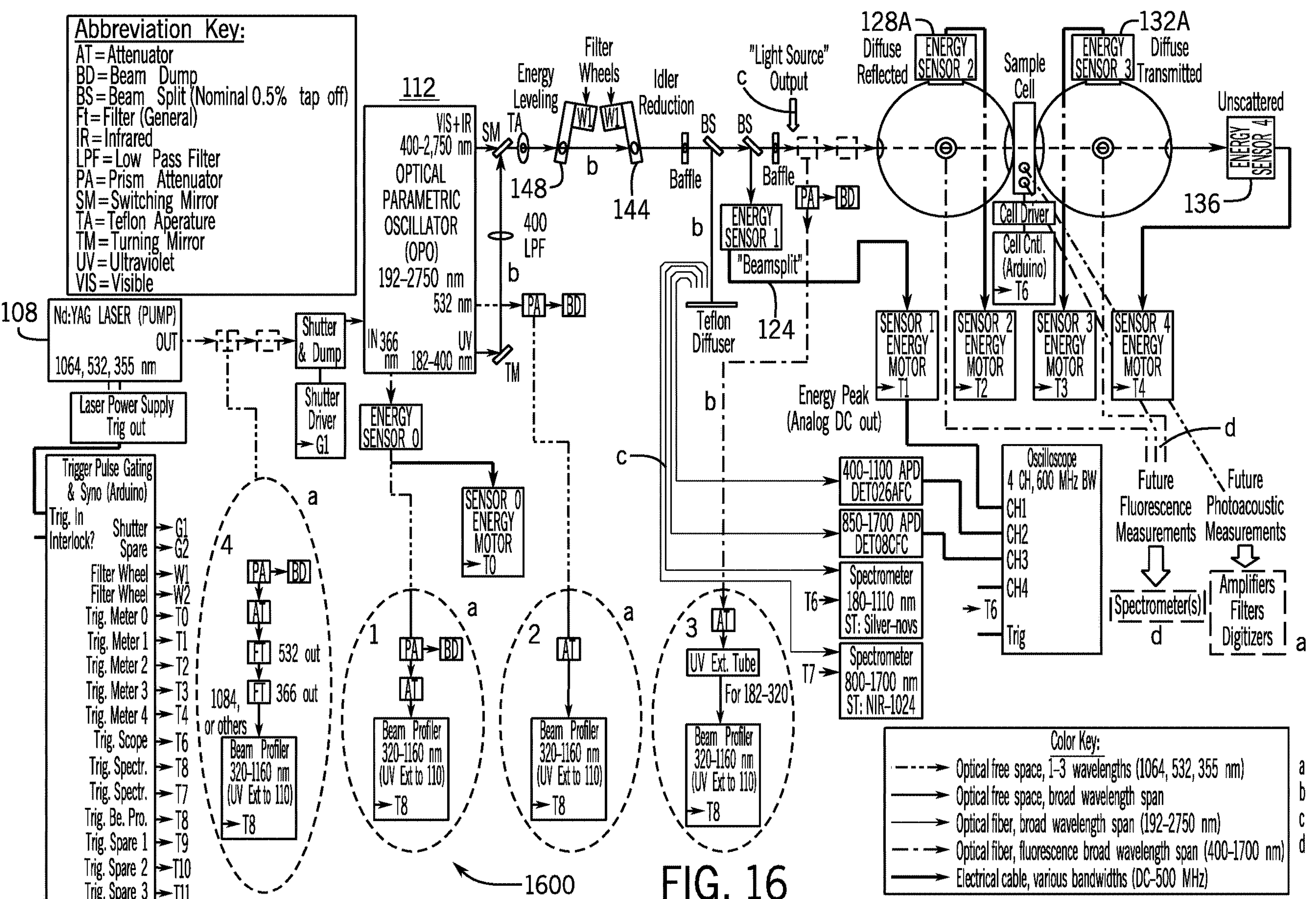
FIG. 16 presents a high-level schematic of an embodiment of the measurement system of the invention.

It is appreciated, therefore, from the above description that embodiments of the MDISS system are embodiments of a highly integrated and complex automated system. A high level schematic 1600 of the system 100 is presented in FIG. 16, with identification of some of components and subsystems. Certain energy channels (such as optical free-space delivery of radiation at specified wavelengths, optical free-space delivery of the broad-band radiation, delivery of radiation via optical fibers, etc) are indicated in the "color-key" legend with the labels a, b, c, and d and indicated on the scheme accordingly. It can be seen that the system 1600 is configured to effectuate robust, consistent and repeatable measurements and processes leading to collection of spectrophotometric data representing characteristics of the analyte(s) of interest in the sample (for example—the concentration of the analytes) as intended, including the ability to perform specific daily and weekly system verification verifications. The example of system performance verification steps/protocols in tabulated in FIG. 29. In exploitation of the system of the invention, the described tests and verification test runs (called no-cell runs) are preferably conducted on a routine basis (every day that a biological sample is tested); all resultant data are stored and system performance statistics are increasingly well understood over time.

It is appreciated that operation of an embodiment of the spectrophotometric system of the invention and at least some of the steps of the embodiments of the method of the invention can be effectuated with a processor (electronic circuitry) controlled by instructions stored in a tangible, non-transitory storage memory. Such processor may not have been shown necessarily in any given Figure. The memory may be random access memory (RAM), read-only memory (ROM), flash memory or any other memory, or combination thereof, suitable for storing control software or other instructions and data. Some of the functions performed by the processor have been described with reference to flowcharts and/or block diagrams. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

From the discussion above a person of ordinary skill in the art readily appreciates that, as a result of measurements performed with the use of an embodiment of the spectrophotometer system of the invention, various spectral curves representing various material components/analytes of a chosen sample re determined. Utilizing these empirically-determined data as input data and employing the methodology described in detail in Our Prior Publications, one is now enabled to determine specific, an individual number of wavelengths of operation of either the presently-discussed spectrophotometer device or another spectrometric device such that operation of the device at these wavelengths results in optimization of a figure of merit representing operational cost of employing the device and including the propagation of variance. As a result of such optimization—described in reference to equations (1) through at least (40c) of Our Prior Publications—a specific number N of wavelengths that is smaller than the number M of material components of interest in the sample is determined. (Notably, as a person of skill will readily appreciate while some of examples presented in Our Prior Publications used N=2 (M=3) or N=4 (M=5), the generalization of the solution of equation 7 described there allows the use of the spectral curves for determining a minimum required number N of preferred operational wavelengths for a known M>N number of analytes of interest (that is, N=3, N=4, N=5 and so on)

Then, by processing the spectral curves at these wavelengths (or alternatively, operating the spectrometric system only at these wavelengths) in a process referred to as pulsed oximetry data processing (see at least equations 41 through 44 of Our Prior Publications), one determines a required spectrally-dependent characteristic of the sample such that a cost-function (associated with the determination) is locally optimized.

FIGS. 31A, 31B, 31C, 31D, and 31E provide illustrations to a notion of manipulation of the OPO controls to widen the range of the operational wavelengths of an embodiment of the spectrophotometer over a sampling period of time. Here, 3100 denotes the OPO; 3105 refers to the input provided by the pump laser to the OPO; 3106 is the Signal out; 3107 is the Idler out; 3110: Nonlinear crystal; 3112 The plane of rotation of the crystal; 3115: lens or reflector; 3117: mirror. FIG. 31B illustrates single tight wavelength with narrow line width. FIG. 31C represents a ramped control signal creating an evenly distributed output over a tightly fixed range during a sample period. FIG. 31D addresses the (often-made) assumption that a sine-wave atop the control signal will provide a good range, however it should be noted—at 3165—that the resulting wavelength distribution is weighed towards the extremes of the range. FIG. 31E shows that Gaussian-distributed noise added to the center control signal will produce a Gaussian distribution of wavelengths. Here, 3120 is the graph axis for the control signal (Voltage sub control); 3122 is the attendant rotation of the non-linear crystal 3110, and 3124 is the wavelength of light impinging on the sample, and/or 3 the cumulative distribution of applied wavelength over a measurement interval of time.

FIG. 32 illustrates the rotation of the sample cell about an axis normal to the path of the radiation to the sample cell. Here, the cell holder is denoted as 120; 410 is a beam of radiation; cell rotation about an axis normal to the beam: 3200; cell rotation about the beam: 3205; cell rotation about the beam at one angle of rotation: 3210; cell rotation about the beam at a second angle of rotation: 3215; axis of rotation normal to the beam 410: 3220; unscattered transmitted beam: 3240; diffracted unscattered transmitted beam: 3245; diffracted unscattered transmitted beam 3250; cell rotated about a normal axis at a first angle: 3255; cell rotated about a normal axis at a second angle: 3260.

References made throughout this specification to "one embodiment," "an embodiment," "a related embodiment," or similar language mean that a particular feature, structure, or characteristic described in connection with the referred to "embodiment" is included in at least one embodiment of the present invention. Thus, appearances of these phrases and terms may, but do not necessarily, refer to the same implementation. It is to be understood that no portion of disclosure, taken on its own and in possible connection with a figure, is intended to provide a complete description of all features of the invention.

It is also to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed.

The invention as recited in claims appended to this disclosure is intended to be assessed in light of the disclosure as a whole, including features disclosed in prior art to which reference is made.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

While the invention is described through the above-described exemplary embodiments, it will be understood by those of ordinary skill in the art that modifications to, and variations of, the illustrated embodiments may be made without departing from the inventive concepts disclosed herein. For example: While much of the above disclosure referred to embodiments utilizing a pulsed laser, related embodiments use instead a continuous wave emitting laser. The CW laser can be tuned with much less variation of power, λ, and λ-spread. With the pulse laser, the shutter to cut off the radiation to the sample stage is operated between pulses. With the CW laser, a polarizing optical switch with a 70+ dB contract ration is used. This optical switch can control the sample exposure times. With the CW laser, because it is continuous rather than pulsed, the peak energy/ time delivered can be much lower than with the pulse when illuminating the sample with the same total energy. Either pulsed or CW source may be used; the CW has advantages in stability, but not all desired wavelengths of operation may be available. In another example, in a related embodiment, either or both integrating spheres can be replaced an corresponding optical (photo-) array configured to bes capable of two dimensional image measurements. There measurements can, e.g., be used to detect polarization index of refraction, phenomena that produce Fresnel-like images. The image and intensity read from the optical array can be analyzed by the data-processing unit of the system and/or stored, transfered to another computing system for analysis. When a photoarray is operated in a unit such as the spectrophotometer, an increased dynamic range may be achieved by using multiple periods between reading the photo array. As an example, charge-coupled diodes (CCDs) integrate the radiation that impinges on its receptor. When the radiation is bright, the CCD will saturate quickly, providing no additional detail after the saturated level. If the CCD is scanned/read more frequently, then it will resolve brighter levels. With dim illumination, the period can be extended, providing a longer integration time.

Disclosed aspects, or portions of these aspects, may be combined in ways not listed above. Accordingly, the invention should not be viewed as being limited to the disclosed embodiment(s).

What is claimed is:

1. A spectrophotometer system having an axis and comprising:

(1) a first energy-collecting system including first and second optical detectors disposed to accommodate, in operation, an optical cell system in a space between the first and second optical detectors, the optical cell system including an optical cell having an inner volume dimensioned to enclose a sample therein, wherein the first optical detector is configured to capture a first portion of radiation delivered to the sample along the axis and diffused by the sample in reflection, wherein the second optical detector is configured to capture a second portion of the radiation delivered to the sample along the axis and diffused by the sample in transmission;

(2) a second energy-collecting system including third and fourth optical detectors, the third optical detector disposed upstream from the first energy-collecting system with respect to a flow of the radiation towards the space, the fourth optical detector disposed downstream from the first energy-collecting system with respect to the flow, wherein the third optical detector is configured to receive a third portion of the radiation delivered to the space along the axis, and wherein the fourth optical detector is configured to receive a fourth portion of the radiation delivered, in operation, to the sample and transmitted through the sample without being scattered;

(3) the optical cell system including:

the optical cell containing first and second optically-transparent plates spatially-coordinated with one another to define the inner volume that is substantially fluid-impenetrable, and at least one of the following:

(a) a photo-acoustic transducer in operable cooperation with the inner volume to generate a photo-acoustic signal, the photo-acoustic signal representing a photo-acoustic response of contents of the inner volume irradiated with said radiation through at least one of the first and second plates, (b) an optical port configured to establish an optical communication, between the inner volume and an ambient surrounding the optical cell in a plane substantially parallel to the plane of the first plate, while maintaining the inner volume substantially fluidly sealed, (c) an optical cell holder dimensioned to house the optical cell to provide for a controlled angular displacement of the optical cell in a plane of the first plate and with respect to the axis; and (d) a set of spacer rings dimensioned to be disposed between the first and second plates along a perimeter of the inner volume, said spacer rings from the set having different thicknesses.

2. The spectrophotometer system according to claim 1, further comprising:

a source of said radiation configured to generate said radiation, at a wavelength within a wavelength range from about 100 nm to about 10,000 nm and including:

(i) a pump laser source, or a continuous-wavelength (CW) laser source, and (ii) an optical parametric oscillator disposed to receive a radiative output from the pump laser source or the CW laser source.

3. The spectrophotometer system according to claim 1, wherein at least one of the following conditions is satisfied:

a) at least one of the third and fourth optical detectors is spatially displaced from the axis;

b) at least one of the first and second optical detectors is configured to transmit the radiation therethrough to deliver said radiation to at least one of the space and the fourth optical detector; and c) the optical port is equipped with a fiber-optic element dimensioned to receive and transmit fluorescent radiation, generated inside the inner volume.

4. The spectrophotometer system according to claim 1, further comprising at least one of:

(a) a temperature-control circuitry operably cooperated with the optical cell to change a temperature thereof to a predetermined temperature;

(b) an oxygenation apparatus configured to transmit oxygen, in operation of the spectrophotometer, through a sample to be placed in the inner volume to achieve a predetermined level of oxygenation of the sample; and (c) a source of pressurizing gas and a network of gas passages fluidly connecting the source of pressurizing gas with the inner volume to elevate a level of internal pressure inside the inner volume, wherein the optical cell is configured to maintain integrity of the optical cell and the inner volume substantially unchanged at a hyperbaric pressure of at least 450 psi.

5. The spectrophotometer system according to claim 1, comprising an auxiliary apparatus configured to determine a preferred spectral regime of operation of the spectrophotometer system, the apparatus comprising:

a tangible storage medium containing optical data received at least from some of the first, second, third, and fourth optical detectors and representing spectrally-dependent characteristics of M material components of the sample, M being greater than 1;

a programmable processor in operable communication with the tangible storage medium, the processor configured to receive an input associated with an identification of M material components of the sample; and a tangible non-transitory computer-readable medium on which are stored computer instructions that, when the instructions are executed by the processor, cause the processor:

to receive, from the tangible storage medium, said optical data;

to form a first system of equations that expresses said optical data as functions of at least i) respectively corresponding concentrations of the M material components in the sample and ii) spectrally-dependent paths of optical waves through the sample, the optical waves respectively corresponding to the M material components;

to form a second system of equations including the first system of equations and additional equations employing at least one parameter representing operational utility of the spectrophotometer; and to solve said second system of equations, with the processor, to calculate such N wavelengths of operation of the spectrophotometer system that a spectrally-dependent figure of merit is locally optimized at the N wavelengths of operation, wherein to solve said second system of equations a number N of calculated wavelengths of operation smaller than the number M of the material components is required, and wherein said spectrally-dependent figure of merit includes propagation of variance.

6. The spectrophotometer system according to claim 5, wherein at least one of the following conditions is satisfied:

a) the auxiliary apparatus is further configured to determine an impulse response of the sample, the impulse response being associated with emission at least one of said N wavelengths of operation; and to determine, as a function of time, at least one wavelength-dependent material parameter characterizing the sample based on the determined impulse response and said optical data received at least from some of the first, second, third, and fourth optical detectors; and b) said N wavelengths of operation are defined by solving a system of equations that includes equations representing the spectrally dependent characteristics as a function of respectively-corresponding concentrations of the M material components of the sample, wherein said concentrations include at least one of a cell count, a protein count, a hemoglobin level, a glucose level, a lipid level, percent of a chromophore in the sample, a gas concentration; a percent water, and a pH level.

7. The spectrophotometer system according to claim 1, further comprising a programmable processor electrically connected to at least one of the first and second energy-collecting systems to receive an output produced by at least one of the first, second, third, and fourth optical detectors, wherein the third optical detector is disposed upstream from the space with respect to a flow of the radiation towards the space, wherein the third optical detector is configured to receive a fractional portion of the radiation delivered to the space along the axis, and produce a third-detector output, and wherein, the programmable processor is configured to perform, based at least in part on the third-detector output, at least one of:

determining a power of the flow of radiation.

(ii) determining a wavelength of radiation contained within the flow of radiation;

(iii) calibrating measurement data collected by at least one of the first, second, and fourth detectors; and (iv) adjusting the flow of radiation.

8. A method for processing optical data with a spectrophotometer system, the method comprising:

delivering excitation radiation along an axis to an optical cell system having said axis and disposed in a space between first and second optical detectors, the optical cell system including an optical cell having a substantially fluid-impenetrable inner volume dimensioned to enclose a sample therein;

traversing the sample with at least a fraction of said excitation radiation while the sample is held under a predetermined level of pressure inside the inner volume;

simultaneously performing the following actions:

a) detecting, with the first optical detector, a first portion of said excitation radiation that has been diffused by the sample in reflection, b) detecting, with the second optical detector, a second portion of said excitation radiation that has been diffused by the sample in transmission;

c) partially reflecting a third portion of said excitation radiation outside of the first and second optical detector to detect said third portion at a third detector;

and d) detecting, with a fourth optical detector, a fourth portion of the excitation radiation that has been transmitted through the sample without being scattered by the sample.

9. The method according to claim 8, further comprising determining a preferred spectral regime of operation of the spectrophotometer, said determining including:

receiving, at a user-input device, optical data obtained from the first, second, third, and fourth optical detectors, and representing spectrally-dependent characteristics of the M material components;

forming a first system of equations that expresses the optical data as functions of at least i) respectively corresponding concentrations of the M material components in the sample and ii) spectrally-dependent paths of optical waves through the sample, the optical waves respectively corresponding to the M material components;

forming a second system of equations including the first system of equations and additional equations employing at least one parameter representing operational utility of the device; and solving said second system of equations, with a programmable processor, to calculate said N wavelengths of operation of the device chosen such that a spectrally-dependent figure of merit is locally optimized at the N wavelengths of operation, wherein N is required to be smaller than M, and wherein said spectrally-dependent figure of merit includes propagation of variance.

10. The method according to claim 8, wherein said traversing includes traversing the sample held either at a hyperbaric pressure of at least 450 psi or at a sub-atmospheric pressure.

11. The method according to claim 8, wherein said receiving includes receiving at least a portion of fluorescent radiation that has been generated as a result of performing at least one of the following actions:

(i) tuning a wavelength of said excitation radiation as a result of transmitting a radiative output of a laser source through an optical parametric oscillator (OPO);

(ii) switching said laser source on and off with a frequency of at least one MHz;

(iii) causing said excitation radiation to be spectrally filtered at a pre-determined spectral range and causing the radiation at said wavelength to not be filtered; and (iv) using a scanning wavelength detector to measure a spectrum of the at least a portion of the fluorescent radiation.

12. The method according to claim 11, wherein said tuning includes transmitting the radiation output of a continuous-wavelength (CW) laser source through the OPO.

13. The method according to claim 8, wherein the receiving at least the portion of said fluorescent radiation includes channeling said radiation from the inner volume through a peripheral wall of the optical cell while maintaining the inner volume substantially fluidly sealed.

14. The method according to claim 8, further comprising: performing at least one of:

(i) receiving at least a portion of fluorescent radiation generated at the sample in response to interaction of said excitation radiation with the sample to produce a report containing data that represent presence of anesthetic material in the sample, said anesthetic material containing fluorescent dye marker;

(ii) acquiring, with an acoustic receiver, a sound representing a photo- acoustic response of the sample to interaction with the at least said fraction of the excitation radiation;

(iii) angularly displacing the optical cell, with respect to the axis, in a plane that is substantially transverse to the axis at a controlled angular speed;

(iv) changing a level of oxygenation of the sample in the optical cell; and (v) changing a temperature of the sample in the optical cell.

15. An optical cell system having an axis and comprising:

a first optical cell including first and second optically-transparent plates spatially-coordinated with one another to define a substantially fluid-impenetrable first inner volume; and a first photo-acoustic transducer in operable cooperation with the substantially fluid-impenetrable first inner volume to generate a first photo-acoustic signal, the first photo-acoustic signal representing a photo-acoustic response of contents of the first substantially fluid-impenetrable inner volume irradiated with a chosen radiation through at least one of the first and second plates, wherein said first inner volume has a first dimension along the axis and is defined by the first and second optically-transparent plates and a first ring spacer disposed between the first and second plates along a perimeter of the first inner volume, each of the first and second plates being subjected to a corresponding force directed along the axis.

16. An optical cell system according to claim 15, wherein the first cell is configured as a hypobaric cell to maintain an integrity of the first cell and the first inner volume substantially unchanged at a second pressure applied towards a center of the first inner volume, the second pressure being a sub-atmospheric pressure.

17. An optical cell system according to claim 15, further comprising:

a cell holder housing the first optical cell to provide for a controlled angular displacement of the cell in a plane of the first plate and with respect to the axis.

18. An optical cell system according to claim 15, further comprising a first optical port configured to establish an optical communication, between the first inner volume and an ambient surrounding the first cell in a plane substantially parallel to the plane of the first plate, while maintaining the first inner volume substantially fluidly sealed, said first optical portion containing a first fiber-optic element dimensioned to capture fluorescent radiation generated inside the first inner volume.

19. An optical cell system according to claim 15, further comprising a second optical cell including third and fourth optically-transparent plates spatially-coordinated with one another to define a substantially fluid-impenetrable second inner volume;

wherein at least one of the following conditions is satisfied:

the optical system comprises a second photoacoustic transducer, configured to establish acoustic communication between the second inner volume and an ambient medium surrounding the second optical cell, the optical system comprises a second optical port configured to provide an optical communication between the second inner volume and the ambient surrounding the second optical cell while maintaining the second inner volume fluidly sealed, and the second optical cell is configured as a hyperbaric cell to maintain an integrity of the first cell and the first inner volume substantially unchanged at a hyperbaric pressure of at least 450 psi, and wherein the first and second optical cells differ from one another.

* * * * *

UNITED STATES PATENT AND TRADEMARK OFFICE

CERTIFICATE OF CORRECTION

PATENT NO. : 11,473,976 B2
APPLICATION NO. : 17/281465
DATED : October 18, 2022
INVENTOR(S) : Daniel J. Schwab et al.

It is certified that error appears in the above-identified patent and that said Letters Patent is hereby corrected as shown below:

In the Specification

Column 5, Line 22, "emission at least" should be --emission at at least--.

Column 11, Line 66, "shiner" should be --shutter--.

In the Claims

Claim 6, Column 39, Lines 35-36, "emission at least" should be --emission at at least--.

Signed and Sealed this
Twentieth Day of December, 2022

Katherine Kelly Vidal

Katherine Kelly Vidal
*Director of the United States Patent and Trademark Office*